(12) United States Patent
Plewnia

(10) Patent No.: US 8,115,946 B2
(45) Date of Patent: Feb. 14, 2012

(54) METHODS AND SYTEMS FOR IMAGING DEVICE JOB DEFINITION

(75) Inventor: Boguslaw Ludwik Plewnia, Mission Viejo, CA (US)

(73) Assignee: Sharp Laboratories of America, Inc., Camas, WA (US)

(*) Notice: Subject to any disclaimer, the term of this patent is extended or adjusted under 35 U.S.C. 154(b) by 1446 days.

(21) Appl. No.: 11/218,186

(22) Filed: Aug. 31, 2005

(65) Prior Publication Data

US 2006/0080124 A1 Apr. 13, 2006

Related U.S. Application Data

(63) Continuation-in-part of application No. 10/962,248, filed on Oct. 8, 2004, now Pat. No. 8,018,610, and a continuation-in-part of application No. 10/961,793, filed on Oct. 8, 2004, now Pat. No. 8,035,831, and a continuation-in-part of application No. 10/961,911, filed on Oct. 8, 2004, and a continuation-in-part of application No. 10/961,594, filed on Oct. 8, 2004, and a continuation-in-part of application No. 10/962,103, filed on Oct. 8, 2004, now Pat. No. 7,969,596.

(60) Provisional application No. 60/704,066, filed on Jul. 28, 2005.

(51) Int. Cl.
*G06Q 99/00* (2006.01)

(52) U.S. Cl. ......... 358/1.15; 358/1.9; 358/1.13; 710/15; 399/8

(58) Field of Classification Search ............ 358/1.9, 358/1.13, 1.15; 710/15; 399/8
See application file for complete search history.

(56) References Cited

U.S. PATENT DOCUMENTS

| | | | |
|---|---|---|---|
| 5,085,587 | A | 2/1992 | DesForges et al. |
| 5,228,100 | A | 7/1993 | Takeda et al. |
| 5,323,393 | A | 6/1994 | Barrett et al. |
| 5,365,494 | A | 11/1994 | Lynch |
| 5,410,646 | A | 4/1995 | Tondevoid et al. |
| 5,504,589 | A | 4/1996 | Montague et al. |
| 5,513,112 | A | 4/1996 | Herring et al. |
| 5,542,031 | A | 7/1996 | Douglass et al. |

(Continued)

FOREIGN PATENT DOCUMENTS

EP 1160657 12/2001

(Continued)

OTHER PUBLICATIONS

F.D. Wright, Design Goals for an Internet Printing Protocol, Apr. 1999, pp. 1-43, http://tools.ietf.org/html/rfc2567.

(Continued)

*Primary Examiner* — David K Moore
*Assistant Examiner* — Peter K Huntsinger
(74) *Attorney, Agent, or Firm* — Krieger Intellectual Property, Inc.; Scott C. Krieger

(57) ABSTRACT

Aspects of the present invention relate to systems, methods and devices for imaging device job definition. Some aspects relate to methods and systems whereby device capabilities are communicated and stored with simple and complex compositors. Some aspects relate to method and systems whereby an imaging device job may be described with simple and complex compositors. Some aspects relate to a job definition list that may be constructed with said simple and complex compositors. Some aspects relate to methods and systems whereby an application requests a list of job configuration properties from an imaging device and uses the job configuration properties to create a job definition that may be sent to the imaging device.

11 Claims, 21 Drawing Sheets

U.S. PATENT DOCUMENTS

| | | |
|---|---|---|
| 5,586,260 A | 12/1996 | Hu |
| 5,659,845 A | 8/1997 | Krist et al. |
| 5,671,412 A | 9/1997 | Christiano |
| 5,699,493 A | 12/1997 | Davidson et al. |
| 5,699,494 A | 12/1997 | Colbert et al. |
| 5,717,439 A | 2/1998 | Levine et al. |
| 5,726,883 A | 3/1998 | Levine et al. |
| 5,727,082 A | 3/1998 | Sugishima |
| 5,727,135 A | 3/1998 | Webb et al. |
| 5,745,883 A | 4/1998 | Krist et al. |
| 5,760,775 A | 6/1998 | Sklut et al. |
| 5,774,678 A | 6/1998 | Motoyama |
| 5,791,790 A | 8/1998 | Bender et al. |
| 5,796,934 A | 8/1998 | Bhanot et al. |
| 5,799,206 A | 8/1998 | Kitagawa et al. |
| 5,799,289 A | 8/1998 | Fukushima et al. |
| 5,812,818 A | 9/1998 | Adler et al. |
| 5,832,264 A | 11/1998 | Hart et al. |
| 5,848,231 A | 12/1998 | Teitelbaum et al. |
| 5,877,776 A | 3/1999 | Beaman et al. |
| 5,944,824 A | 8/1999 | He |
| 5,956,487 A | 9/1999 | Venkatraman et al. |
| 5,956,698 A | 9/1999 | Lacheze et al. |
| 5,968,127 A | 10/1999 | Kawabe et al. |
| 5,993,088 A | 11/1999 | Nogay et al. |
| 5,995,553 A | 11/1999 | Crandall et al. |
| 5,999,708 A | 12/1999 | Kajita |
| 6,042,384 A | 3/2000 | Loiacono |
| 6,044,382 A | 3/2000 | Martino |
| 6,069,706 A | 5/2000 | Kajita |
| 6,075,860 A | 6/2000 | Ketcham |
| 6,115,132 A | 9/2000 | Nakasuma et al. |
| 6,118,546 A | 9/2000 | Sanchez |
| 6,128,731 A | 10/2000 | Zarrin et al. |
| 6,141,662 A | 10/2000 | Jeyachandran |
| 6,148,346 A | 11/2000 | Hanson |
| 6,161,139 A | 12/2000 | Win et al. |
| 6,178,308 B1 | 1/2001 | Bobrow et al. |
| 6,199,080 B1 | 3/2001 | Nielsen |
| 6,213,652 B1 | 4/2001 | Suzuki et al. |
| 6,216,113 B1 | 4/2001 | Aikens et al. |
| 6,233,409 B1 | 5/2001 | Haines et al. |
| 6,240,456 B1 | 5/2001 | Teng et al. |
| 6,246,487 B1 | 6/2001 | Kobayashi et al. |
| 6,292,267 B1 | 9/2001 | Mori et al. |
| 6,301,016 B1 | 10/2001 | Matsueda et al. |
| 6,311,040 B1 | 10/2001 | Kucinski et al. |
| 6,353,878 B1 | 3/2002 | Dunham |
| 6,369,905 B1 | 4/2002 | Mitsuhashi et al. |
| 6,407,820 B1 | 6/2002 | Hansen et al. |
| 6,426,798 B1 | 7/2002 | Yeung |
| 6,433,883 B1 | 8/2002 | Kajita |
| 6,438,589 B1 | 8/2002 | Iwata |
| 6,462,756 B1 | 10/2002 | Hansen et al. |
| 6,476,926 B1 | 11/2002 | Yano et al. |
| 6,490,601 B1 | 12/2002 | Markus et al. |
| 6,509,974 B1 | 1/2003 | Hansen |
| 6,510,466 B1 | 1/2003 | Cox et al. |
| 6,516,157 B1 | 2/2003 | Maruta et al. |
| 6,526,258 B2 | 2/2003 | Bejar et al. |
| 6,567,179 B1 | 5/2003 | Sato et al. |
| 6,590,589 B1 | 7/2003 | Sluiman |
| 6,590,673 B2 | 7/2003 | Kadowaki |
| 6,592,275 B1 | 7/2003 | Aihara et al. |
| 6,597,469 B1 | 7/2003 | Kuroyanagi |
| 6,604,157 B1 | 8/2003 | Brusky et al. |
| 6,621,422 B2 | 9/2003 | Rubenstein |
| 6,636,929 B1 | 10/2003 | Frantz et al. |
| 6,643,650 B1 | 11/2003 | Slaughter et al. |
| 6,652,169 B2 | 11/2003 | Parry |
| 6,685,637 B1 | 2/2004 | Rom |
| 6,707,466 B1 | 3/2004 | Van Sickle et al. |
| 6,721,286 B1 | 4/2004 | Williams et al. |
| 6,735,773 B1 | 5/2004 | Trinh et al. |
| 6,749,434 B2 | 6/2004 | Stuppy |
| 6,307,640 B1 | 8/2004 | Motegi |
| 6,772,945 B2 | 8/2004 | Mahoney et al. |
| 6,775,729 B1 | 8/2004 | Matsuo et al. |
| 6,823,225 B1 | 11/2004 | Sass |
| 6,826,727 B1 | 11/2004 | Mohr et al. |
| 6,836,623 B2 | 12/2004 | Imai |
| 6,836,845 B1 | 12/2004 | Lennie et al. |
| 6,850,252 B1 | 2/2005 | Hoffberg |
| 6,854,839 B2 | 2/2005 | Collier et al. |
| 6,862,110 B2 | 3/2005 | Harrington |
| 6,862,583 B1 | 3/2005 | Mazzagatte et al. |
| 6,873,429 B2 | 3/2005 | Matsuura |
| 6,874,010 B1 | 3/2005 | Sargent |
| 6,904,412 B1 * | 6/2005 | Broadbent et al. ............... 705/38 |
| 6,915,525 B2 | 7/2005 | Ozawa |
| 6,934,706 B1 | 8/2005 | Mancuso et al. |
| 6,934,740 B1 | 8/2005 | Lawande et al. |
| 6,940,532 B1 | 9/2005 | Fukui et al. |
| 6,948,175 B1 | 9/2005 | Fong et al. |
| 6,951,303 B2 | 10/2005 | Peterson et al. |
| 6,975,820 B2 | 12/2005 | Wong |
| 6,999,987 B1 | 2/2006 | Billingsley et al. |
| 7,003,723 B1 | 2/2006 | Kremer et al. |
| 7,012,706 B1 | 3/2006 | Hansen |
| 7,013,289 B2 | 3/2006 | Horn et al. |
| 7,019,753 B2 | 3/2006 | Rappaport et al. |
| 7,034,958 B1 | 4/2006 | Hara |
| 7,072,057 B1 | 7/2006 | Hansen |
| 7,079,143 B2 | 7/2006 | Gilbert |
| 7,095,513 B2 | 8/2006 | Stringham |
| 7,107,615 B2 | 9/2006 | Cossel et al. |
| 7,124,097 B2 | 10/2006 | Claremont et al. |
| 7,126,717 B2 | 10/2006 | Jeyachandran |
| 7,127,700 B2 | 10/2006 | Large |
| 7,136,909 B2 | 11/2006 | Balasuriya |
| 7,136,941 B2 * | 11/2006 | Nguyen et al. .................. 710/15 |
| 7,143,364 B1 | 11/2006 | Tam |
| 7,145,673 B1 | 12/2006 | Lin |
| 7,149,697 B2 | 12/2006 | Zerza et al. |
| 7,162,103 B2 | 1/2007 | Meunier et al. |
| 7,170,618 B2 | 1/2007 | Fujitani et al. |
| 7,174,056 B2 | 2/2007 | Silverbrook et al. |
| 7,177,814 B2 | 2/2007 | Gong et al. |
| 7,181,017 B1 | 2/2007 | Nagel et al. |
| 7,181,442 B2 | 2/2007 | Yeh et al. |
| 7,185,078 B2 | 2/2007 | Pleyer et al. |
| 7,188,125 B1 | 3/2007 | Karr |
| 7,188,181 B1 | 3/2007 | Squier et al. |
| 7,191,391 B2 | 3/2007 | Takashima |
| 7,197,615 B2 | 3/2007 | Arakawa et al. |
| 7,203,699 B2 | 4/2007 | Bellamy |
| 7,212,301 B2 | 5/2007 | Treibach-Heck et al. |
| 7,216,347 B1 | 5/2007 | Harrison et al. |
| 7,233,929 B1 | 6/2007 | Lingle et al. |
| 7,239,409 B2 | 7/2007 | Parry |
| 7,249,100 B2 | 7/2007 | Murto et al. |
| RE39,808 E | 9/2007 | Motegi |
| 7,272,269 B2 | 9/2007 | Tojo et al. |
| 7,275,044 B2 | 9/2007 | Chauvin et al. |
| 7,284,061 B2 | 10/2007 | Matsubayashi et al. |
| 7,293,034 B2 | 11/2007 | Paya et al. |
| 7,296,221 B1 | 11/2007 | Treibach-Heck et al. |
| 7,301,658 B2 | 11/2007 | Henry |
| 7,305,616 B1 | 12/2007 | Nelson et al. |
| 7,321,440 B2 | 1/2008 | Kimura |
| 7,325,196 B1 | 1/2008 | Covington et al. |
| 7,327,478 B2 | 2/2008 | Matsuda |
| 7,328,245 B1 | 2/2008 | Hull et al. |
| 7,343,551 B1 | 3/2008 | Bourdev |
| 7,349,949 B1 | 3/2008 | Connor et al. |
| 7,363,586 B1 | 4/2008 | Briggs et al. |
| 7,404,204 B2 | 7/2008 | Davenport et al. |
| 7,406,660 B1 | 7/2008 | Sikchi et al. |
| 7,441,188 B1 | 10/2008 | Russell et al. |
| 7,444,519 B2 | 10/2008 | Laferriere et al. |
| 7,451,117 B2 | 11/2008 | Cozianu et al. |
| 7,451,392 B1 | 11/2008 | Chalecki et al. |
| 7,454,623 B2 | 11/2008 | Hardt |
| 7,467,211 B1 | 12/2008 | Herman et al. |
| 7,496,837 B1 | 2/2009 | Larcheveque et al. |
| 7,500,178 B1 | 3/2009 | O'Donnell |
| 7,508,535 B2 | 3/2009 | Hart et al. |

| | | |
|---|---|---|
| 7,509,649 B2 | 3/2009 | Shenfield |
| 7,545,528 B2 | 6/2009 | Takabayashi et al. |
| 7,548,334 B2 | 6/2009 | Lo et al. |
| 7,552,265 B2 | 6/2009 | Newman et al. |
| 7,565,554 B2 | 7/2009 | Joosten et al. |
| 7,567,360 B2 | 7/2009 | Takahashi et al. |
| 7,573,593 B2 | 8/2009 | Hart et al. |
| 7,657,557 B2 | 2/2010 | Super |
| 7,729,363 B2 | 6/2010 | Shenfield et al. |
| 2001/0021945 A1 | 9/2001 | Matsuura |
| 2001/0027527 A1 | 10/2001 | Khidekel et al. |
| 2001/0028808 A1 | 10/2001 | Nomura et al. |
| 2001/0038462 A1 | 11/2001 | Teeuwen et al. |
| 2001/0039614 A1 | 11/2001 | Hellberg et al. |
| 2001/0044787 A1 | 11/2001 | Shwartz et al. |
| 2002/0016921 A1 | 2/2002 | Olsen et al. |
| 2002/0029256 A1 | 3/2002 | Zintel et al. |
| 2002/0032745 A1 | 3/2002 | Honda |
| 2002/0049786 A1 | 4/2002 | Bibliowicz et al. |
| 2002/0052916 A1 | 5/2002 | Kloba et al. |
| 2002/0055984 A1 | 5/2002 | Chang et al. |
| 2002/0059265 A1 | 5/2002 | Valorose, III |
| 2002/0073148 A1 | 6/2002 | Haines et al. |
| 2002/0080381 A1 | 6/2002 | Haines |
| 2002/0089691 A1 | 7/2002 | Fertlitsch et al. |
| 2002/0093676 A1 | 7/2002 | Parry |
| 2002/0098027 A1 | 7/2002 | Koike et al. |
| 2002/0099796 A1 | 7/2002 | Chou |
| 2002/0103827 A1 | 8/2002 | Sesek |
| 2002/0105664 A1 | 8/2002 | Inoue et al. |
| 2002/0107939 A1 | 8/2002 | Ford et al. |
| 2002/0109718 A1 | 8/2002 | Mansour et al. |
| 2002/0112037 A1 | 8/2002 | Koss |
| 2002/0120792 A1 | 8/2002 | Blair |
| 2002/0138279 A1 | 9/2002 | Al-Kazily et al. |
| 2002/0138476 A1 | 9/2002 | Suwa et al. |
| 2002/0138666 A1 | 9/2002 | Fujisawa |
| 2002/0145627 A1 | 10/2002 | Whitmarsh |
| 2002/0147858 A1 | 10/2002 | Motoyama et al. |
| 2002/0152183 A1 | 10/2002 | Soares et al. |
| 2002/0152235 A1 | 10/2002 | Motoyama et al. |
| 2002/0152302 A1 | 10/2002 | Motoyama et al. |
| 2002/0156795 A1 | 10/2002 | Edwards et al. |
| 2002/0156846 A1 | 10/2002 | Rawat et al. |
| 2002/0171857 A1 | 11/2002 | Hisatomi |
| 2002/0194180 A1 | 12/2002 | Alsop et al. |
| 2002/0194350 A1 | 12/2002 | Lu et al. |
| 2003/0002074 A1 | 1/2003 | Miyano |
| 2003/0007170 A1 | 1/2003 | Kajita et al. |
| 2003/0011633 A1 | 1/2003 | Conley et al. |
| 2003/0011640 A1 | 1/2003 | Green et al. |
| 2003/0014515 A1 | 1/2003 | Motoyama et al. |
| 2003/0014529 A1 | 1/2003 | Simpson et al. |
| 2003/0033369 A1 | 2/2003 | Bernhard |
| 2003/0035133 A1 | 2/2003 | Berkema et al. |
| 2003/0038965 A1 | 2/2003 | Simpson et al. |
| 2003/0043205 A1 | 3/2003 | Hill |
| 2003/0043396 A1 | 3/2003 | Klosterman et al. |
| 2003/0043405 A1 | 3/2003 | Hill |
| 2003/0048470 A1 | 3/2003 | Garcia |
| 2003/0048473 A1 | 3/2003 | Rosen |
| 2003/0049037 A1 | 3/2003 | Sadowara et al. |
| 2003/0053123 A1* | 3/2003 | Wu et al. ............ 358/1.15 |
| 2003/0063313 A1 | 4/2003 | Ito |
| 2003/0065766 A1 | 4/2003 | Parry |
| 2003/0065791 A1 | 4/2003 | Garg et al. |
| 2003/0074267 A1 | 4/2003 | Acharya et al. |
| 2003/0074312 A1 | 4/2003 | White |
| 2003/0081240 A1 | 5/2003 | Soto et al. |
| 2003/0084114 A1 | 5/2003 | Simpson et al. |
| 2003/0084302 A1 | 5/2003 | de Jong et al. |
| 2003/0088642 A1 | 5/2003 | Price et al. |
| 2003/0123112 A1 | 7/2003 | Kajita et al. |
| 2003/0142351 A1 | 7/2003 | Sakura |
| 2003/0164987 A1 | 9/2003 | Enomoto et al. |
| 2003/0167336 A1 | 9/2003 | Iwamoto et al. |
| 2003/0174356 A1 | 9/2003 | Cherry et al. |
| 2003/0182632 A1 | 9/2003 | Murdock et al. |
| 2003/0184552 A1 | 10/2003 | Chadha |
| 2003/0184590 A1 | 10/2003 | Will |
| 2003/0184782 A1 | 10/2003 | Perkins |
| 2003/0187922 A1 | 10/2003 | Ohara |
| 2003/0188193 A1 | 10/2003 | Venkataramappa |
| 2003/0197883 A1 | 10/2003 | Lay et al. |
| 2003/0225796 A1 | 12/2003 | Matsubara |
| 2003/0225829 A1 | 12/2003 | Pena et al. |
| 2003/0225894 A1 | 12/2003 | Ito |
| 2003/0231196 A1 | 12/2003 | Keohane et al. |
| 2003/0233437 A1 | 12/2003 | Kitada et al. |
| 2004/0003341 A1 | 1/2004 | alSafadi et al. |
| 2004/0008363 A1 | 1/2004 | Suzuki et al. |
| 2004/0012628 A1 | 1/2004 | Kropf et al. |
| 2004/0012644 A1 | 1/2004 | Allen et al. |
| 2004/0030693 A1 | 2/2004 | Toda |
| 2004/0034786 A1 | 2/2004 | Okamoto et al. |
| 2004/0034807 A1 | 2/2004 | Rostowfske |
| 2004/0039990 A1 | 2/2004 | Bakar et al. |
| 2004/0044779 A1 | 3/2004 | Lambert |
| 2004/0054573 A1 | 3/2004 | Shah et al. |
| 2004/0061729 A1 | 4/2004 | Green |
| 2004/0064759 A1 | 4/2004 | McGuire et al. |
| 2004/0068693 A1 | 4/2004 | Rawat et al. |
| 2004/0070606 A1 | 4/2004 | Yang et al. |
| 2004/0080511 A1 | 4/2004 | Gilbert |
| 2004/0080771 A1 | 4/2004 | Mihira et al. |
| 2004/0080778 A1 | 4/2004 | Ito et al. |
| 2004/0093515 A1 | 5/2004 | Reeves, Jr. |
| 2004/0098165 A1 | 5/2004 | Butikofer |
| 2004/0098316 A1 | 5/2004 | Philippe et al. |
| 2004/0098595 A1 | 5/2004 | Apperle et al. |
| 2004/0105104 A1 | 6/2004 | Ishikawa et al. |
| 2004/0105122 A1 | 6/2004 | Schaeffer |
| 2004/0109028 A1 | 6/2004 | Stern et al. |
| 2004/0111670 A1 | 6/2004 | Sasakuma et al. |
| 2004/0113941 A1 | 6/2004 | Sliwa et al. |
| 2004/0117358 A1 | 6/2004 | von Kaenel et al. |
| 2004/0117784 A1 | 6/2004 | Endoh |
| 2004/0125403 A1 | 7/2004 | Furst et al. |
| 2004/0128349 A1 | 7/2004 | Maruyama |
| 2004/0130744 A1 | 7/2004 | Wu et al. |
| 2004/0130749 A1 | 7/2004 | Aoki |
| 2004/0133525 A1 | 7/2004 | Singh et al. |
| 2004/0150663 A1 | 8/2004 | Kim |
| 2004/0158471 A1 | 8/2004 | Davis et al. |
| 2004/0161257 A1 | 8/2004 | Ishihara |
| 2004/0162076 A1 | 8/2004 | Chowdry et al. |
| 2004/0165209 A1 | 8/2004 | Aoki et al. |
| 2004/0169881 A1 | 9/2004 | Sato |
| 2004/0179229 A1 | 9/2004 | Laughlin |
| 2004/0187018 A1 | 9/2004 | Owen et al. |
| 2004/0193678 A1 | 9/2004 | Trufinescu et al. |
| 2004/0199538 A1 | 10/2004 | Matsuda et al. |
| 2004/0203358 A1 | 10/2004 | Anderson |
| 2004/0205118 A1 | 10/2004 | Yu |
| 2004/0205533 A1 | 10/2004 | Lopata et al. |
| 2004/0205620 A1 | 10/2004 | Nishikiori et al. |
| 2004/0212823 A1 | 10/2004 | Chavers et al. |
| 2004/0215671 A1 | 10/2004 | Hyakutake et al. |
| 2004/0221231 A1 | 11/2004 | Madril et al. |
| 2004/0223778 A1 | 11/2004 | Zwiefelhofer |
| 2004/0226993 A1 | 11/2004 | Fulcher et al. |
| 2004/0227968 A1 | 11/2004 | Nakamura et al. |
| 2004/0230500 A1 | 11/2004 | Imago |
| 2004/0236862 A1 | 11/2004 | Ito |
| 2004/0254955 A1 | 12/2004 | Reese et al. |
| 2004/0255263 A1 | 12/2004 | Ando |
| 2004/0268229 A1 | 12/2004 | Paoli et al. |
| 2004/0268306 A1 | 12/2004 | Cheng et al. |
| 2005/0005094 A1 | 1/2005 | Jamieson et al. |
| 2005/0015472 A1 | 1/2005 | Catania et al. |
| 2005/0015585 A1 | 1/2005 | Kurose |
| 2005/0026593 A1 | 2/2005 | Anderson et al. |
| 2005/0028086 A1 | 2/2005 | Itavaara et al. |
| 2005/0044248 A1 | 2/2005 | Mihira et al. |
| 2005/0055475 A1 | 3/2005 | MacKay et al. |
| 2005/0057560 A1 | 3/2005 | Bibr et al. |
| 2005/0060046 A1 | 3/2005 | Ito et al. |
| 2005/0060564 A1 | 3/2005 | Murakami et al. |

| | | | | | | |
|---|---|---|---|---|---|---|
| 2005/0063010 A1 | 3/2005 | Giannetti | | JP | 2002351644 | 12/2002 |
| 2005/0068581 A1 | 3/2005 | Hull et al. | | JP | 2003022258 | 1/2003 |
| 2005/0071507 A1 | 3/2005 | Ferlitsch | | JP | 2003050781 | 2/2003 |
| 2005/0071746 A1 | 3/2005 | Hart et al. | | JP | 2003157155 A | 5/2003 |
| 2005/0080649 A1 | 4/2005 | Alvarez et al. | | JP | 2003178023 | 6/2003 |
| 2005/0091087 A1 | 4/2005 | Smith et al. | | JP | 2003196554 A | 7/2003 |
| 2005/0091490 A1 | 4/2005 | Ogura | | JP | 2003198792 | 7/2003 |
| 2005/0097458 A1 | 5/2005 | Wilson | | JP | 2003208484 | 7/2003 |
| 2005/0108353 A1 | 5/2005 | Yamamoto | | JP | 2003209644 | 7/2003 |
| 2005/0114267 A1 | 5/2005 | Miwa et al. | | JP | 2003216368 | 7/2003 |
| 2005/0114658 A1 | 5/2005 | Dye et al. | | JP | 2003216395 A | 7/2003 |
| 2005/0114766 A1 | 5/2005 | Yamamoto | | JP | 2003223299 | 8/2003 |
| 2005/0119955 A1 | 6/2005 | Dang et al. | | JP | 2003260853 | 9/2003 |
| 2005/0129423 A1 | 6/2005 | Lester et al. | | JP | 2003281227 | 10/2003 |
| 2005/0149576 A1 | 7/2005 | Marmaros et al. | | JP | 2003288179 | 10/2003 |
| 2005/0152334 A1 | 7/2005 | Okamoto et al. | | JP | 2003308195 | 10/2003 |
| 2005/0185217 A1 | 8/2005 | Nishizawa et al. | | JP | 200430448 | 1/2004 |
| 2005/0195221 A1 | 9/2005 | Berger et al. | | JP | 2004074530 | 3/2004 |
| 2005/0210399 A1 | 9/2005 | Filner et al. | | JP | 2004088561 | 3/2004 |
| 2005/0223413 A1 | 10/2005 | Duggan et al. | | JP | 2004094313 | 3/2004 |
| 2005/0231747 A1 | 10/2005 | Bledsoe et al. | | JP | 2004128561 | 4/2004 |
| 2005/0231755 A1 | 10/2005 | Araumi et al. | | JP | 2004118549 | 5/2004 |
| 2005/0246428 A1 | 11/2005 | Araumi | | JP | 2004164157 A | 6/2004 |
| 2005/0257134 A1 | 11/2005 | Goodman et al. | | JP | 2004185396 | 7/2004 |
| 2005/0257148 A1 | 11/2005 | Goodman et al. | | JP | 2004213356 | 7/2004 |
| 2005/0265744 A1 | 12/2005 | Uruta | | JP | 2004215309 | 7/2004 |
| 2006/0007480 A1 | 1/2006 | Yokokura | | JP | 2004222247 | 8/2004 |
| 2006/0010180 A1 | 1/2006 | Kawamura et al. | | JP | 2004228686 | 8/2004 |
| 2006/0015734 A1 | 1/2006 | Atobe | | JP | 2004228687 | 8/2004 |
| 2006/0028397 A1 | 2/2006 | O'Rourke | | JP | 2004240752 | 8/2004 |
| 2006/0031411 A1 | 2/2006 | Gimson et al. | | JP | 2004246771 | 9/2004 |
| 2006/0038004 A1 | 2/2006 | Rielly et al. | | JP | 2004310326 | 11/2004 |
| 2006/0045386 A1 | 3/2006 | Fukuoka et al. | | JP | 2004310516 | 11/2004 |
| 2006/0056873 A1 | 3/2006 | Kimura | | JP | 2004276271 | 12/2004 |
| 2006/0059434 A1 | 3/2006 | Boss et al. | | JP | 2004358800 | 12/2004 |
| 2006/0064647 A1 | 3/2006 | Tapuska et al. | | JP | 2005014591 | 1/2005 |
| 2006/0077423 A1 | 4/2006 | Mathieson et al. | | JP | 2005033460 | 2/2005 |
| 2006/0077432 A1 | 4/2006 | Lovat et al. | | JP | 2005059496 | 3/2005 |
| 2006/0077439 A1 | 4/2006 | Yamamura et al. | | JP | 2005078278 | 3/2005 |
| 2006/0077444 A1 | 4/2006 | Lum et al. | | JP | 2005084891 | 3/2005 |
| 2006/0085835 A1 | 4/2006 | Istvan et al. | | JP | 2005115543 | 4/2005 |
| 2006/0112123 A1 | 5/2006 | Clark et al. | | JP | 2005004243 | 6/2005 |
| 2006/0154227 A1 | 7/2006 | Rossi et al. | | JP | 2005209059 | 8/2005 |
| 2006/0162076 A1 | 7/2006 | Bartlett et al. | | JP | 2005219440 A | 8/2005 |
| 2006/0198653 A1 | 9/2006 | Plewnia et al. | | JP | 2005235034 A | 9/2005 |
| 2006/0224405 A1 | 10/2006 | White et al. | | JP | 2005269250 | 9/2005 |
| 2006/0235742 A1 | 10/2006 | Castellanos et al. | | JP | 2006053905 | 2/2006 |
| 2006/0279475 A1 | 12/2006 | Lum et al. | | JP | 2006140898 | 6/2006 |
| 2007/0022180 A1 | 1/2007 | Cocotis et al. | | WO | WO 0118754 A1 | 3/2001 |
| 2007/0041035 A1 | 2/2007 | Sembower et al. | | WO | WO01/33381 | 5/2001 |
| 2007/0094103 A1 | 4/2007 | Hyakutake et al. | | WO | WO 0198864 | 12/2001 |
| 2007/0173266 A1 | 7/2007 | Barnes, Jr. | | | | |
| 2007/0174894 A1 | 7/2007 | Matsunaga | | | | |
| 2007/0186150 A1 | 8/2007 | Rao et al. | | | | |
| 2008/0072162 A1 | 3/2008 | Dauerer et al. | | | | |

FOREIGN PATENT DOCUMENTS

| | | |
|---|---|---|
| JP | 09160441 | 12/1995 |
| JP | 08234945 | 9/1996 |
| JP | 09293036 | 11/1997 |
| JP | 09330190 | 12/1997 |
| JP | 10013695 | 1/1998 |
| JP | 10154190 A | 6/1998 |
| JP | 10240490 | 9/1998 |
| JP | 10269184 | 10/1998 |
| JP | 2000112691 | 4/2000 |
| JP | 2000174949 | 6/2000 |
| JP | 2000207108 | 7/2000 |
| JP | 2002259071 | 2/2001 |
| JP | 2001268296 | 9/2001 |
| JP | 200284383 | 3/2002 |
| JP | 2002140195 | 5/2002 |
| JP | 2002171380 | 6/2002 |
| JP | 2002175195 | 6/2002 |
| JP | 2002221877 | 8/2002 |
| JP | 2002236830 | 8/2002 |
| JP | 2002298049 A | 10/2002 |
| JP | 2002312148 | 10/2002 |
| JP | 2002330253 | 11/2002 |

OTHER PUBLICATIONS

R. Herriot, Internet Printing Protocol (IPP): Event Notifications and Subscriptions (Feb. 21, 2003, retrieved from http://tools.ietf.org/html/draft-ietf-ipp-not-spec-11 on Aug. 20, 2008, pp. 1-101).

T. Hastings, "Internet Printing Protocol/1.1: Model and Semantics" (Sep. 2000, retrieved from http://www.ietf.org/rfc/rfc291.txt on Sep. 18, 2008, pp. 1-210).

R. Herriot, Internet Printing Protocol (IPP): Event Notifications and Subscriptions, Jun. 21, 2004, http://tools.ietf.org/html/draft-ietf-ipp-not-spec-12, pp. 1-98.

Microsoft Corporation. Microsoft Computer Dictionary, Fifth Edition, 2002 Microsoft Press, pp. 487-488.

Gaedke, Martin et al. "A Modeling Approach to Federated Identity and Access Management", May 2005 ACM.

FOLDOC. "relational database", Jun. 2002, retrieved from <http://foldoc.org/index.cgi?query=relational+database>.

OASIS. "Security Assertion Markup Language (SAML) 2.0 Technical Overview", Working Draft 01, Jul. 22, 2004, <http://www.oasis-open.org/committees/documents.php?wg_abbrev=security>.

Hartman, Bret et al. Mastering Web Services Security, 2003 Wiley Publishing, Inc., pp. 36-46.

U.S. Appl. No. 10/962,248—Office Action dated Aug. 19, 2008.

U.S. Appl. No. 10/961,793—Office Action dated Jun. 20, 2008.

U.S. Appl. No. 10/961,793—Office Action dated Dec. 19, 2008.

U.S. Appl. No. 10/961,911—Office Action dated Oct. 28, 2008.
U.S. Appl. No. 10/961,594—Office Action dated Dec. 3, 2008.
U.S. Appl. No. 10/961,594—Office Action dated Mar. 16, 2009.
U.S. Appl. No. 10/962,103—Office Action dated Jul. 9, 2008.
U.S. Appl. No. 10/962,103—Office Action dated Jan. 23, 2009.
U.S. Appl. No. 11/232,827—Office Action dated Dec. 5, 2008.
U.S. Appl. No. 11/073,055—Office Action dated Sep. 18, 2008.
U.S. Appl. No. 11/073,055—Office Action dated Mar. 4, 2009.
U.S. Appl. No. 11/233,202—Office Action dated Jun. 5, 2008.
U.S. Appl. No. 11/233,202—Office Action dated Dec. 1, 2008.
U.S. Appl. No. 11/233,201—Office Action dated Oct. 3, 2008.
U.S. Appl. No. 11/232,552—Office Action dated Nov. 18, 2008.
U.S. Appl. No. 11/233,270—Office Action dated Sep. 17, 2008.
U.S. Appl. No. 11/241,501—Office Action dated Oct. 23, 2008.
U.S. Appl. No. 11/241,497—Office Action dated Feb. 20, 2009.
U.S. Appl. No. 11/241,497—Office Action dated Aug. 27, 2008.
U.S. Appl. No. 11/241,011—Office Action dated Oct. 8, 2008.
U.S. Appl. No. 11/241,010—Office Action dated Oct. 9, 2008.
U.S. Appl. No. 11/241,071—Office Action dated Mar. 3, 2009.
U.S. Appl. No. 11/241,071—Office Action dated Sep. 19, 2008.
U.S. Appl. No. 11/241,447—Office Action dated Mar. 5, 2009.
U.S. Appl. No. 11/241,447—Office Action dated Sep. 15, 2008.
U.S. Appl. No. 11/241,498—Office Action dated Sep. 16, 2008.
U.S. Appl. No. 11/241,498—Office Action dated Mar. 5, 2009.
U.S. Appl. No. 11/240,039—Office Action dated Oct. 20, 2008.
U.S. Appl. No. 11/240,156—Office Action dated Aug. 28, 2008.
U.S. Appl. No. 11/240,156—Office Action dated Feb. 20, 2009.
U.S. Appl. No. 11/255,611—Office Action dated Mar. 12, 2009.
U.S. Appl. No. 11/256,479—Office Action dated Nov. 4, 2008.
U.S. Appl. No. 11/255,333—Office Action dated Mar. 13, 2009.
U.S. Appl. No. 11/193,154—Office Action dated Dec. 2, 2008.
U.S. Appl. No. 11/192,630—Office Action dated Jan. 21, 2009.
U.S. Appl. No. 11/192,546—Office Action dated Jan. 22, 2009.
U.S. Appl. No. 11/192,836—Office Action dated Jul. 9, 2008.
U.S. Appl. No. 11/193,147—Office Action dated Jul. 9, 2008.
U.S. Appl. No. 11/192,868—Office Action dated Feb. 2, 2009.
U.S. Appl. No. 11/192,629—Office Action dated Jan. 22, 2009.
U.S. Appl. No. 11/193,151—Office Action dated Feb. 23, 2009.
U.S. Appl. No. 11/193,188—Office Action dated Jan. 21, 2009.
U.S. Appl. No. 11/193,140—Office Action dated Nov. 18, 2008.
U.S. Appl. No. 11/192,796—Office Action dated Feb. 24, 2009.
U.S. Appl. No. 11/192,547—Office Action dated Feb. 5, 2009.
U.S. Appl. No. 11/240,084—Office Action dated Oct. 30, 2008.
U.S. Appl. No. 11/218,033—Office Action dated Sep. 12, 2008.
U.S. Appl. No. 10/961,911—Office Action dated Apr. 16, 2008.
U.S. Appl. No. 10/961,594—Office Action dated Jan. 7, 2008.
U.S. Appl. No. 11/193,077—Office Action dated Apr. 6, 2007.
U.S. Appl. No. 11/192,836—Office Action dated Dec. 5, 2007.
U.S. Appl. No. 11/192,836—Office Action dated Jul. 3, 2007.
U.S. Appl. No. 11/192,836—Office Action dated Jan. 30, 2007.
U.S. Appl. No. 11/193,147—Office Action dated Dec. 6, 2007.
U.S. Appl. No. 11/193,147—Office Action dated Jul. 23, 2007.
U.S. Appl. No. 11/193,147—Office Action dated Feb. 9, 2007.
Canon USA, Inc.; MEAP Multifunctional Embedded Application Platform; Aug. 2004; http://developersupportcanon.com/Web_MEAP_Presentation.pdf.
Canon USA, Inc.; MEAP: FAQ; accessed on Jul. 2004, pub. date unknown; http://developersupport.canon.com/MEAP.htm.
Xerox, Inc.; Xerox FreeFlow digital workflow collection; 2003; http://www.xerox.com/downloads/usa/en/s/solutions_digital_workflow_whitepaper_sdk.pdf.
Ricoh Company, Ltd.; Ricoh's Medium-Term Management Plan; Mar. 19, 2002; http://www.ricoh.com/IR/data/pre/pdf/ir_pre2002.pdf.
Ricoh Company, Ltd.; White Paper: Embedded Software Architecture SDK; Jun. 25, 2003; http://www.ricoh-usa.com/products/concept/esa.asp?catname=ESA.
Hewlett-Packard Company; JetCAPS Scan2Folder; 2003; http://www.jetcaps.se/resources/datasheets/ds_scan2folder.pdf.
Hewlett-Packard Company; JetCAPS chai applications; Dec. 9, 2002; http://www.stethos.com/chai/data/d_us_chai.pdf.
Foreign Patent App. No. JP2006205150—Office Action filed for a related foreign application dated Sep. 28, 2010 corresponding to U.S. Appl. No. 11/192,500.
Foreign Patent App. No. JP2006207198—Office Action filed for a related foreign application dated Sep. 21, 2010 corresponding to U.S. Appl. No. 11/192,836.
Foreign Patent App. No. JP2006256441—Office Action filed for a related foreign application dated Nov. 9, 2010 corresponding to U.S. Appl. No. 11/233,202.
Foreign Patent App. No. JP2006256440—Office Action filed for a related foreign application dated Oct. 19, 2010 corresponding to U.S. Appl. No. 11/233,270.
U.S. Appl. No. 10/961,793—Non-Final Office Action dated Oct. 28, 2010.
U.S. Appl. No. 10/961,911—Final Office Action dated Oct. 20, 2010.
U.S. Appl. No. 11/073,055—Non-Final Office Action dated Nov. 23, 2010.
U.S. Appl. No. 11/233,270—Notice of Allowance dated Nov. 30, 2010.
U.S. Appl. No. 11/241,010—Final Office Action dated Oct. 15, 2010.
U.S. Appl. No. 11/240,156—Non-Final Office Action dated Nov. 10, 2010.
U.S. Appl. No. 11/256,479—Non-Final Office Action dated Nov. 23, 2010.
U.S. Appl. No. 11/193,152—Non-Final Office Action dated Mar. 1, 2010.
U.S. Appl. No. 11/193,152—Final Office Action dated Nov. 18, 2010.
U.S. Appl. No. 11/193,151—Non-Final Office Action dated Mar. 29, 2010.
U.S. Appl. No. 11/193,151—Final Office Action dated Nov. 2, 2010.
U.S. Appl. No. 11/192,824—Final Office Action dated Oct. 22, 2010.
U.S. Appl. No. 11/465,747—Final Office Action dated Mar. 9, 2010.
U.S. Appl. No. 11/241,447—Non-Final Office Action dated Dec. 8, 2010.
U.S. Appl. No. 11/193,076—Final Office Action dated Jan. 6, 2011.
U.S. Appl. No. 11/192,630—Final Office Action dated Dec. 8, 2010.
U.S. Appl. No. 11/192,868—Final Office Action dated Dec. 8, 2010.
U.S. Appl. No. 11/193,188—Final Office Action dated Dec. 8, 2010.
U.S. Appl. No. 11/192,615—Non-Final Office Action dated Jan. 4, 2011.
U.S. Appl. No. 11/192,467—Notice of Allowance dated Dec. 22, 2010.
U.S. Appl. No. 11/465,747—Notice of Allowance dated Dec. 28, 2010.
Ratha, N.K., Connell, J.H., Bolle, R.M. "Enhancing security and privacy in biometrics-based authentication systems". IBM Systems Journal 40(3), pp. 614-634 (2001).
U.S. Appl. No. 10/962,248—Final Office Action dated Jun. 10, 2009.
U.S. Appl. No. 10/962,248—Non-Final Office Action dated Jan. 29, 2010.
U.S. Appl. No. 11/232,588—Non-Final Office Action dated Apr. 1, 2009.
U.S. Appl. No. 11/232,588—Final Office Action dated Nov. 27, 2009.
U.S. Appl. No. 10/961,793—Non-Final Office Action dated Jun. 24, 2009.
U.S. Appl. No. 10/961,793—Final Office Action dated Feb. 4, 2010.
U.S. Appl. No. 10/961,911—Non-Final Office Action dated Jun. 8, 2009.
U.S. Appl. No. 10/961,911—Non-Final Office Action dated Feb. 3, 2010.
U.S. Appl. No. 10/962,103—Non-Final Office Action dated Aug. 14, 2009.
U.S. Appl. No. 11/232,827—Final Office Action dated Jun. 4, 2009.
U.S. Appl. No. 11/232,827—Non-Final Office Action dated Dec. 1, 2009.
U.S. Appl. No. 11/073,055—Non-Final Office Action dated Jun. 19, 2009.
U.S. Appl. No. 11/073,055—Final Office Action dated Feb. 18, 2010.
U.S. Appl. No. 11/233,202—Non-Final Office Action dated Jun. 9, 2009.
U.S. Appl. No. 11/233,202—Final Office Action dated Jan. 15, 2010.

U.S. Appl. No. 11/233,201—Final Office Action dated Apr. 28, 2009.
U.S. Appl. No. 11/233,201—Non-Final Office Action dated Sep. 4, 2009.
U.S. Appl. No. 11/232,552—Final Office Action dated Jun. 24, 2009.
U.S. Appl. No. 11/232,552—Non-Final Office Action dated Dec. 24, 2009.
U.S. Appl. No. 11/233,270—Final Office Action dated Mar. 31, 2009.
U.S. Appl. No. 11/233,270—Final Office Action dated Nov. 27, 2009.
U.S. Appl. No. 11/465,699—Non-Final Office Action dated Sep. 17, 2008.
U.S. Appl. No. 11/465,699—Final Office Action dated Mar. 31, 2009.
U.S. Appl. No. 11/465,699—Final Office Action dated Nov. 27, 2009.
U.S. Appl. No. 11/465,722—Non-Final Office Action dated Dec. 24, 2009.
U.S. Appl. No. 11/241,501—Final Office Action dated May 13, 2009.
U.S. Appl. No. 11/241,501—Non-Final Office Action dated Feb. 9, 2010.
U.S. Appl. No. 11/241,497—Non-Final Office Action dated Oct. 6, 2009.
U.S. Appl. No. 11/241,011—Final Office Action dated Apr. 2, 2009.
U.S. Appl. No. 11/241,011—Non-Final Office Action dated Jan. 4, 2010.
U.S. Appl. No. 11/241,010—Final Office Action dated Mar. 20, 2009.
U.S. Appl. No. 11/241,071—Non-Final Office Action dated Aug. 19, 2009.
U.S. Appl. No. 11/241,447—Non-Final Office Action dated Jul. 22, 2009.
U.S. Appl. No. 11/241,498—Non-Final Office Action dated Dec. 10, 2009.
U.S. Appl. No. 11/240,039—Final Office Action dated Apr. 13, 2009.
U.S. Appl. No. 11/240,039—Non-Final Office Action dated Nov. 3, 2009.
U.S. Appl. No. 11/240,156—Non-Final Office Action dated Sep. 16, 2009.
U.S. Appl. No. 11/255,611—Notice of Allowance dated Aug. 10, 2009.
U.S. Appl. No. 11/256,479—Final Office Action dated Apr. 1, 2009.
U.S. Appl. No. 11/256,479—Non-Final Office Action dated Nov. 16, 2009.
U.S. Appl. No. 11/192,617—Non-Final Office Action dated Sep. 29, 2009.
U.S. Appl. No. 11/193,154—Non-Final Office Action dated Jun. 3, 2009.
U.S. Appl. No. 11/193,154—Final Office Action dated Dec. 7, 2009.
U.S. Appl. No. 11/192,630—Final Office Action dated Sep. 2, 2009.
U.S. Appl. No. 11/192,546—Final Office Action dated Jun. 30, 2009.
U.S. Appl. No. 11/192,546—Non-Final Office Action dated Nov. 24, 2009.
U.S. Appl. No. 11/193,077—Notice of Allowance dated Mar. 11, 2008.
U.S. Appl. No. 11/192,870—Non-Final Office Action dated Jul. 17, 2009.
U.S. Appl. No. 11/192,870—Final Office Action dated Jan. 4, 2010.
U.S. Appl. No. 11/192,865—Non-Final Office Action dated Aug. 20, 2009.
U.S. Appl. No. 11/192,836—Notice of Allowance dated Dec. 30, 2008.
U.S. Appl. No. 11/192,616—Non-Final Office Action dated Sep. 17, 2009.
U.S. Appl. No. 11/193,147—Notice of Allowance dated Dec. 30, 2008.
U.S. Appl. No. 11/192,868—Final Office Action dated Aug. 11, 2009.
U.S. Appl. No. 11/192,629—Final Office Action dated Jun. 26, 2009.
U.S. Appl. No. 11/192,629—Non-Final Office Action dated Jan. 15, 2010.
U.S. Appl. No. 11/193,151—Final Office Action dated Sep. 21, 2009.
U.S. Appl. No. 11/193,188—Final Office Action dated Aug. 5, 2009.
U.S. Appl. No. 11/192,824—Non-Final Office Action dated Sep. 18, 2009.
U.S. Appl. No. 11/193,140—Final Office Action dated May 18, 2009.
U.S. Appl. No. 11/193,140—Notice of Allowance dated Jan. 29, 2010.
U.S. Appl. No. 11/192,796—Non-Final Office Action dated Dec. 28, 2009.
U.S. Appl. No. 11/192,615—Non-Final Office Action dated Sep. 4, 2009.
U.S. Appl. No. 11/192,547—Final Office Action dated Jan. 15, 2010.
U.S. Appl. No. 11/192,467—Non-Final Office Action dated Nov. 13, 2009.
U.S. Appl. No. 11/255,333—Notice of Allowance dated Nov. 3, 2009.
U.S. Appl. No. 11/465,747—Non-Final Office Action dated Jun. 24, 2009.
U.S. Appl. No. 11/465,752—Non-Final Office Action dated Jun. 24, 2009.
U.S. Appl. No. 11/241,320—Non-Final Office Action dated Oct. 7, 2009.
U.S. Appl. No. 11/240,139—Non- Final Office Action dated Oct. 6, 2009.
U.S. Appl. No. 11/240,084—Final Office Action dated Apr. 15, 2009.
U.S. Appl. No. 11/240,084—Non-Final Office Action dated Dec. 16, 2009.
U.S. Appl. No. 11/218,033—Final Office Action dated Mar. 30, 2009.
U.S. Appl. No. 11/218,033—Non-Final Office Action dated Sep. 8, 2009.
U.S. Appl. No. 11/562,342—Non-Final Office Action dated May 29, 2009.
U.S. Appl. No. 11/562,342—Final Office Action dated Dec. 21, 2009.
U.S. Appl. No. 11/685,046—Non-Final Office Action dated Jul. 8, 2009.
U.S. Appl. No. 11/685,046—Final Office Action dated Dec. 21, 2009.
JP Patent App. No. 2006-261563—Office Action filed for a related foreign application dated Jan. 19, 2010.
JP Patent App. No. 2006-207199—Office Action filed for a related foreign application dated Feb. 2, 2010.
JP Patent App. No. 2006-058600—Office Action filed for a related foreign application dated Aug. 18, 2009.
JP Patent App. No. 2005-295772—Office Action filed for a related foreign application dated Sep. 15, 2009.
JP Patent App. No. 2005-295772—Notice of Allowance filed for a related foreign application dated Dec. 15, 2009.
JP Patent App. No. 2006-207200—Office Action filed for a related foreign application dated Feb. 2, 2010.
JP Patent App. No. 2006-207194—Office Action filed for a related foreign application dated Jan. 12, 2010.
JP Patent App. No. 2006-261564—Office Action filed for a related foreign application dated Jan. 19, 2010.
JP Patent App. No. 2006-207199—Office Action filed for a related foreign application dated Nov. 17, 2009.
JP Patent App. No. 2007-225913—Office Action filed for a related foreign application dated Dec. 24, 2009.
JP Patent App. No. 2006-256442—Office Action filed for a related foreign application dated Jul. 14, 2009.
JP Patent App. No. 2006-207194—Office Action filed for a related foreign application dated Jun. 23, 2009.
Foreign Patent App. No. JP2006-058600—Office Action filed for a related foreign application dated Aug. 18, 2009 corresponding to U.S. Appl. No. 11/073,055.
Foreign Patent App. No. JP2006-207200—Office Action filed for a related foreign application dated Jun. 1, 2010 corresponding to U.S. Appl. No. 11/192,547.
Foreign Patent App. No. JP2006-207196—Office Action filed for a related foreign application dated Mar. 2, 2010 corresponding to U.S. Appl. No. 11/192,862.

Foreign Patent App. No. JP2006-256441—Office Action filed for a related foreign application dated Mar. 30, 2010 corresponding to U.S. Appl. No. 11/233,202.
Foreign Patent App. No. JP2006-207198—Office Action filed for a related foreign application dated Mar. 2, 2010 corresponding to U.S. Appl. No. 11/192,616.
U.S. Appl. No. 10/961,594—Final Office Action dated Apr. 2, 2010.
U.S. Appl. No. 10/962,103—Non-final Office Action dated May 14, 2010.
U.S. Appl. No. 11/232,827—Final Office Action dated Jun. 14, 2010.
U.S. Appl. No. 11/233,201—Final Office Action dated Jun. 3, 2010.
U.S. Appl. No. 11/232,588—Notice of Allowance dated Jun. 23, 2010.
U.S. Appl. No. 11/233,270—Non-final Office Action dated Jun. 9, 2010.
U.S. Appl. No. 11/465,699—Non-final Office Action dated Nov. 16, 2009.
U.S. Appl. No. 11/465,699—Final Office Action dated May 24, 2010.
U.S. Appl. No. 11/465,722—Final Office Action dated Apr. 30, 2010.
U.S. Appl. No. 11/241,011—Final Office Action dated Jun. 29, 2010.
U.S. Appl. No. 11/241,010—Non-final Office Action dated Apr. 15, 2010.
U.S. Appl. No. 11/241,071—Final Office Action dated Apr. 16, 2010.
U.S. Appl. No. 11/241,447—Final Office Action dated Apr. 1, 2010.
U.S. Appl. No. 11/240,039—Notice of Allowance dated Jun. 3, 2010.
U.S. Appl. No. 11/240,156—Final Office Action dated Mar. 31, 2010.
U.S. Appl. No. 11/256,479—Final Office Action dated May 13, 2010.
U.S. Appl. No. 11/192,617—Final Office Action dated Jun. 11, 2010.
U.S. Appl. No. 11/193,076—Non-final Office Action dated Apr. 5, 2010.
U.S. Appl. No. 11/192,630—Non-final Office Action dated Apr. 9, 2010.
U.S. Appl. No. 11/192,546—Final Office Action dated Jul. 14, 2010.
U.S. Appl. No. 11/192,937—First Action Interview Pilot Program Pre-Interview Communication dated Apr. 7, 2010.
U.S. Appl. No. 11/192,616—Final Office Action dated May 26, 2010.
U.S. Appl. No. 11/192,500—Non-final Office Action dated Jul. 21, 2010.
U.S. Appl. No. 11/192,868—Non-final Office Action dated May 19, 2010.
U.S. Appl. No. 11/193,188—Non-final Office Action dated Apr. 19, 2010.
U.S. Appl. No. 11/192,824—Non-final Office Action dated Mar. 1, 2010.
U.S. Appl. No. 11/192,615—Final Office Action dated Apr. 20, 2010.
U.S. Appl. No. 11/192,547—Non-final Office Action dated Jun. 25, 2010.
U.S. Appl. No. 11/192,467—Final Office Action dated Jun. 25, 2010.
U.S. Appl. No. 11/256,493—Non-final Office Action dated Mar. 9, 2010.
U.S. Appl. No. 11/465,752—Final Office Action dated Apr. 2, 2010.
U.S. Appl. No. 11/241,320—Final Office Action dated Jun. 17, 2010.
U.S. Appl. No. 11/240,139—Final Office Action dated Jun. 9, 2010.
U.S. Appl. No. 11/536,115—Non-final Office Action dated Jun. 15, 2010.
U.S. Appl. No. 11/218,033—Final Office Action dated May 14, 2010.
E. Uemukai Toshiaki, A WWW Browsing System in Remote Display Environments, IPSJ magazine, Information Processing Society of Japan, Publication Date: Sep. 15, 2000, vol. 41, No. 9, p. 2364 to 2373.
Foreign Patent App. No. JP2006256440—Office Action filed for a related foreign application dated Jun. 7, 2010 corresponding to U.S. Appl. No. 11/233,270.
Foreign Patent App. No. JP2006261564—Office Action filed for a related foreign application dated Jun. 15, 2010 corresponding to U.S. Appl. No. 11/241,010.
Foreign Patent App. No. JP2006207195—Office Action filed for a related foreign application dated Jul. 27, 2010 corresponding to U.S. Appl. No. 11/192,617.
U.S. Appl. No. 10/962,248—Final Office Action dated Aug. 17, 2010.
U.S. Appl. No. 10/961,594—Non-Final Office Action dated Sep. 15, 2010.
U.S. Appl. No. 11/233,202—Non-Final Office Action dated Jul. 27, 2010.
U.S. Appl. No. 11/233,201—Non-Final Office Action dated Sep. 15, 2010.
U.S. Appl. No. 11/232,552—Final Office Action dated Aug. 19, 2010.
U.S. Appl. No. 11/241,501—Final Office Action dated Jul. 22, 2010.
U.S. Appl. No. 11/241,497—Notice of Allowance dated Aug. 11, 2010.
U.S. Appl. No. 11/241,498—Final Office Action dated Jul. 22, 2010.
U.S. Appl. No. 11/192,862—Non-Final Office Action dated Jul. 26, 2010.
U.S. Appl. No. 11/192,937—Notice of Allowance dated Sep. 7, 2010.
U.S. Appl. No. 11/192,865—Final Office Action dated Mar. 4, 2010.
U.S. Appl. No. 11/192,865—Non-Final Office Action dated Sep. 2, 2010.
U.S. Appl. No. 11/192,629—Final Office Action dated Aug. 25, 2010.
U.S. Appl. No. 11/192,796—Notice of Allowance dated Sep. 10, 2010.
U.S. Appl. No. 11/256,493—Final Office Action dated Aug. 20, 2010.
U.S. Appl. No. 11/240,084—Final Office Action dated Aug. 6, 2010.
Foreign Patent App. No. JP2006261563—Interrogation Report filed for a related foreign application dated Jun. 7, 2011 corresponding to U.S. Appl. No. 11/241,501.
Foreign Patent App. No. JP2006207200—Interrogation Report filed for a related foreign application dated Mar. 8, 2011 corresponding to U.S. Appl. No. 11/192,615.
U.S. Appl. No. 10/961,594—Final Office Action dated May 19, 2011.
U.S. Appl. No. 11/232,827—Non-Final Office Action dated May 26, 2011.
U.S. Appl. No. 11/073,055—Final Office Action dated Mar. 30, 2011.
U.S. Appl. No. 11/233,202—Final Office Action dated Mar. 23, 2011.
U.S. Appl. No. 11/465,699—Non-Final Office Action dated Mar. 23, 2011.
U.S. Appl. No. 11/241,011—Non-Final Office Action dated Feb. 17, 2011.
U.S. Appl. No. 11/192,617—Non-Final Office Action dated Jun. 9, 2011.
U.S. Appl. No. 11/192,546—Non-Final Office Action dated Feb. 17, 2011.
U.S. Appl. No. 11/192,862—Final Office Action dated Mar. 21, 2011.
U.S. Appl. No. 11/192,870—Non-Final Office Action dated Feb. 22, 2011.
U.S. Appl. No. 11/192,616—Non-Final Office Action dated Jun. 9, 2011.
U.S. Appl. No. 11/192,500—Final Office Action dated Mar. 21, 2011.
U.S. Appl. No. 11/193,151—Non-Final Office Action dated Mar. 16, 2011.
U.S. Appl. No. 11/192,824—Non-Final Office Action dated Jun. 9, 2011.
U.S. Appl. No. 11/192,547—Final Office Action dated Mar. 7, 2011.
U.S. Appl. No. 11/465,752—Non-Final Office Action dated Apr. 1, 2011.
U.S. Appl. No. 11/241,320—Non-Final Office Action dated Jun. 9, 2011.
U.S. Appl. No. 11/240,139—Non-Final Office Action dated Jun. 10, 2011.
U.S. Appl. No. 11/240,084—Non-Final Office Action dated May 12, 2011.

U.S. Appl. No. 11/536,115—Final Office Action dated Mar. 10, 2011.
U.S. Appl. No. 11/218,033—Non-Final Office Action dated Jun. 9, 2011.
U.S. Appl. No. 10/962,248—Notice of Allowance dated Apr. 1, 2011.
U.S. Appl. No. 10/961,793—Notice of Allowance dated Jun. 10, 2011.
U.S. Appl. No. 10/962,103—Notice of Allowance dated Feb. 22, 2011.
U.S. Appl. No. 11/233,201—Notice of Allowance dated Jun. 24, 2011.
U.S. Appl. No. 11/241,501—Notice of Allowance dated Feb. 17, 2011.
U.S. Appl. No. 11/241,010—Notice of Allowance dated May 27, 2011.
U.S. Appl. No. 11/241,071—Notice of Allowance dated May 3, 2011.
U.S. Appl. No. 11/241,447—Notice of Allowance dated Jul. 13, 2011.
U.S. Appl. No. 11/241,498—Notice of Allowance dated Apr. 1, 2011.
U.S. Appl. No. 11/240,156—Notice of Allowance dated Jul. 12, 2011.
U.S. Appl. No. 11/256,479—Notice of Allowance dated Jul. 13, 2011.
U.S. Appl. No. 11/192,630—Notice of Allowance dated May 31, 2011.
U.S. Appl. No. 11/192,865—Notice of Allowance dated May 19, 2011.
U.S. Appl. No. 11/192,868—Notice of Allowance dated Apr. 29, 2011.
U.S. Appl. No. 11/193,152—Notice of Allowance dated Apr. 8, 2011.
U.S. Appl. No. 11/192,629—Notice of Allowance dated Apr. 11, 2011.
U.S. Appl. No. 11/192,824—Notice of Allowance dated Apr. 20, 2011.
U.S. Appl. No. 11/256,493—Notice of Allowance dated Apr. 15, 2011.

* cited by examiner

METHODS AND SYTEMS FOR IMAGING DEVICE JOB DEFINITION

RELATED REFERENCES

This application is a continuation-in-part of U.S. patent application Ser. No. 10/962,248, entitled "Methods and Systems for Imaging Device Remote Application Interaction, filed on Oct. 8, 2004 now U.S. Pat. No. 8,018,610; this application is also a continuation-in-part of U.S. patent application Ser. No. 10/961,793, entitled "Methods and Systems for Imaging Device Remote Form Management, filed on Oct. 8, 2004 now U.S. Pat. No. 8,035,831; this application is also a continuation-in-part of U.S. patent application Ser. No. 10/961,911, entitled "Methods and Systems for Imaging Device Remote Location Functions, filed on Oct. 8, 2004; this application is also a continuation-in-part of U.S. patent application Ser. No. 10/961,594, entitled "Methods and Systems for Imaging Device Remote document Management, filed on Oct. 8, 2004; and this application is also a continuation-in-part of U.S. patent application Ser. No. 10/962,103, entitled "Methods and Systems for Imaging Device Document Translation, filed on Oct. 8, 2004 now U.S. Pat. No. 7,969,596; this application also claims the benefit of U.S. Provisional Patent Application No. 60/704,066, entitled "Methods and Systems for Imaging Device Applications," filed Jul. 28, 2005.

FIELD OF THE INVENTION

Embodiments of the present invention comprise methods and systems for imaging device job definition.

BACKGROUND OF THE INVENTION

Imaging devices such as printers, copiers, scanners and fax machines can have a wide array of functions and capabilities to fit specific uses or combinations of uses. Imaging devices often take the form of a multi-function peripheral device (MFP) that combines the functions of two or more of the traditionally separated imaging devices. An MFP may combine any number of imaging devices, but typically comprises the functions of a printer, scanner, copier and fax machine.

Some imaging devices may contain computing resources for data storage and processing such as processors, hard disk drives, memory and other devices. As imaging devices add more features and functions, they become more costly and complex.

More complex imaging devices and MFPs may comprise network connectivity to provide communication with other computing devices, such as personal computers, other imaging devices, network servers and other apparatus. This connectivity allows the imaging device to utilize off-board resources that are available on a connected network.

Imaging devices typically have a user input panel with an array of buttons, knobs and other user input devices. Some devices also have a display panel, which can be for display only or can be a touch panel display that enables user input directly on the display.

Devices with touch panel displays or displays with buttons arranged in cooperation with the display can display menu data that may be selected by user input. This menu data is typically driven by an on-board server module within the imaging device.

BRIEF SUMMARY OF THE INVENTION

Embodiments of the present invention comprise systems, methods and devices for interacting with a remote computing device from an imaging device. These embodiments comprise remote computing devices configured to communicate with imaging devices, imaging devices configured to communicate with remote computing devices and systems comprising various combinations of remote computing devices in communication with imaging devices.

Embodiments of the present invention comprise methods and systems for imaging device job definition.

The foregoing and other objectives, features, and advantages of the invention may be more readily understood upon consideration of the following detailed description of the invention taken in conjunction with the accompanying drawings.

BRIEF DESCRIPTION OF THE SEVERAL DRAWINGS

DETAILED DESCRIPTION OF PREFERRED EMBODIMENTS

Figure 1:
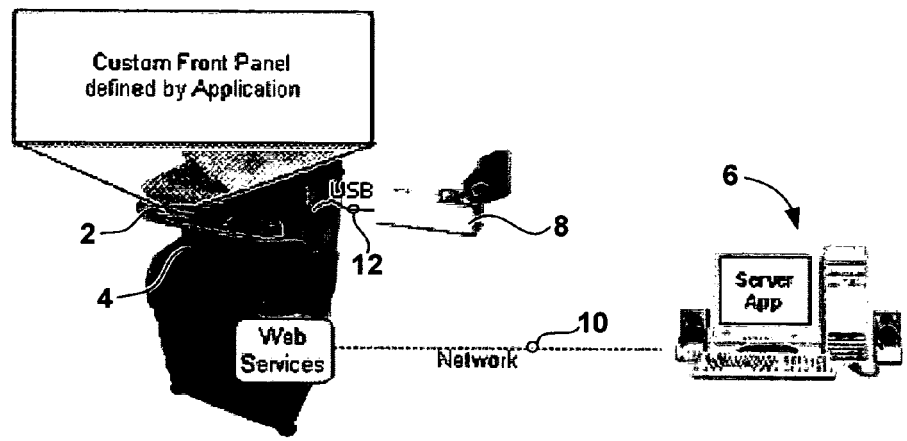
FIG. 1 is a diagram of an embodiment of the present invention comprising an imaging device in connection with a remote computing device.

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Embodiments of the present invention comprise interfaces and architecture that integrate imaging devices with remote computing device applications and environments to provide solutions that may not be possible solely with an imaging device alone. Some embodiments comprise an infrastructure and set of interfaces that allow applications on a network to programmatically control imaging device functions and interact with a user through an imaging device input panel. Software functions that are not practical within the imaging device can be performed on the server but are accessible from the imaging device.

For the purposes of this specification and claims, an imaging device (IDev) may be described as a device that performs an imaging function. Imaging functions comprise scanning, printing, copying, image transmission (sending and receiving), image conversion and other functions. Exemplary imaging devices comprise printers, copiers, facsimile machines, scanners, computing devices that transmit, convert or process images and other devices. An IDev may also perform multiple imaging functions. For example, and not by way of limitation, a multi-function peripheral device (MFP), which typically has the capability to perform a plurality of functions comprising a printer, scanner, copier and/or a facsimile machine or image transmitter/receiver, is a type of imaging device. Other MFP imaging devices may comprise other combinations of functions and still qualify as an IDev.

For the purposes of this specification and claims, a remote computing device (RCD) is a device capable of processing data and communicating with other devices through a communications link. An RCD is a remote device because it requires a communications link, such as a network connection, a telephone line, a serial cable or some other wired or wireless link to communicate with other devices such as an imaging device. Some exemplary RCDs are network servers, networked computers and other processing and storage devices that have communications links.

Figure 2:
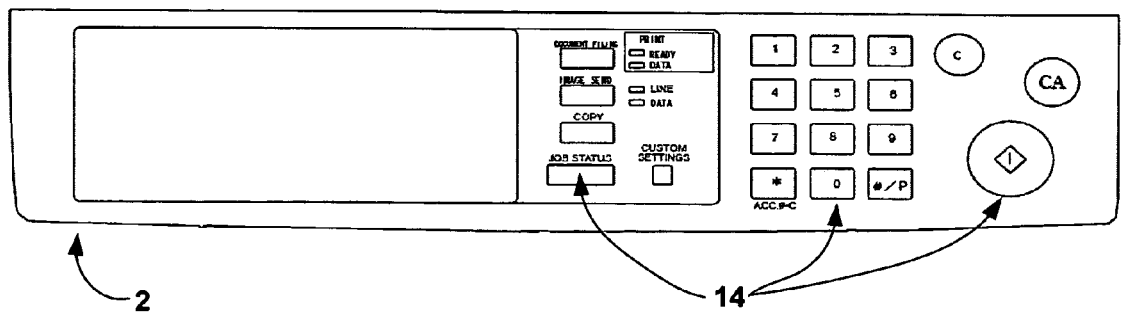
FIG. 2 is an image of an exemplary user interface for an imaging device.

Some embodiments of the present invention may be described with reference to FIGS. 1 & 2. These embodiments comprise an imaging device (IDev) 4 that may be a multi-function peripheral device (MFP) or a single function device. The imaging device 4 further comprises a user interface (UI) panel 2, which may comprise input buttons 14 and a display device 12 or may comprise a touch panel system with or without buttons 14. User input and display may also be performed through a separate UI device 8, which may be connected to the imaging device 4 by a communication link 12, such as a USB connection, a network cable, a wireless connection or some other communications link. UI device 8 may comprise an input device, such as a keyboard or buttons as well as a display device, which may also be a touch screen panel. UI device 8 may also comprise an interface for transfer of instructions that are input to the device 8 from a remote input device. This form of UI device 8 may comprise memory sticks, USB memory cards and other storage devices that may be configured to store input for transfer to an imaging device.

These embodiments further comprise a remote computing device (RCD) 6 that is linked to the imaging device 4 via a communications link 10, such as a network connection. This network connection may be a typical wired connection or a wireless link.

Embodiments of the present invention may provide menu data from the RCD 6 to the imaging device UI panel 2 or remote panel 8 via the network connection 10. Once this menu data is fed to the imaging device 4, an UI panel 2, 8 on the imaging device 4 may be used to interact with applications that run on the remote computing device 6. User input received from UI panels 2, 8 may be returned directly to the remote computing device 6.

A Web Service is a software application identified by a Uniform Resource Identifier (URI), whose interfaces and binding are capable of being defined, described and discovered by Extensible Markup Language (XML) artifacts and supports direct interactions with other software applications using XML based messages via Internet-based protocols.

An application on the remote computing device 6 may use one or more Web Services to control various features in the imaging device 4, such as enabling, disabling or setting device values or controlling device functions.

Embodiments of the present invention allow network applications running on remote computing devices to interact with the user of the imaging device through the imaging device I/O panel. These embodiments allow imaging device user interface (UI) control (i.e., touch panel, button/display) by applications. Some embodiments may also integrate custom display screens or menus with the native imaging device UI. Embodiments may hand off control of imaging device functions between standard operation modes performed on the imaging device in response to user input to an imaging device UI and open systems modes that utilize network resources, such as applications on RCDs, through user input at the imaging device UI.

Embodiments of the present invention comprise network-based applications that have full control over the imaging device UI to display text and graphics in any format. In these embodiments, the application can programmatically display buttons, textboxes, graphics, etc. in any layout desired.

In some embodiments, the UI layout is easy to program using a standard language, such as a markup language. These languages comprise Hypertext Markup Language (HTML), Extensible Markup Language (XML), Wireless Markup Language (WML), Extensible Hypertext Markup Language (XHTML) and other languages.

In some embodiments of the present invention a remote computing device application or server application is able to request a keyboard UI to be displayed on the imaging device display 12, 8. In some embodiments, this functionality is available on the imaging device and does not need to be recreated by remote computing device applications. In some embodiments, the remote computing device may define the keyboard prompt and default values. These embodiments may comprise a remote computing device that is able to rename imaging device UI buttons, such as the OK and Cancel buttons as well as define additional buttons.

In some embodiments, menu templates may be served to the imaging device UI by the imaging device itself 4 or from a remote computing device 6.

External Authorization Application

Some embodiments of the present invention may comprise a remote computing device application that is registered as the External Authorization server. The External Authorization application may control access to the imaging device and may have top-level control of the UI. UI control may be given to this application in the same manner that control is given to an internal auditor.

In these embodiments, when an imaging device system boots, it checks to see if an External Authorization application is registered. If so, the imaging device is placed in disabled mode and the application is contacted to take control of the UI. If the External Authorization server is not available, an error message may be displayed and the device may remain disabled. The imaging device may periodically try to contact the External Authorization server until it is available. Table 1 below describes what entity has control of the UI, in an exemplary embodiment, when the device is in a disabled state.

TABLE 1

UI Control in Disabled State

| Button Press | UI Control | Indicator Lights |
|---|---|---|
| Device boots | External Application | None |
| Document Filing | External Application | None |
| Image Send | External Application | None |
| Copy | External Application | None |
| Job Status | Device - standard Job Status screens | Job Status |
| Custom Settings | Device - standard Custom Settings screens | N/A |
| OS Mode | Not available when device is disabled | |

Remote Computing Device Applications

In embodiments of the present invention, access to the custom UI panels of imaging devices may vary from application to application. Some solutions, such as Document Management integration, may wish to leverage the native Image Send screens, but display some custom UI's to gather additional information about a scan job. Other solutions, like custom printing applications, may be accessed from a separate mode than the native functions.

In order to accommodate the diversified needs of these solutions applications, embodiments may support multiple integration points for UI control. These integration points are based on a user action ("trigger") for which applications may register. In some embodiments, applications may be registered with target devices so that the device knows that when "trigger A" occurs on the front panel to contact "remote computing device B" for instructions. In exemplary embodiments, applications may be integrated with an imaging device at any of several "trigger" points.

Remote computing devices may be registered to a specific function and contacted when that function's hardware key is pressed (e.g. Image Send) on the imaging device UI. Any UI information provided by the remote computing device may be displayed instead of the standard function screens native to the imaging device. This trigger may be used for applications that wish to replace the existing functions with completely custom UI's, such as an alternative scan solution or a specialized display, such as a "Section 508" compatible screen or other specialized-need interface that may have large buttons or other accommodations.

In some embodiments, each function on the imaging device may have a menu on the touch screen that remote computing devices, such as servers, can register. This enables solutions applications to provide custom content and still use some of the standard functionality provided by the imaging device. When a button assigned to a custom application is selected, a menu will be displayed with the solutions registered to that function. Users may select the desired solution and the remote computing device will be contacted for instructions.

In some embodiments, a stand-alone RCD mode that provides remote computing device application access can be accessed from the job queue portion of the UI that is displayed on every screen. This trigger point may be used for applications that do not fit within one of the standard device functions, such as custom printing solutions on an imaging device. When the RCD menu is selected, a menu will be displayed with the solutions applications registered to the generic RCD mode. Users will select the desired solution and the remote computing device will be contacted for instructions.

Hardware Key Interaction

In some embodiments of the present invention, when an imaging device is enabled, additional hardware keys may be used to manage the device. Hardware key assignments for an exemplary embodiment are shown in table 2.

TABLE 2

Exemplary Hardware Key Assignments

| Button Press | Standard IDev Mode | RCD Mode |
|---|---|---|
| Mode keys (Copy, Doc Filing, Image Send) and Custom Settings key | Clear current job settings, move to target screen | Clear current job settings, move to target screen |
| Job Status key | Move to Job Status, maintain current settings & UI location | Move to Job Status, maintain current settings & UI location |
| Clear (C) | Clears settings | Sends clear event to external application |

TABLE 2-continued

Exemplary Hardware Key Assignments

| Button Press | Standard IDev Mode | RCD Mode |
|---|---|---|
| Clear All (CA) | Clears settings, cancels job, and returns to default IDev screen | Cancels job and returns to default IDev screen (notification sent to external application) **When External Authorization is controlling the UI, only notification is sent |
| Start | Initiates scan function | Initiates scan function |
| Number keys | Input for copy count or fax numbers | Not used |
| * | Logs user out (disable device and contact External Authorization for screens) | Logs user out (disable device and contact External Authorization for screens) |

In some embodiments, in addition to the * key for logout, a timeout period may be implemented. Some embodiments also comprise an auto clear setting that can be configured for a given period of time, such as 10 to 240 seconds (or disabled). In these embodiments, when there is no activity for the time configured in auto clear, the device may automatically return to disabled mode and attempt to contact a remote computing device to retake control of the UI.

Error & Jam Notifications

Depending on a particular solution, a remote computing device application may have full or only partial control of the imaging device UI and a particular imaging job. In some embodiments, partial control may include cases where a remote computing device is monitoring clicks, but native modes are responsible for the UI interaction and controlling the job. Partial control may also include cases where the remote computing device application is integrated with a native mode (UI trigger=function custom menu). In these embodiments, the imaging device may handle all error and jam notifications with only a notification sent to the relevant remote computing device application.

For some embodiments, in cases where the remote computing device application has full control over the UI and the job, error and jam notifications may be handled differently depending on the type of error. For recoverable errors, a notification may be sent to the remote computing device application and the application may be responsible for displaying messages and resolving the error. For non-recoverable errors, the imaging device and RCD mode may interact to gracefully handle the error condition (e.g. provide user with instructions for clearing jam).

Control Handoffs

In some embodiments, at different points throughout an imaging job, several applications may need control over an imaging device including, but not limited to, an External Authorization application, a standard RCD application, an imaging device native mode and other applications. The following section describes, for an exemplary embodiment, the various steps in an exemplary job, the entities that may have control during each step, and what type of control may be allowed.

Step 1: User provides credentials to access the device at the device UI. This step may be controlled by a remote computing device, such as an External Authorization application or by Internal Accounting (native mode) in the imaging device itself. At the end of this step, the device is enabled. The External Authorization application may also specify default parameters or disable specific job parameters (e.g. default file format is PDF, but user may change; color mode is set to B/W and user may not change).

Step 2: User sets parameters for the job using one of the native imaging device modes or a standard RCD application. At the end of this step the user makes an input to initiate the job. When the input is made, an optional notification may be sent to the standard RCD application, which can then change job parameters if desired. An e-mail application is one example of an application that may request notification when the user input is made. A user may use native Image Send screens or other input to select scan options and choose e-mail recipients. A user may then select a custom application button and choose the scan-to-e-mail option from the menu. The e-mail application may then display custom screens for the user to set permissions for the file. Once a user places the original document(s) on the scanner and initiates the process, the e-mail application may capture the destination parameters set by the user and change the target destination to the e-mail application FTP server. The e-mail application may then receive the file, apply the appropriate permissions, and send to the e-mail recipients selected by the user. A remote computing device application may also want to retake control of the UI at this point, if, as in some embodiments, the application generates thumbnails of the scanned images and displays them to the user for verification.

Step 3: Once the job is initiated, the imaging device is responsible for scanning or RIPing the job and spooling it to the HDD. If the imaging device is configured to authorize jobs with an external authorization application, it may send a click report to the application and wait for instructions. The external authorization application may enable the job for sending/printing, cancel the job, or change job parameters (and then enable). As an example, a rules-based printing application may wish to change job parameters after it receives a click report. Some rules-based printing applications support rules-based printing and scanning that can limit what each user is allowed to do based on the time of day, the destination, or many other parameters. For example, only users in the marketing group may be able to scan high-quality color images. If a user from another group selects color and 600 dpi, a rules-based application may change the parameters to color and 200 dpi. At the end of this step the job should either be authorized or canceled.

Step 4: In some embodiments, this may be an optional step, where the standard RCD application in step 2 may have specified the destination as a HDD for temporary storage. This step may also be used, in some embodiments, by a Java application running on the imaging device. For example, a government office may have a custom encryption application running on the device that takes the scanned document, encrypts it, and then requests the imaging device to send it to the target destination selected by the user in step 2. In some embodiments, it may be beneficial to send a notification to the external authorization application after this step—because the imaging device does not know how long the file will be on the HDD or what the application is going to do with it—and after the send/print step.

Step 5: In the final step, the file is actually output. In typical embodiments, the file is either sent over the network or printed locally. At the end of this step, a notification that the job was successfully completed should be sent to the external authorization application and optionally, to the standard RCD application.

Device Control and Management API's

The API's may be used to allow a remote computing device application to control access to an imaging device for vend applications and to manage the device from a remote location.

Device Control and Vend API

In some embodiments of the present invention, a Device Control and Vend API allows applications to enable and disable access to the device and track click counts. The Device Control and Vend API may provide an RCD with the following controls:

Enable/disable device of function—this may allow an RCD to enable or disable access to the device as a whole or by function to enforce individual user privileges. In some exemplary embodiments, the functions listed in Table 3 may be selectively enabled or disabled by an application.

TABLE 3

Device Functions

| Enable/Disable | Description |
| --- | --- |
| Copy | Copy function (Copy button) |
| Image Send | Scan and fax function, plus send from Doc Filing (Image Send button) |
| Document Filing | All access to Document Filing functions (Document Filing button) |
| Print | Network prints, pull print from front panel, and print from Document Filing (No button control) |

Report clicks used—at the end of a successful job, the clicks used may be reported back to an RCD including:

TABLE 4

Job and Page Characteristics

| Item | Copy | Print | Fax Send | PC-Fax | E-mail/FTP | Broadcast | Scan to HD |
| --- | --- | --- | --- | --- | --- | --- | --- |
| JOB Characteristics | | | | | | | |
| Job Mode | Yes | Yes | Yes | Yes | Yes | Yes | Yes |
| Broadcast Manage No. | No | No | Yes | Yes | Yes | Yes | No |
| User Name | Yes | Yes | Yes | Yes | Yes | Yes | Yes |
| Address | No | No | Yes | Yes | Yes | # | No |
| Start Time | Yes | Yes | Yes | Yes | Yes | Yes | Yes |
| End Time | Yes | Yes | Yes | Yes | Yes | Yes | Yes |
| Total Page | Yes | Yes | Yes | Yes | Yes | Yes | Yes |
| Result | Yes | Yes | Yes | Yes | Yes | Yes | Yes |
| Error Cause | No | No | Yes | Yes | Yes | Yes | No |
| Doc Filing | Yes | Yes | Yes | Yes | Yes | Yes | Yes |
| Save Mode | *1 | *1 | *1 | *1 | *1 | *1 | *1 |
| File Name | *1 | Yes | *1 | Yes | Yes | *1 | Yes |
| File Size | Yes | Yes | *1 | *1 | *1 | *1 | Yes |
| Resolution | Yes | Yes | Yes | Yes | Yes | Yes | Yes |
| Special | Yes | Yes | Yes | No | Yes | Yes | Yes |
| Finishing | Yes | Yes | No | No | No | No | No |
| File Format | No | No | No | No | Yes | Yes | No |
| Compression | No | No | No | No | Yes | Yes | No |
| PAGE Characteristics | | | | | | | |
| Copy | Yes | Yes | Yes | Yes | Yes | # | Yes |
| Paper Size | Yes | Yes | Yes | Yes | Yes | Yes | Yes |
| Simplex/duplex | Yes | Yes | Yes | Yes | Yes | Yes | Yes |
| Paper Type | Yes | Yes | Yes | Yes | No | No | Yes |
| Page | Yes | Yes | Yes | Yes | Yes | Yes | Yes |

*1 - Yes when Document Filing is used

Debit mode—in these embodiments, when an application enables the device it may specify if the current job requires authorization. If so, the job will be spooled to memory and click information (e.g., as defined in Table 4) will be sent to an RCD. An RCD will then notify the device if the job should be deleted or output/sent. At this point, the application also has the option of changing job parameters. If the application does not require authorization, the job will continue as normal and a click report will be sent at the end of the job.

Print job accounting—in these embodiments, an RCD may wish to monitor print jobs along with walk-up functions. For print job accounting, an IDev may monitor all incoming print jobs and send accounting data in the PJL header to an RCD for verification before printing the job. The RCD will evaluate the accounting data (or lack thereof) and inform the IDev to continue with or cancel the job.

Report on unidentified jobs—in these embodiments, an RCD may also wish to monitor print jobs that it cannot associate to a specific user, such as device reports and incoming fax jobs. The RCD can register to receive click counts for all unidentified jobs, so that it may bill them to a general account.

Device Management API

In some embodiments of the present invention, a Device Management API allows a network application to remotely setup and manage the imaging device. In exemplary embodiments, the Device Management API may provide an RCD with the following controls:

Device status—an RCD may request the current status of the device. This is the same status information as reported on the embedded web pages.

Device configuration—an RCD can retrieve a list of installed options supported by the device.

Web Page settings—an RCD application can retrieve and set any of the values that are configurable on the embedded web pages.

Key Operator Programs—an RCD application can retrieve and set any of the values that are configurable in Key Operator Programs, including software keys.

Custom Settings—an RCD application can retrieve and set any of the values that are configurable in Custom Settings.

Job Status—an RCD application can retrieve the current job queue and history information and reprioritize or delete jobs in the queue.

Click counts—an RCD application can retrieve device total counts and clicks for each function by account code.

Data Security settings—an RCD application may retrieve the status information on the DSK (e.g. last erase) and initiate data clear functions.

RED data—an RCD can retrieve all data typically sent in a RED message.

Remote reboot—an RCD can initiate a reboot of the imaging device.

The above groupings are provided only as an exemplary embodiment detailing which settings should be included. In some embodiments, actual API's should be grouped by functional areas since there may be overlap between Key Operator settings and web page settings.

Internal Accounting API

In some embodiments, an Internal Accounting API may allow a remote computing device application to configure internal accounting and report click counts. In some exemplary embodiments an Internal Accounting API may include:

Set Auditing Options—an RCD may set auditing options including which modes auditing is enabled for, "account number security", and "cancel jobs of invalid accounts."

Manage Account Codes—an RCD can add, edit, or delete account codes

Account Limits—an RCD application can specify a maximum number of clicks by function for individual account codes or for all account codes Account Reset—an RCD application can reset the click count for an individual account or for all accounts Retrieve Clicks—an RCD can retrieve the number of clicks by function for each account code Font and Form Management API Some embodiments of the present invention may comprise a Font and Form Management API, which allows an RCD application to remotely download and manage fonts and forms in mass-storage. In some exemplary embodiments, a Font and Form Management API may provide a remote computing device with the following controls:

Mass storage control—an RCD application can retrieve mass storage status information including storage capacity, space available, and write-protect mode plus modify write-protect status.

Resource list—an RCD application can retrieve a list of stored fonts and forms including font or macro ID, font number, font/form name, escape sequence, and file size.

Download resource—an RCD application can download PCL fonts, PCL macros, and PS fonts and forms. Any special processing that is performed when a resource is downloaded via the web pages will also be performed when the resource is downloaded via Open Systems.

Delete resource—an RCD application can delete any resource stored in mass storage.

Upload resources—an RCD application can upload an individual or all resources. On devices where effective memory management is unavailable, a server application can use this function to "defrag" mass storage.

Font/macro ID's—an RCD application can assign or modify the ID's assigned to PCL fonts and macros.

Firmware Management API

In some embodiments of the present invention, a Firmware Management API may allow a remote computing device or network application to remotely download and manage the imaging device firmware. In some exemplary embodiments, a Firmware Management API may provide a remote computing device (e.g., a server) with the following controls:

Firmware versions—an RCD application can retrieve the current firmware version numbers.

Service mode—an RCD application can place the MFP in service mode to lockout other jobs that will interfere with firmware upgrade. Upon receiving a service mode request, the IDev will stop accepting incoming jobs, complete all jobs in the queue, and then notify the server that it is in service mode.

Update firmware—an RCD can download an updated firmware version to the device. If a reboot is necessary, the IDev will perform it automatically when download is complete.

Download status—the IDev will send a status notification (success/error) to an RCD after firmware download.

Revert to previous version—if firmware update is not successful, the application can request the IDev to revert to the previous firmware version.

Device Function API's

In some embodiments of the present invention, device function API's allow a remote computing device application to use existing imaging device functionality to provide new custom solutions.

Image Send API

In some embodiments, an Image Send API may provide the remote computing device application with the following controls:

Image Send Parameters—a remote computing device application can get and set values for the following scan and fax parameters:
COLOR OR B/W
IMAGE MODE—TEXT, TEXT/PHOTO, PHOTO; EXPOSURE LEVEL
RESOLUTION
FILE FORMAT—FILE TYPE, COMPRESSION, AND PAGES PER FILE
ORIGINAL—ORIGINAL SIZE, SIMPLEX/DUPLEX, ROTATE, AND JOB BUILD
FILENAME
SUBJECT
MESSAGE
SENDER
SCHEDULE SEND TIME
PAGE DIVISION (BOOK SCANNING)
COVER PAGE
TRANSMISSION MESSAGE (CONFIDENTIAL, URGENT, ETC.)
THIN PAPER SCANNING
DESTINATION
DOCUMENT FILING Initiate Scan—the remote computing device application can initiate the scan function (same as user pressing start button).

In some embodiments, a remote computing device can change the default values on the imaging device or the values for the current job. For the current job, the remote computing device may also specify if scan parameters may be modified by the user or not. If one remote computing device application (e.g. Access Control) specifies that a parameter cannot be changed and then a second application (e.g. Document Management) tries to set the parameter, a notification may be sent to the second application and the setting will not be changed.

Print API

In some embodiments, print jobs may be submitted by remote computing device applications using standard printing channels. In some exemplary embodiments, a Print API may provide a remote computing device with the following additional control:

PJL sniffing—an RCD application can register with the IDev to be contacted for instructions when a specific PJL command is found in a print job. The RCD can then instruct the IDev to replace the command, cancel the job, or continue printing. This interface may be used in applications like accounting and other-brand compatibility.

Copy API

In some embodiments of the present invention, a Copy API may provide a remote computing device with the following exemplary controls:

Copy Parameters—an RCD application can get and set values for the following copy parameters:
COLOR OR B/W
EXPOSURE—TEXT, TEXT/PHOTO, PHOTO, SUPER PHOTO; EXPOSURE LEVEL
PAPER SELECT (BY TRAY)
COPY RATIO
2-SIDED COPY—1TO1, 1TO2, 2TO2, 2TO1; BINDING EDGE
OUTPUT—OUTPUT TRAY, SORT, STAPLE, GROUP, OFFSET
ORIGINAL SIZE
SPECIAL FUNCTIONS—MARGIN SHIFT, ERASE, PAMPHLET, ETC.
DOCUMENT FILING Initiate Copy—an RCD application can initiate the copy function (same as user pressing start button).

In some embodiments, a remote computing device can change the default values on the imaging device or the values for the current job. For the current job, the remote computing device may also specify if copy parameters may be modified by the user or not.

Document Filing API

In some embodiments of the present invention, a Document Filing API may provide a remote computing device with the following exemplary controls:

Backup/restore—the remote computing device application can import and export a batch file with all Document Filing data. In some embodiments, this package will be in a proprietary format since it contains documents that are password-protected and should not be accessed individually—this is typically for restore in case of failure or cloning to other devices.

File/folder list—the remote computing device application can retrieve, modify, and create new files and folders to be stored on the IDev (also covered in device management).

Download file—the remote computing device can download a new file to the Document Filing systems and specify folder, filename, username, and password.

User list—the remote computing device application can retrieve, modify, and create new users to be stored on the IDev (also covered in device management).

HDD Status—the remote computing device application can retrieve the current HDD status including the % allocated to the main folder, quick folder, and custom folders and the % remaining.

Doc Filing Parameters—the remote computing device application can get and set values for storing a file to Doc Filing including:
EXPOSURE
RESOLUTION
ORIGINAL—SIZE, SIMPLEX/DUPLEX
FILE INFORMATION—USERNAME, FILENAME, FOLDER, CONFIDENTIAL, PASSWORD
SPECIAL MODES—ERASE, DUAL PAGE COPY, 2IN1, JOB BUILD, CARD SHOT Initiate Print—the remote computing device application can select a stored file and initiate a print including the following parameters:
PAPER SIZE/SOURCE
OUTPUT—SORT/GROUP, OUTPUT TRAY, STAPLE, PUNCH, OFFSET
SIMPLEX/DUPLEX (TABLET/BOOKLET)
TANDEM PRINT
NUMBER OF COPIES
DELETE OR STORE AFTER PRINTING Initiate Send—the remote computing device application can select a stored file and initiate a send including the following parameters:
RESOLUTION
FILE FORMAT
DESTINATION
TIMER
SENDER
FILENAME
SUBJECT
MESSAGE Security Allowing external applications to control an imaging device opens up the imaging device to new security vulnerabilities. In embodiments of the present invention that provide some security measures, the following exemplary items are security concerns that may be addressed by the remote computing device interface.

Access to remote computing device interfaces may be limited to valid applications. Embodiments provide extensive access and control of the imaging device, which poses a significant security risk. The interface of these embodiments may be protected from access by attackers, while maintaining ease of setup and use for valid solutions.

Confidential data (user credentials and job data) may be protected during network transfer. User credentials and job data may be secured during network transfer to ensure that it cannot be stolen, an intruder cannot monitor device activity, and a man-in-the-middle attack cannot change messages. Imaging devices may support Secure Sockets Layer (SSL) and other connections to ensure data is safe while being communicated between the imaging device and remote computing device applications.

Administrators may have the ability to lock-down imaging device access. For users with strict security policies, administrators may have the ability to disable access by remote computing devices or limit access to specific applications. Administrators may have an option to register the limited applications that they wish to access the imaging device interfaces.

Remote computing device applications may ensure the imaging device is not being "spoofed." The remote computing device may be able to authenticate an imaging device that it is contract with it to ensure an intruder cannot imitate the imaging device to collect network configuration and password information, monitor file/folder structures of a document management system, or spoof security settings and DSK status of the imaging device.

A remote computing device may ensure that the server is not being "spoofed." The imaging device must be able to authenticate all remote computing devices that it is in contact with to ensure that an intruder is not spoofing the remote computing device's IP address. By pretending to be the remote computing device, an intruder could steal user credentials, redirect scanned documents, change device settings or firmware, or bring down the access control system (either to provide access to unauthorized users or initiate a denial of service attack for valid users).

Access control/vend applications may not be compromised when a remote computing device is unavailable. When the remote computing device is unavailable, it may not be acceptable to provide open access to the device. If the remote computing device is unavailable at startup or becomes unavailable at anytime (e.g. someone disconnects network cable), the imaging device may immediately be disabled and an error message displayed.

An administrator may be able to adjust a security level based on company and application requirements. Security requirements can have a large impact on the time it takes to develop a remote computing device application and the resources required to implement the solution. Users using some embodiments may range from a small business with one imaging device, no IT staff, and a simple scan or print application to a large government office using access control and audit trails to track all device activity. The security measures used to protect imaging device interfaces may be adjustable by the administrator to match the target environment.

The imaging device and remote computing device applications may be able to hand-off user credentials. Users may be prompted to login at multiple points throughout a job. For example, an access control application or accounting application may control total device access, the imaging device may have user authentication enabled for Image Send, and a document management application may require user login before showing a folder list. In many environments, all of these applications will use a common user database. In some embodiments, it is, therefore, desirable for the applications to pass user credentials to each other, so that each one does not have to repeat the authentication process.

Some embodiments of the present invention may be described with reference to FIG. 3. These embodiments comprise an imaging device only, which is configured to interact with a remote computing device, such as a server through a communications link. The imaging device 30 comprises a user interface 32, which comprises a user input device 34, such as a keypad, one or more buttons, knobs or switches or a touch-screen panel and a display 36, which may comprise user input device 34 in the form of a touch-screen panel.

Imaging device 30 will typically be capable of performing one or more imaging functions including, but not limited to, scanning, printing, copying, facsimile transmission (sending and receiving) and others.

Figure 3:
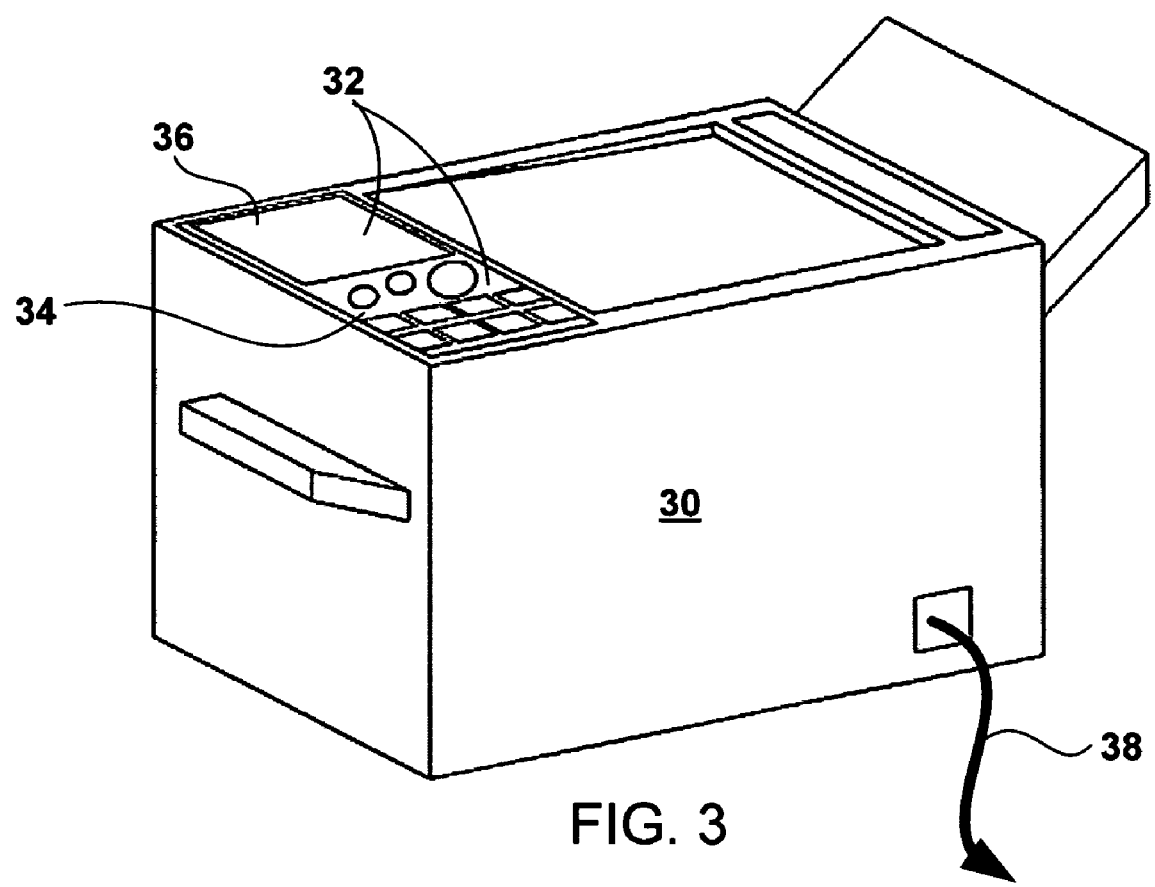
FIG. 3 shows an exemplary imaging device.

These embodiments further comprise a communications link 38, which may be a wired connection (as shown in FIG. 3) comprising a network cable, a Universal Serial Bus (USB) cable, a serial cable, a parallel cable, a powerline communication connection such as a HomePlug connection or other wired connections. Alternatively, the communications link 38 may comprise a wireless connection, such as an IEEE 802.11(b) compliant connection, a Bluetooth connection, an Infrared Data Association (IrDA) connection or some other wireless connection.

Figure 4:
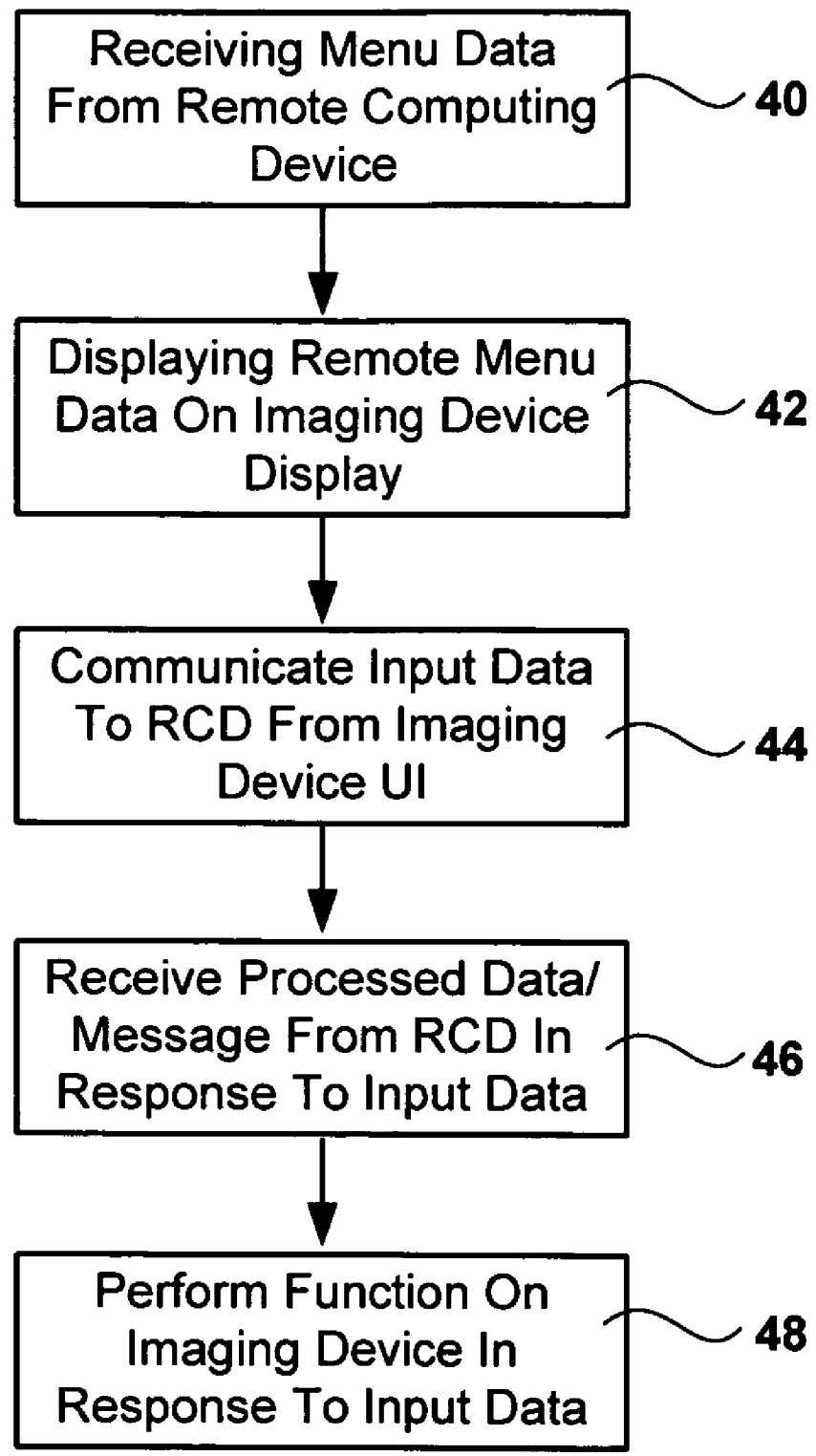
FIG. 4 is a chart depicting steps of an imaging device method.

The operation of some imaging device embodiments may be explained with reference to FIG. 4. In these embodiments, menu data is received 40 from a remote computing device (not shown in FIG. 3), which is connected to the imaging device 30 via the communication link 38 through a wired or wireless connection. This menu data is then displayed 42 on the imaging device user interface display 36. This display of remote menu data is intended to prompt a user to make an input on the user interface input device 34.

Imaging devices of these embodiments are further configured to accept input from a user in response to a display of remote menu data and communicate 44 that user input to a remote computing device. In some embodiments, this user input data will be processed by a remote computing device. This may comprise running an application on the remote computing device. This processing may also comprise accessing and communicating data that is stored on the remote computing device.

The imaging devices of these embodiments are further configured to receive 46 data resulting from processing the user input data. This may comprise data generated by an application running on the remote computing device in response to the user input. The imaging device may also receive data that was stored on a remote computing device, such as a file server, in response to processing the user input.

Once the imaging device 30 has received 46 the processed data, the imaging device 30 may perform 48 a native function in response to the data or using the data. For example, and not be way of limitation, the imaging device 30 may print a document that was stored on the remote computing device and modified on the remote computing device according to the user input. As another non-limiting example, the imaging device 30 may active or enable functions (i.e., scanning, copying, printing, fax transmission) on the imaging device in response to the receipt 46 of processed data.

Figure 5:
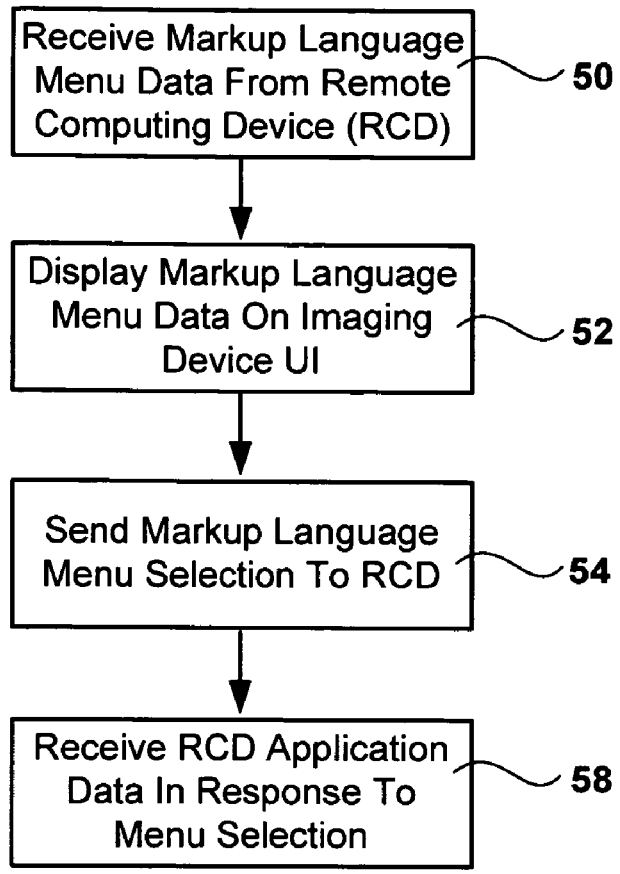
FIG. 5 is a chart depicting steps of an imaging device method using a markup language.

Some, more specific, imaging device embodiments may be explained with reference to FIG. 5. In these embodiments, the imaging device 30 is configured to receive 50 menu data formatted in a markup language from a remote computing device. The communication link by which the menu data is communicated may be established and maintained using a Hypertext Transfer Protocol (HTTP). The markup language may comprise terms from Hypertext Markup Language (HTML), Extensible Markup Language (XML), Wireless Markup Language (WML), Extensible Hypertext Markup Language (XHTML) and/or other languages.

Once the menu data is received 50, it may be displayed 52 on the imaging device user interface display 36. As in previously described embodiments, the menu data is typically intended to prompt user input on imaging device user interface 32. Display 52 of the remotely-stored menu data may be accomplished with a browser application that is native to the imaging device 30.

In these embodiments, the imaging device 30 is further configured to route 54 user input received through its user interface 32 to a remote computing device. The remote computing device that receives the user input may then run an application or otherwise process the user input and return the results of the processing to the imaging device 30. Accordingly, the imaging device 30 is further configured to receive 56 processed data from a remote computing device. In some embodiments, the imaging device 30 may perform one or more functions in response to the receipt 56 of processed data.

Figure 6:
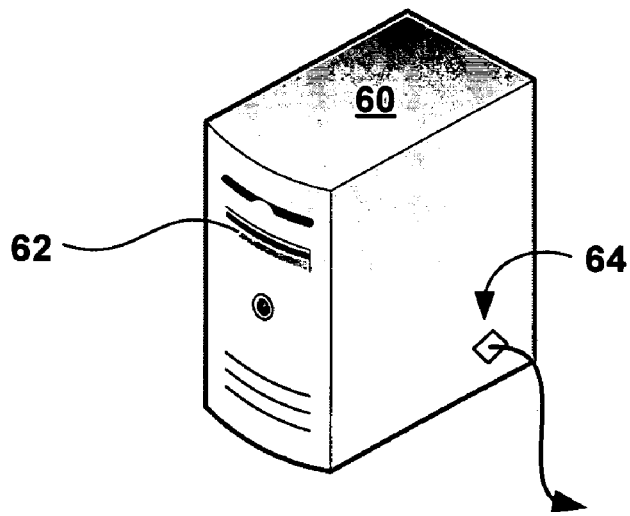
FIG. 6 shows an exemplary remote computing device embodiment.

Some embodiments of the present invention may be explained with reference to FIG. 6. These embodiments comprise a remote computing device (RCD) 60, which has a communications link 64. Communications link 64 may be a wired connection (as shown in FIG. 6) comprising a network cable, a Universal Serial Bus (USB) cable, a serial cable, a parallel cable, a powerline communication connection such as a HomePlug connection or other wired connections. Alternatively, the communications link 64 may comprise a wireless connection, such as an IEEE 802.11(b) compliant connection, a Bluetooth connection, an Infrared connection, such as those defined in the Infrared Data Association (IrDA) standard or some other wireless connection. In some embodiments, RCD 60 may further comprise a data storage device 62, which is typically a hard drive, but may also be an optical drive device, such as an array of compact disk drives, flash memory or some other storage device.

Figure 7:
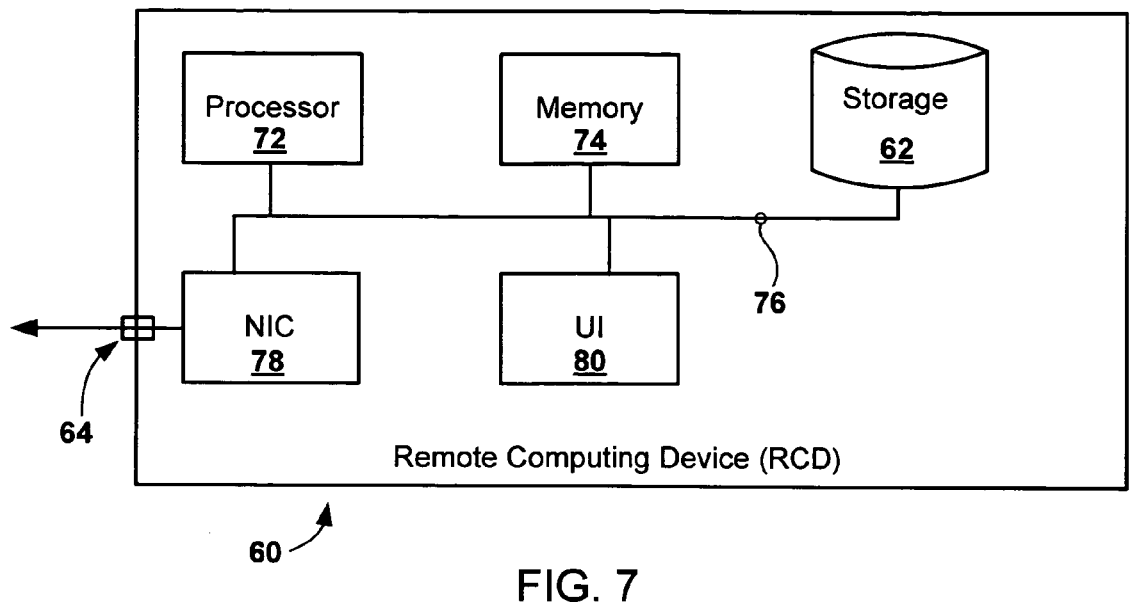
FIG. 7 is a diagram showing components of an exemplary remote computing device.

Embodiments of RCD 60 may be further described with reference to FIG. 7. In these embodiments, RCD 60 comprises a processor 72 for processing data and running programs such as operating systems and applications. RCD 60 may further comprise memory 74, which may be in the form of Random Access Memory (RAM) and Read Only Memory (ROM). Generally, any applications processed by processor 72 will be loaded into memory 74. RCD 60 may further comprise a network interface 78, which allows RCD 60 to communicate with other devices, such as an imaging device 30. In some embodiments, RCD 60 may also comprise a user interface 80, but this is not required in many embodiments. Storage 62 may be used to store applications and data that may be accessed by an imaging device 30 of embodiments of the present invention. Processor 72, memory 74, storage 62, network interface 78 and, optionally, user interface 80 are typically linked by a system bus 76 to enable data transfer between each component. Communications link 64 may couple the RCD 60 to other devices via network interface 78.

Figure 8:
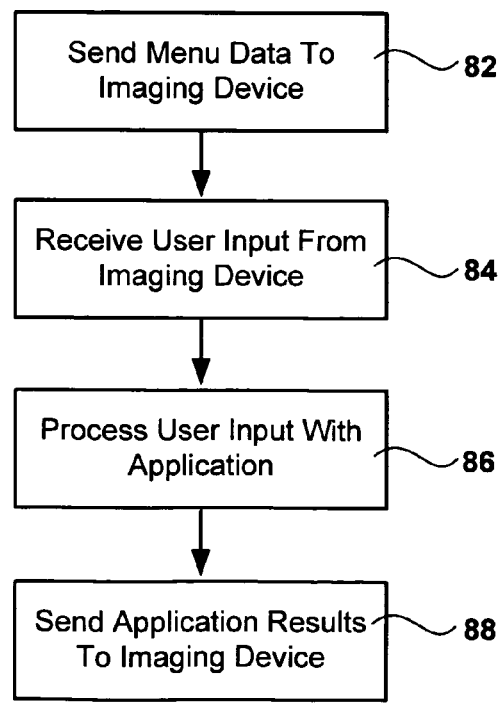
FIG. 8 is a chart showing steps of a remote computing device method.

In some embodiments, described with reference to FIG. 8, an RCD 60 may comprise menu data stored on storage device 62 or in memory 74. This menu data may be configured for display on an imaging device user interface 32. Menu data may be stored in many formats and configurations. In some embodiments menu data may take the form of terms expressed with a markup language. The markup language may comprise terms from Hypertext Markup Language (HTML), Extensible Markup Language (XML), Wireless Markup Language (WML), Extensible Hypertext Markup Language (XHTML) and/or other languages. In these embodiments, menu data may be sent 82 through a communications link 64 to an imaging device 30. Accordingly, menu data configured for display on an imaging device is stored on RCD 60.

An RCD 60, of some embodiments, will be further configured to receive 84 user input obtained through the user interface 32 of an imaging device 30 and transferred to the RCD 60 over communications links 38 & 64. Once this input data is received at an RCD 60, the input data may be processed 86. This processing 86 may comprise conversion of the data to a new format, execution of commands contained within the data or some other process. Once the input data has been processed 86, the processed output may be sent 88 back to the imaging device 30 where the processed output may be used in an imaging device process or function.

Figure 9:
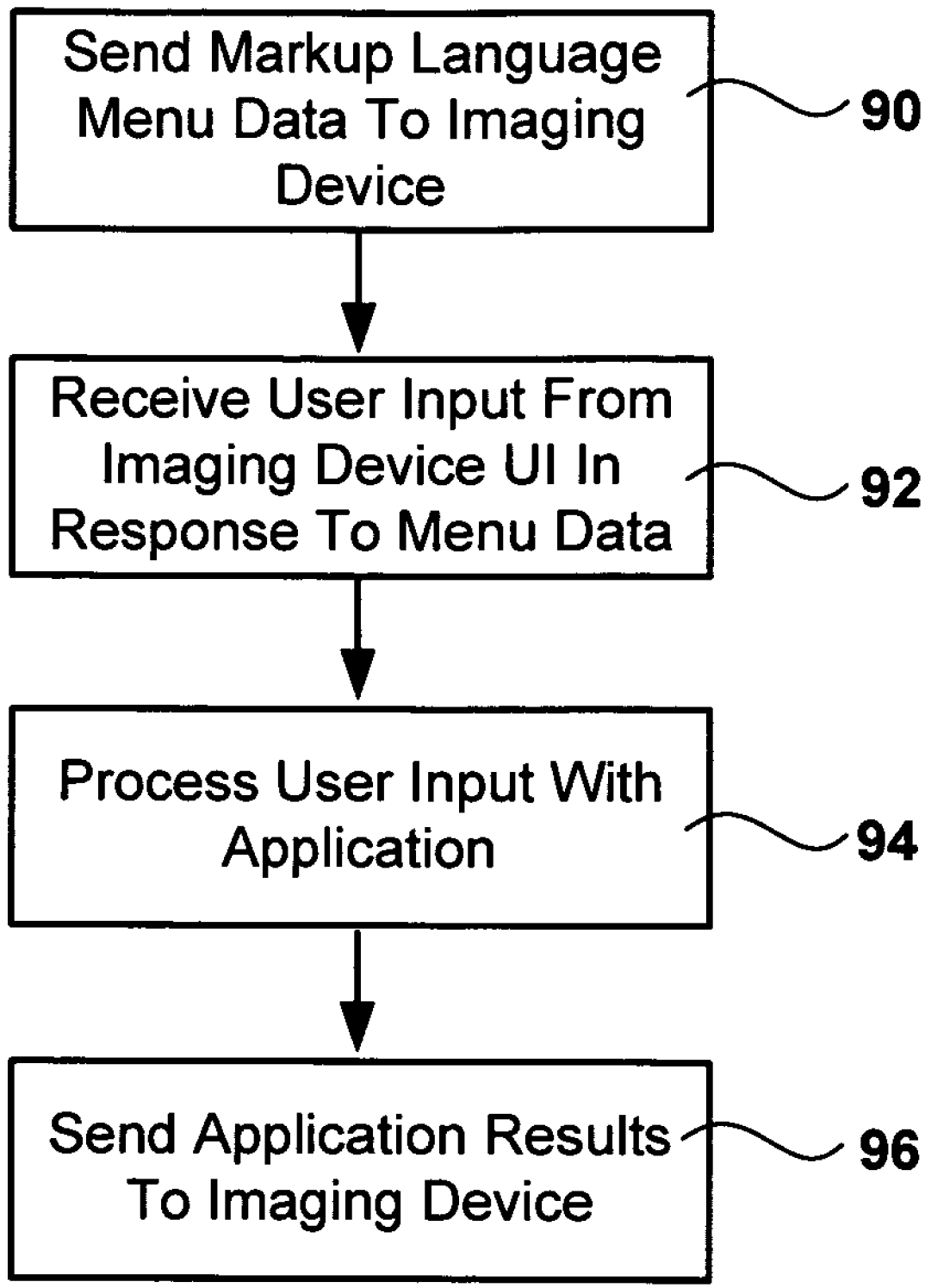
FIG. 9 is a chart showing steps of a remote computing device method using a markup language.

In some embodiments, as described with reference to FIG. 9, an RCD 60 may send 90 menu data configured for an imaging device display 36 using a markup language. The markup language menu data is then received at the imaging device 30 and displayed to a user. Typically, this will prompt the user to enter an input on the imaging device user interface 32. This user input will then be sent by the imaging device 30 to the RCD 60. The RCD 60 will then receive 92 the input data prompted by the display of the menu data on the imaging device 30. Once received, the input data may be processed 94 on the RCD 60. Processing may comprise the selection, recordation and/or modification of a form, document or other data stored on RCD 60, the authorization of a user identified by the user input, the translation of a document input by the user, generation of a map or other directions related to user input or some other process or function.

Figure 10:
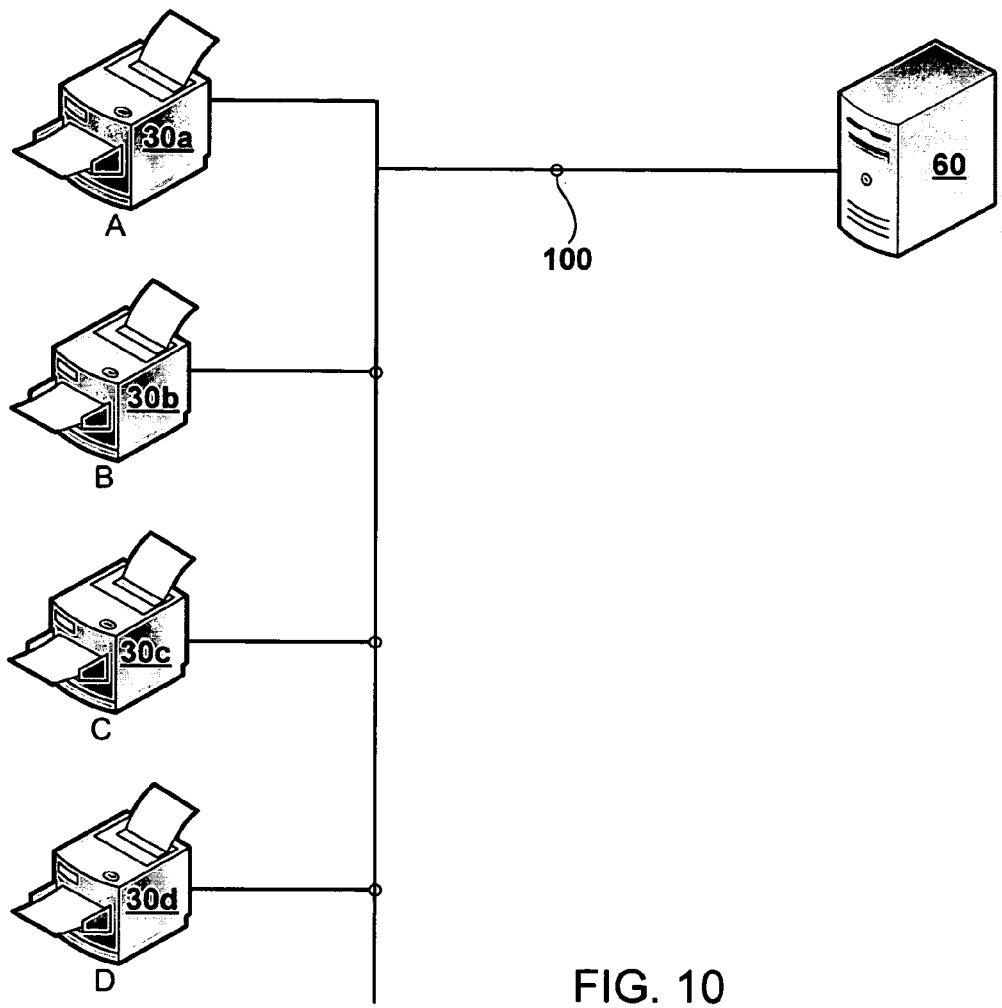
FIG. 10 is a diagram showing a system comprising multiple imaging devices in connection with a remote computing device.
Figure 11:
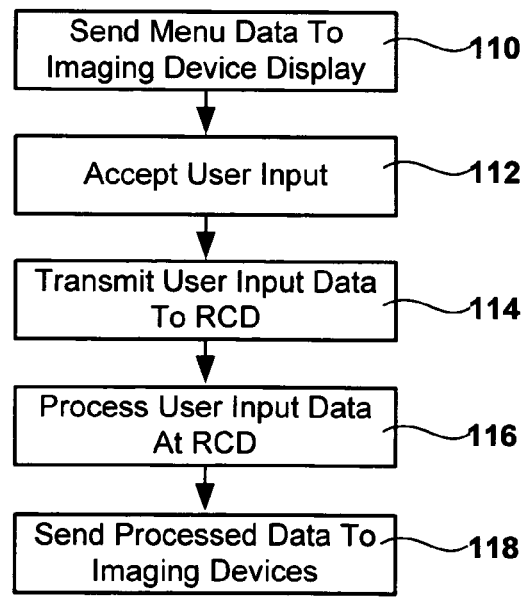
FIG. 11 is a chart showing steps of a method comprising RCD processing of user input data.

Some embodiments of the present invention may be described with reference to FIGS. 10 & 11. These embodiments comprise at least one RCD 60 and a plurality of imaging devices 30a-30d. In these embodiments, at least one of the imaging devices 30a-30d comprises a user interface 32 with a display 36 and user input panel 34 that is integral with the display (i.e., touch-screen) or a separate input unit. RCD 60 is connected to imaging devices 30a-30d by a communications link and network 100 to enable data transmission between RCD 60 and imaging devices 30a-30d.

In these embodiments, menu data is stored on RCD 60 and sent 110 to at least one of the imaging devices 30a-30d where the menu data is displayed on a user interface. Any of Imaging devices 30a-30d that receive the menu data are configured to accept 112 and transmit 114 user input to an RCD 60. Once the user input data is received at the RCD, the data may be processed 116 as discussed in previously described embodiments. The result of processing 116 may then be sent 118 back to any combination of the imaging devices 30a-30d.

In these embodiments, a single RCD 60 may be used to provide processing power, resources and functionality to a plurality of imaging devices 30a-30d without reproducing these resources in each imaging device. In some embodiments, data generated by input on one imaging device 30a may be directed to another imaging device 30d for processed data output or final processing.

Figure 12:
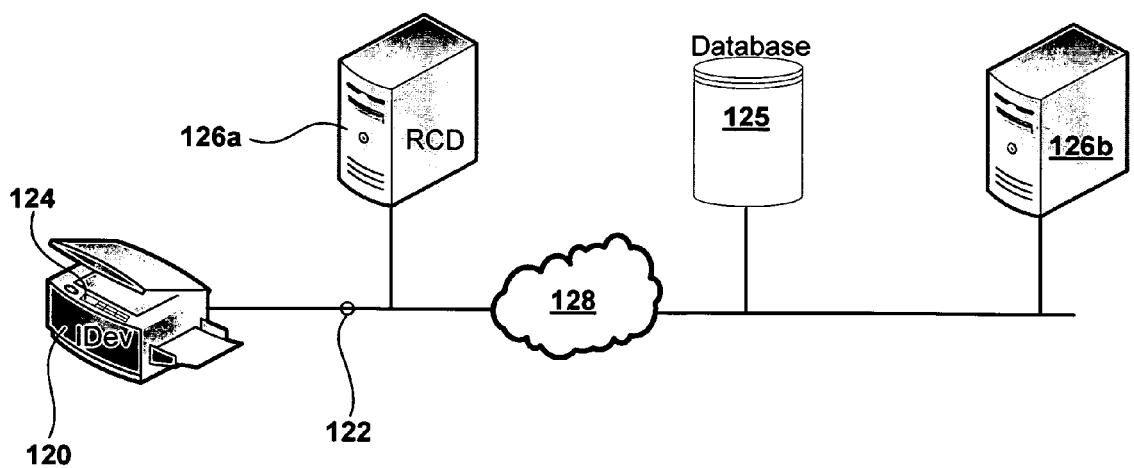
FIG. 12 is a diagram showing components of some embodiments comprising linked resources.

Some embodiments of the present invention may be described with reference to FIG. 12. In these embodiments, an imaging device (IDev) 120 comprises a user interface 124, which is capable of receiving user input and displaying data to a user. The user interface 124 may typically comprise a display, often in the form of a touch panel. The display may be used to display data to a user. This data may comprise menu data to prompt for a user selection or data entry, such as a user ID and password, form selection or some other input. The imaging device 120 has a communication link 122, which may comprise a typical computer network connection, a serial cable or some other wired or wireless communication link as described in other embodiments. The communication link 122 may connect the imaging device 120 to a remote computing device (RCD) 126a, 126b, such as a server. The RCD 126a, 126b may be used to store documents, such as forms, and other data and make that data accessible from the imaging device 120. The RCD 126a, 126b may also execute applications that interact with or receive input from the imaging device 120 and its user interface 124. In some embodiments, a database 125 may be linked to the imaging device 120 and/or an RCD 126a, 126b. In some embodiments, an RCD 126b or database 125 may be connected to an IDev 120 over a wide area network such as the internet 128.

Imaging Device Job Configuration Management Embodiments

Some embodiments of the present invention may allow an application to manage a device specific set of properties without the need for a specific Web Service Definition Language (WSDL) definition for different imaging devices (IDev). In some embodiments, a list of device settable elements may be available to an application at run-time; therefore the application may avoid hard coding the setting at design time. This may avoid the risk of not being able to run correctly on different devices or with different users. A list of device settable elements available to an application may comprise the following: Scanner, paper-source, original-size, paper-size, exposure-mode, exposure-level, duplex-mode, duplex-dir, compression, rotation, file-format, pages2scan, Delivery-info, ftp-destination, delivery-access-point, url-type, Security, UsernameToken, User-name, password, file-info, file name and dest-path.

In some embodiments of the present invention, an application may obtain property names or property value definitions at run-time by sending a request to an IDev. In some exemplary embodiments an application may use the following SOAP methods:

1. GetDeviceSettableElements—an application may use this method to retrieve a list of properties that this application has been allowed to manage. The IDev may return a list of properties that the application is allowed to manage in the form of property descriptors. The actual scope of settable properties returned by this SOAP method may vary and may be affected by the user scope of rights and other factors. For example, if a particular user scope of rights, defined in <acl/>, states that for a copy job type this particular user account must use double-sided output then the corresponding descriptor for this property may only allow this setting for this property for this user on this device. On the other hand, an administrator account may not be limited in that respect by means of an <acl/> definition and therefore may be allowed to manage that particular property or properties to a full extent.

2. GetDeviceElements—An application may use this method to retrieve a current value of particular IDev property or properties. The application may designate the actual property or properties of interest by using generic property descriptors.

3. SetDeviceElements—An application may use this method to set a new value for a particular IDev property or properties. The application may designate the actual property or properties of interest by using the generic property descriptors.

In some embodiments of the present invention, an application may assume some additional responsibilities when controlling an IDev. In some embodiments an application may obtain, at run-time, from each device, a list of properties that it may use when configuring a job. This list may be provided to the application in response to a GetDeviceSettableElements SOAP request. This list may comprise a detailed descriptor list of settable variables along with constraints that the device may impose on the application for a given account.

In other embodiments of the present invention, an application may also be required to construct a job definition list (JDL). A JDL may comprise a list of elements with properly assigned values that is created using the rules provided to the application in the descriptor list which was received from the IDev. An application may be required to use the JDL when making a SetDeviceElements SOAP request to an IDev.

In some embodiments of the present invention, An IDev may have additional responsibilities imposed at implementation. An IDev may be required to implement and support an advanced parsing scheme that is based on the principle that an individual property may be provided by the application in polymorphic form. After parsing the property received from the application, the IDev may report a SOAP fault when it receives a property definition with an unknown property name, a value assigned to a property that is out of scope or a property definition that is out of scope in terms of element multiplicity. In an exemplary embodiment, an IDev may report a fault when it receives a property describing multiple FTP destinations and the IDev cannot support delivery to multiple FTP destinations.

In some embodiments of the present invention, an application may configure jobs in terms of setting values to properties associated with a job type. Some IDevs may have a slightly different set of properties that they would like to expose to an application and allow them to be managed by the application. This flexibility may be difficult to achieve with current methods that expose IDev properties to applications directly via the WSDL definition file. Current systems may require several different versions of WSDL for application interface that define the specific properties of each particular device, making it difficult to write an application that may function on multiple devices at the same time. Some embodiments of the present invention may solve this problem by providing a generic and device independent mechanism for management of device/job properties. In some embodiments, each device/job property that an application may be allowed to manage may have been defined using a generic syntax, e.g. property descriptor.

In some embodiments of the present invention, there may be two or more types of property descriptors used. One type of descriptor may describe a device/job property in terms of syntax, type and allowed content. This type of descriptor may be used to describe each property.

Another type of descriptor may be used to get or set the actual value to a given property. This type may be used to set or get a particular property value. These descriptors may provide a generic property description mechanism that may enable the IDev to describe its settable elements to the application in generic terms using the property descriptor types.

In some embodiments of the present invention, an application may obtain a list of settable properties from an IDev in the response message of a GetDeviceSettableElements soap request. In some embodiments, the scope of settable values for any property on any device may change depending on the user. In an exemplary embodiment of the present invention, settable properties received for one user may allow the application to select color printing while in another instance with a different user the application may be required to use just black and white. This may be accomplished by means of an ACL definition for the account behind the job.

Some embodiments of the present invention may use Property Descriptor Type Definitions. These may be XML Schema type elements and may be used to define each device/job property. These may comprise compositors used to describe a property. In an exemplary embodiment of the present invention, a COMPLEX_DSC_TYPE compositor may be used. This compositor may be used to describe complex definitions. A complex definition may be a definition that consists of zero or more PROPERTY_DSC_TYPE definitions and/or other nested COMPLEX_DSC_TYPE definitions such as defining an FTP destination consisting of an IP address, file name, path, security complex structure, etc. In an exemplary embodiment of the present invention, a PROPERTY_DSC_TYPE compositor may be used. This compositor may be used to describe a simple property such as an IP address, user ID, etc. Each property may be uniquely described.

In still further exemplary embodiments, a COMPLEX_SET_TYPE compositor may be used to set a property value. This compositor may be used to define a new value of a complex property. A complex property of this type may contain zero or more instances of PROPERTY_SET_TYPE definitions and/or other nested COMPLEX_SET_TYPE complex definitions. A PROPERTY_SET_TYPE compositor may be used to define a new value for a simple property identified by this type.

In some embodiments of the present invention, a Simple Descriptor Type Compositor may be used to describe simple properties. In some exemplary embodiments, a PROPERTY_DSC_TYPE compositor may be used. This compositor may be used for describing each and every device simple property, which may be a property that does not have child elements and has been exposed to an application. An exemplary embodiment of a PROPERTY_DSC_TYPE compositor may comprise the following;

```
<s:complexType name="PROPERTY_DSC_TYPE">
  <s:sequence>
    <s:element name="appInfo" type="APPLICATION_INFO_TYPE"
    minOccurs="0" />
    <s:element name="value" type="s:string" />
    <s:element name="allowedValueList" type=
    "ALLOWED_VALUE_LIST_TYPE"
    minOccurs="0" />
  </s:sequence>
  <s:attribute name="sys-name" type="s:string"
  use="required" />
  <s:attribute name="isType"
  type="ELEMENT_VALUE_TYPE_TYPE" use="required" />
  <s:attribute name="minOccurs" type="s:nonNegativeInteger"
  use="required" />
  <s:attribute name="maxOccurs" type="s:positiveInteger"
  use="required" />
</s:complexType>
``` wherein:
AppInfo is an element that contains a list of rules and constraints imposed on the value the property that is being described and that the application should take into account when validating the user input.
Value is an element in the property descriptor that specifies a default value for the property.
allowedValueList is an element that serves as a container for a list of allowed values of enumerated type.

sys-name is an attribute whose value specifies a system variable name known to the device.

isType is an attribute that defines the property type such as bool (this type descriptor may be used to describe device properties of Boolean types), integer (this type descriptor may be used to describe properties of integer types), string (this type descriptor may be used to describe properties of string types), list (this type descriptor may be used to describe properties of enumerator types, where only one element can be selected)

The multiplicity of the user choice is controlled by the maxOccurs attribute.

sequence—This type descriptor may be used to describe complex properties. This type imposes an order in which the properties are defined.

choice—This type descriptor may be used to describe complex properties. This type imposes a rule where only one element can be selected from the provided list of choices.

all—This type descriptor may be used to describe complex properties. This type imposes a rule where any element, more then one element from the list can be selected in any order.

operation—This type descriptor may be used to describe an operation.

minOccurs—The value of the minOccurs attribute of the COMPLEX_DSC_TYPE element determines the minimum number of occurrences of this group described by this complex definition. If the value of this property has been set to 0, zero, then this element is considered optional.

maxOccurs—The value of the maxOccurs attribute of the COMPLEX_DSC_TYPE element determines the maximum number of occurrences of this group described by this complex definition.

In an exemplary embodiment of the present invention, an instance of this type may comprise the following:

```
<!-- SYSTEM VARIABLE: <file-name /> -->
<property sys-name="file-name" isType="string" minOccurs="1" maxOccurs="1">
<appInfo>
<hasConstraint name="minLength">4</hasConstraint>
<hasConstraint name="maxLength">16</hasConstraint>
</appInfo>
<value />
</property>
```

In some embodiments of the present invention, property descriptors may have a complex structure that includes validation hints that the application may use when validating user input. The constraint information that the IDev imposes on some of the properties may be communicated to the application via the <appInfo/> container element. Depending on the actual property type, the list of validation hints may vary and may have zero or more validation rules attached to it. In an exemplary embodiment, each individual validation rule may be expressed to the application by means of using the <hasConstraint name="validator name">value<has-Constraint/> XML element inside the <appInfo/> descriptor:

Wherein: The value of the name attribute of the <hasConstraint/> element specifies a specific validation rule to be applied by the application when processing the element. For example, for string type it may say that the validator to be used is the "minlength" and the value to use is 16, which means that when the application should accept a string that has the minimum length of 16 characters. The value of the <hasConstraint/> element may provide the actual data for the validator. The following "validators" may be supported:

Validator Description
regex Regular expression.
minLength Imposes minimum length on the string.
maxLength Imposes maximum length on the string
minValue Imposes a minimum value on an integer
maxValue Imposes maximum value on an integer In other embodiments of the present invention, a Complex Descriptor Type Compositor may be used to describe complex properties. In an exemplary embodiment a COMPLEX_DSC_TYPE compositors may be used for describing each and every device complex property that has been exposed to an application and may comprise:

```
<s:complexType name="COMPLEX_DSC_TYPE">
<s:sequence>
<s:element name="property" type="PROPERTY_DSC_TYPE" minOccurs="0" maxOccurs="unbounded" />
<s:element name="complex" type="COMPLEX_DSC_TYPE" minOccurs="0" maxOccurs="unbounded" />
</s:sequence>
<s:attribute name="sys-name" type="s:string" use="required" />
<s:attribute name="isType" type="ELEMENT_VALUE_TYPE_TYPE" use="required" />
<s:attribute name="minOccurs" type="s:nonNegativeInteger" use="required" />
<s:attribute name="maxOccurs" type="s:positiveInteger" use="required" />
</s:complexType>
``` wherein:

property is a description of a simple property in this complex definition. There may be zero or more simple property definitions.

complex is a description of a complex property in this complex definition. There may be zero or more complex/nested descriptions of properties.

sys-name is a value that specifies a system variable name known to the device.

is Type is an attribute that defines the property type. The following may be allowed values for this attribute:

bool—This type descriptor may be used to describe device properties of Boolean types.

integer—This type descriptor may be used to describe properties of integer types.

string—This type descriptor may be used to describe properties of string types.

list—This type descriptor may be used to describe properties of enumerator types, where only one element can be selected. The multiplicity of the user choice may be controlled by the maxOccurs attribute.

sequence—This type descriptor may be used to describe complex properties. This type imposes an order in which the properties are defined.

choice—This type descriptor may be used to describe complex properties. This type imposes a rule where only one element can be selected from the provided list of choices.

all—This type descriptor may be used to describe complex properties. This type imposes a rule where any element, more then one element from the list can be selected in any order.

operation—This type descriptor may be used to describe operation.

minOccurs—The value of the minOccurs attribute of the COMPLEX_DSC_TYPE element may determine the minimum number of occurrences of this group described by this complex definition. If the value of this property has been set to 0, zero, then this element is considered optional.

maxOccurs—The value of the maxOccurs attribute of the COMPLEX_DSC_TYPE element may determine the maximum number of occurrences of this group described by this complex definition.

In further exemplary embodiments, an instance may comprise:

```
<!-- SYSTEM VARIABLE: <Security /> -->
<complex sys-name="Security" isType="sequence"
minOccurs="1" maxOccurs="1">
<!-- SYSTEM VARIABLE: <UsernameToken /> -->
<complex sys-name="UsernameToken" isType="sequence"
minOccurs="1" maxOccurs="1">
<!-- SYSTEM VARIABLE: <user-name /> -->
<property sys-name="user-name" isType="string"
minOccurs="1" maxOccurs="1">
<appInfo>
<hasConstraint name="minLength">4</hasConstraint>
<hasConstraint name="maxLength">16</hasConstraint>
</appInfo>
<value />
</property>
<!-- SYSTEM VARIABLE: <password /> -->
<property sys-name="password" isType="string"
minOccurs="1" maxOccurs="1">
<appInfo>
<hasConstraint name="minLength">4</hasConstraint>
<hasConstraint name="maxLength">16</hasConstraint>
</appInfo>
<value />
</property>
</complex>
</complex>
```

In further embodiments of the present invention, a Simple Set Type Compositor may be used. In an exemplary embodiment, an application may use a PROPERTY_SET_TYPE compositor to define a new value to a simple property. This compositor may comprise:

```
<s:complexType name="PROPERTY_SET_TYPE">
<s:simpleContent>
<s:extension base="s:string">
<s:attribute name="sys-name" type="s:string" use="required" />
</s:extension>
</s:simpleContent>
</s:complexType>
```

In further exemplary embodiments, an instance of this type may comprise:
<!—SYSTEM VARIABLE: <file-name/>—>
<property sys-name="file-name">bogdan.pdf</property>

Sys-name—The value of this attribute may specify a system variable name known to the device.

In other embodiments of the present invention a Complex Set Type Compositor may be used. In an exemplary embodiment, an application may use a COMPLEX_SET_TYPE compositor to define a new value to a complex property. An exemplary embodiment may comprise:

```
<s:complexType name="COMPLEX_SET_TYPE">
<s:sequence>
<s:element name="property" type="PROPERTY_SET_TYPE"
minOccurs="0" maxOccurs="unbounded" />
<s:element name="complex" type="COMPLEX_SET_TYPE"
minOccurs="0" maxOccurs="unbounded" />
</s:sequence>
<s:attribute name="sys-name" type="s:string" use="required" />
</s:complexType>
``` wherein:
property is a description of a simple property in this complex definition. There may be zero or more simple property definitions.
complex is a description of a complex property in this complex definition. There may be zero or more complex/nested description of properties.

In an exemplary embodiment of the present invention, an instance of this type may comprise:

```
<!-- SYSTEM VARIABLE: <Security /> -->
<complex sys-name="Security">
<!-- SYSTEM VARIABLE: <UsernameToken /> -->
<complex sys-name="UsernameToken">
<!-- SYSTEM VARIABLE: <user-name /> -->
<property sys-name="user-name">Bogdan</property>
<!-- SYSTEM VARIABLE: <password /> -->
<property sys-name="password">password</property>
</complex>
</complex>
```

Attr. Name Description
sys-name—The value of this attribute specifies a system variable name known to the device.

In an exemplary embodiment of the present invention, descriptor types may comprise the following:
Simple Descriptor Type Compositors: (This class of property descriptors defines descriptors for very basic properties, such as: Boolean values, numbers and strings.)
Boolean Type Descriptor (This type of descriptor may be used to describe Boolean type properties).
example of descriptor use:

```
<property sys-name="rotation" minOccurs="1" maxOccurs="1"
isType="bool" >
<value>true</value>
</property>
```

Integer Type Descriptor (This type of descriptor may be used to describe numeric type properties) example of descriptor use:

```
<property sys-name="pages2scan" minOccurs="1"
maxOccurs="1" isType="integer" >
<appInfo>
<hasConstraint name="regex" >regular expression</hasConstraint>
<hasConstraint name="minValue" >1</hasConstraint>
<hasConstraint name="maxValue" >9999</hasConstraint>
</appInfo>
<value>1</value>
</property>
```

String Type Descriptor (This type of descriptor may be used to describe string type properties) example of descriptor use:

```
<property sys-name="MAILTO_SUBJECT" minOccurs="1"
maxOccurs="1" isType="string" >
<appInfo>
<hasConstraint name="regex" >regular expression</hasConstraint>
<hasConstraint name="minLength" >2</hasConstraint>
<hasConstraint name="maxLength" >64</hasConstraint>
</appInfo>
<value>Email From Dragon</value>
</property>
```

Enumerator type—The list type
This type of descriptors may be used to describe single-choice enumerated types. The following is an example of such descriptor use:

```
<property sys-name="paper-size" minOccurs="1" maxOccurs="1"
isType="list"
<value>Auto</value>
<allowedValueList>
<allowed>NONE</allowed>
<allowed>LONG</allowed>
<allowed>LEDGER</allowed>
<allowed>LEDGER_R</allowed>
<allowed>LEGAL</allowed>
<allowed>LEGAL_R</allowed>
<allowed>FOOLSCAP</allowed>
<allowed>LETTER</allowed>
<allowed>LETTER_R</allowed>
<allowed>INVOICE</allowed>
<allowed>INVOICE_R</allowed>
<allowed>EXECUTIVE</allowed>
<allowed>EXECUTIVE_R</allowed>
<allowed>EXTRA</allowed>
<allowed>C6_R</allowed>
<allowed>C65</allowed>
</allowedValueList>
</property>
```

In some embodiments of the present invention Complex Descriptor Type Compositors may provide a mechanism for describing more complex device properties like FTP destination, e-mail description, etc. This class of descriptors serves as a container that allows building more complex types.

In other embodiments of the present invention, a "sequence" Type Descriptor may be used to describe complex types, where all elements must be provided in the order defined by this descriptor. The following is an example of such descriptor use:

```
<!-- System Variable : ACCOUNT ID -->
<complex sys-name="ACCOUNT_ID" minOccurs="1" maxOccurs="1"
isType="sequence" >
<!-- System Variable : ACCOUNT ID -->
<property sys-name="EXT_ACCOUNT_ID" minOccurs="1"
maxOccurs="1" isType="string" >
<appInfo>
<hasConstraint name="regex" >regular expression</ hasConstraint >
<hasConstraint name="minLength" >2</hasConstraint >
<hasConstraint name="maxLength" >64</hasConstraint >
</appInfo>
<value></value>
</property>
<!-- System Variable : INTERNAL_ACCOUNT_ID -->
<property sys-name="MFP_ACCOUNT_ID" minOccurs="1"
maxOccurs="1" isType="integer"
<appInfo>
<hasConstraint name="regex" >regular expression</hasConstraint>
<hasConstraint name="minValue" >1</hasConstraint>
<hasConstraint name="maxValue" >99999</hasConstraint>
</appInfo >
<value></value>
</property>
</complex>.
```

In still other embodiments of the present invention, a "choice" Type Descriptor may be used to describe complex types, where only one element of the group may be provided as defined by this descriptor. The following is an example of such descriptor use:

```
<!-- System Variable : ACCOUNT ID -->
<complex sys-name="ACCOUNT_ID" minOccurs="1" maxOccurs="1"
isType="choice" >
<!-- System Variable : ACCOUNT ID -->
<property sys-name="EXT_ACCOUNT_ID" minOccurs="1"
maxOccurs="1" isType="string" >
<appInfo>
<hasConstraint name="regex" >regular expression</ hasConstraint >
<hasConstraint name="minLength" >2</hasConstraint >
<hasConstraint name="maxLength" >64</hasConstraint >
</appInfo>
<value></value>
</property>
<!-- System Variable : INTERNAL_ACCOUNT_ID -->
<property sys-name="MFP_ACCOUNT_ID" minOccurs="1"
maxOccurs="1" isType="integer"
<appInfo>
<hasConstraint name="regex" >regular expression</hasConstraint>
<hasConstraint name="minValue" >1</hasConstraint>
<hasConstraint name="maxValue" >99999</hasConstraint>
</appInfo >
<value></value>
</property>
</complex>
```

In further embodiments of the present invention, an "all" Type Descriptor may be used to describe complex types, where any of the elements from the list can appear in any order. The following is an example of such descriptor use:

```
<!-- System Variable : ACCOUNT ID -->
<complex sys-name="ACCOUNT_ID" minOccurs="1" maxOccurs="1"
isType="all" >
<!-- System Variable : ACCOUNT ID -->
<property sys-name="EXT_ACCOUNT_ID" minOccurs="1"
maxOccurs="1" isType="string" >
<appInfo>
<hasConstraint name="regex" >regular expression</ hasConstraint >
<hasConstraint name="minLength" >2</hasConstraint >
<hasConstraint name="maxLength" >64</hasConstraint >
</appInfo>
<value></value>
</property>
<!-- System Variable : INTERNAL_ACCOUNT_ID -->
<property sys-name="MFP_ACCOUNT_ID" minOccurs="1"
maxOccurs="1" isType="integer"
<appInfo>
<hasConstraint name="regex" >regular expression</hasConstraint>
<hasConstraint name="minValue" >1</hasConstraint>
<hasConstraint name="maxValue" >99999</hasConstraint>
</appInfo >
<value></value>
</property>
</complex>.
```

In other embodiments of the present invention, an "operation" Type Descriptor may be used to describe operations that the application may be allowed to execute. This descriptor may be reserved for administrative jobs.

In some embodiments of the present invention, SOAP Method Signatures may be used. An exemplary embodiment of the present invention may use the following SOAP method signatures:

GetDeviceSettableElements SOAP method signature:

```
<GetDeviceSettableElements generic="1.0"
xmlns="urn:schemas-sc-jp:mfp:osa-1-1"
<arg />
</GetDeviceSettableElements>
```

Elements
Argument
Name
Description

Arg (This is a mandatory complex type element. It specifies sub-set of properties specific to a job type that the remote application can set. The proposed definition for this complex argument has been presented below):

```
<s:complexType name="ARG_SETTABLE_TYPE">
<s:choice>
<s:element name="job-type" type="E_MFP_JOB_TYPE"/>
<s:element name="JobId" type="OSA_JOB_ID_TYPE"/>
<s:element name="ui-job" type="UI_USER_TYPE"/>
</s:choice>
</s:complexType>
```

Where "UI_USER_TYPE" has been defined as

```
<s:complexType name="UI_USER_TYPE">
<s:sequence>
<s:element name="job-type" type="E_MFP_JOB_TYPE"/>
<s:element name="UISessionId"
type="UI_SESSION_ID_TYPE"/>
</s:sequence>
</s:complexType>
```

Return Value.

In some embodiments of the present invention, the GetDeviceSettableElements method may return an xml-doc element, which may contain a list of property descriptions associated with a given job type. The application may be allowed to configure these property descriptions for a current account. The definition of the xml-doc element that may be returned by the GetDeviceSettableElements SOAP request may comprise the following:

```
<s:complexType name="XML_DOC_DSC_TYPE">
<s:sequence>
<s:element name="property" type="PROPERTY_DSC_TYPE"
minOccurs="0" maxOccurs="unbounded" />
<s:element name="complex" type="COMPLEX_DSC_TYPE"
minOccurs="0" maxOccurs="unbounded" />
</s:sequence>
</s:complexType>
```

Further exemplary embodiments of this SOAP request when passing <JobId/> as an argument may comprise the following:

```
<?xml version="1.0" encoding="utf-8"?>
<S:Envelope xmlns:S="http://www.w3.org/2001/12/soap-envelope">
<S:Body>
<GetDeviceSettableElements generic="1.0"
xmlns="urn:schemas-sc-jp:mfp:osa-1-1" >
<arg>
<JobId uid="SN4500641200JB79283167">
<job-type>SCAN</job-type>
<UISessionId> SN4500641200UI79283167</UISessionId>
</JobId>
</arg>
</GetDeviceSettableElements>
</S:Body>
</S:Envelope>
```

Further exemplary embodiments of this SOAP request when passing <job-type/> as an argument may comprise the following:

```
<?xml version="1.0" encoding="utf-8"?>
<S:Envelope xmlns:S="http://www.w3.org/2001/12/soap-envelope">
<S:Body>
<GetDeviceSettableElements generic="1.0"
xmlns="urn:schemas-sc-jp:mfp:osa-1-1" >
<arg>
<job-type>SCAN</job-type>
</arg>
</GetDeviceSettableElements>
</S:Body>
</S:Envelope>
```

Still further exemplary embodiments of this SOAP request when passing <ui-user/> as an argument may comprise the following:

```
<?xml version="1.0" encoding="utf-8"?>
<S:Envelope xmlns:S="http://www.w3.org/2001/12/soap-envelope">
<S:Body>
<GetDeviceSettableElements generic="1.0"
xmlns="urn:schemas-sc-jp:mfp:osa-1-1" >
<arg>
<ui-job>
<job-type>SCAN</job-type>
<UISessionId>SN0F21F359-AB84-
36D110E6D2F9UI000A1601</UISessionId>
</ui-job>
</arg>
</GetDeviceSettableElements>
</S:Body>
</S:Envelope>
```

In some exemplary embodiments of the present invention, a SOAP response message may be received in response to the SOAP GetDeviceSettableElements request: The response message may comprise the following:

```
<?xml version="1.0" encoding="utf-8"?>
<S:Envelope xmlns:S="http://www.w3.org/2001/12/soap-envelope">
<S:Body>
<GetDeviceSettableElementsResponse generic="1.0"
xmlns="urn:schemas-sc-jp:mfp:osa-1-1" >
<xml-doc>
```

```
*** collection of element descriptors ***
*** the scope varies based on device ***
*** the scope varies based on account ***
</xml-doc>
</GetDeviceSettableElementsResponse>
</S:Body>
</S:Envelope>
```

SetDeviceElements

The following is the proposed signature for the SetDevice-Elements SOAP method:

Synopsis

```
<SetDeviceElements generic="1.0"
xmlns="urn:schemas-sc-jp:mfp:osa-1-1">
<JobId />
<config-data />
</SetDeviceElements>
```

Elements

Argument

Name

Description

JobId. This is a mandatory argument that identifies a specific job on the IDev.

config-data List of settable properties specific to a job type using generic description format, e.g. the XML_DOC_SET_TYPE type definition.

In terms of WSDL this complex element has been defined as follows:

```
<s:complexType name="XML_DOC_SET_TYPE" >
<s:sequence>
<s:element name="property" type="PROPERTY_SET_TYPE"
minOccurs="0" maxOccurs="unbounded"/>
<s:element name="complex" type="COMPLEX_SET_TYPE"
minOccurs="0" maxOccurs="unbounded" />
</s:sequence>
</s:complexType>
```

In some embodiments of the present invention a GetDeviceElements SOAP request method may be used to provide an application with a mechanism to read current values of a property within the scope of the given job type. This may be an argument that identifies a specific job on the IDev Property List of job properties that the application would like to obtain current values of. Typically, at least one <property/> element may be specified. If a request is successful, the IDev may respond with a SOAP response message that may contain a list of property/properties along with the current values as requested by the application. Values of all listed properties may be enclosed inside the <xml-doc-get/> container element, which may be of XML_DOC_SET_TYPE type.

In some exemplary embodiments of the present invention a GetDeviceElements SOAP request method may comprise the following:

```
<GetDeviceElements generic="1.0"
xmlns="urn:schemas-sc-jp:mfp:osa-1-1">
<JobId />
<property />
</GetDeviceElements>
```

Elements

Argument

Name

Description

JobId.

In some embodiments of the present invention, a SOAP fault element may be returned to the caller in case of an error. The return property values may be those of the job, meaning that they may come from the job object and not from actual hardware registers. This may be because each job manages its job properties and the job object is responsible for storing them. These settings may eventually end up in the actual hardware registers at the time of ExecuteJob request. The <property sys-name="property name"/> argument passed to this method may be used to specify the actual system property by name that the caller is interested in. Because this is a read operation, this argument may not have any value in this call. If a value has been specified, the server may not process the request. In some embodiments of the present invention, a SOAP fault element may be returned to the caller in case of an error.

In some embodiments of the present invention, both simple and complex properties may use the same <property . . . /> format in the request. In some cases, the property names designated in the sys-name attribute may be unique names. In such cases, specifying just the property name itself may be sufficient to uniquely identify a given job property. For example <property sys-name="paper-source"/>. However, in some embodiments there may be cases where the property name may not evaluate to a unique property address. In such cases, an application may be required to provide a fully qualified property name using XPath notation. In cases where the server may not be able to resolve the property name to a unique address, a SOAP Fault may be returned to the application. A property name may not directly evaluate to a unique property address if there is multiple use of the element, e.g. a particular element may be used in different structures, or if a particular structure may be allowed to appear more than once in the settings, thus each element of the structure may appear several times. An example of this may be multiple ftp destinations for a scan job type.

In further embodiments of the present invention, when specifying a property name that is part of an array, an application may uniquely identify the row by means of providing an index. The value of the index may be within the scope: <property sys-name="/scanner/delivery-info/ftp-destination/Security"/> <property sys-name="/scanner/delivery-info/ftp-destination[0]/Security"/> <property sys-name="/scanner/delivery-info/ftp-destination[3]/Security"/>. In some embodiments, if a property is of array type and the application has not specified an array index, the server may assume the zero index, e.g. the first element in the array. In some embodiments, an application may request to read settings from multiple properties in one call. In this instance, the IDev may create the response message and may provide the property values in the same order as requested in the call. It is also possible that the application may request to read a particular property value more then one time. In such case, the response message may contain multiple instances of it as well.

In some exemplary embodiments of the present invention a GetDeviceElements SOAP request method may comprise the following:

```
<?xml version="1.0" encoding="utf-8"?>
<S:Envelope xmlns:S="http://www.w3.org/2001/12/soap-envelope">
<S:Body>
<GetDeviceElements generic="1.0"
xmlns="urn:schemas-sc-jp:mfp:osa-1-1" >
<JobId uid="SN4500641200JB79283167">
<job-type>SCAN</job-type>
<UISessionId> SN4500641200UI79283167</UISessionId>
</JobId>
<property sys-name="paper-source" />
<property sys-name="paper-size" />
<property sys-name="ftp-destination/Security" />
</GetDeviceElements>
</S:Body>
</S:Envelope>
```

In some exemplary embodiments of the present invention, a SOAP response message may be sent in response to the SOAP GetDeviceElements request: The response message may comprise the following:

```
<?xml version="1.0" encoding="utf-8"?>
<S:Envelope xmlns:S="http://www.w3.org/2001/12/soap-envelope">
<S:Body>
<GetDeviceElementsResponse generic="1.0"
xmlns="urn:schemas-sc-jp:mfp:osa-1-1" >
<xml-doc-get>
<!-- SYSTEM VARIABLE: <paper-source/> -->
<property sys-name="paper-source">AUTO</property>
<!-- SYSTEM VARIABLE: <paper-size/> -->
<property sys-name="paper-size">LETTER</property>
<!-- SYSTEM VARIABLE: <Security /> -->
<complex sys-name="ftp-destination/Security">
<!-- SYSTEM VARIABLE: <UsernameToken /> -->
<complex sys-name="UsernameToken">
<!-- SYSTEM VARIABLE: <user-name />-->
<property sys-name="user-name">Bogdan</property>
<!-- SYSTEM VARIABLE: <password /> -->
<property sys-name="password">password</property>
</complex>
</complex>
</xml-doc-get>
</GetDeviceElementsResponse>
</S:Body>
</S:Envelope>
```

In some exemplary embodiments of the present invention a GetDeviceElements SOAP request method may comprise an XML example of this SOAP request where the server supports an array of ftp destinations:

```
<?xml version="1.0" encoding="utf-8"?>
<S:Envelope xmlns:S="http://www.w3.org/2001/12/soap-envelope">
<S:Body>
<GetDeviceElements generic="1.0"
xmlns="urn:schemas-sc-jp:mfp:osa-1-1" >
<JobId uid="SN4500641200JB79283167">
<job-type>SCAN</job-type>
<UISessionId> SN4500641200UI79283167</UISessionId>
</JobId>
<property sys-name="ftp-destination[1]/Security" />
<property sys-name="ftp-destination[3]/Security" />
</GetDeviceElements>
</S:Body>
</S:Envelope>
```

In other exemplary embodiments of the present invention, a SOAP response message sent in response to the immediately preceding SOAP GetDeviceElements request may comprise the following:

```
<?xml version="1.0" encoding="utf-8"?>
<S:Envelope xmlns:S="http://www.w3.org/2001/12/soap-envelope">
<S:Body>
<GetDeviceElementsResponse generic="1.0"
xmlns="urn:schemas-sc-jp:mfp:osa-1-1" >
<xml-doc-get>
<complex sys-name="ftp-destination[1]/Security">
<!-- SYSTEM VARIABLE: <UsernameToken /> -->
<complex sys-name="UsernameToken">
<!-- SYSTEM VARIABLE: <user-name />-->
<property sys-name="user-name">Bogdan</property>
<!-- SYSTEM VARIABLE: <password /> -->
<property sys-name="password">password</property>
</complex>
</complex>
<complex sys-name="ftp-destination[3]/Security">
<!-- SYSTEM VARIABLE: <UsernameToken /> -->
<complex sys-name="UsernameToken">
<!-- SYSTEM VARIABLE: <user-name />-->
<property sys-name="user-name">bryan</property>
<!-- SYSTEM VARIABLE: <password /> -->
<property sys-name="password">loveshorses</property>
</complex>
</complex>
</xml-doc-get>
</GetDeviceElementsResponse>
</S:Body>
</S:Envelope>.
```

In still other exemplary embodiments of the present invention a GetDeviceElements SOAP request method may comprise an XML example of this SOAP request demonstrating a case where a particular property, such as the paper source, has been requested several times:

```
<?xml version="1.0" encoding="utf-8"?>
<S:Envelope xmlns:S="http://www.w3.org/2001/12/soap-envelope">
<S:Body>
<GetDeviceElements generic="1.0"
xmlns="urn:schemas-sc-jp:mfp:osa-1-1">
<JobId uid="SN4500641200JB79283167">
<job-type>SCAN</job-type>
<UISessionId> SN4500641200UI79283167</UISessionId>
</JobId>
<property sys-name="paper-source" />
<property sys-name="paper-size" />
<property sys-name="Security" />
<property sys-name="paper-source" />
</GetDeviceElements>
</S:Body>
</S:Envelope>
```

In some exemplary embodiments of the present invention, a SOAP response message sent in response to the immediately preceding SOAP GetDeviceElements request may comprise the following:

```xml
<?xml version="1.0" encoding="utf-8"?>
<S:Envelope xmlns:S="http://www.w3.org/2001/12/soap-envelope">
<S:Body>
<GetDeviceElementsResponse generic="1.0"
xmlns="urn:schemas-sc-jp:mfp:osa-1-1" >
<xml-doc-get>
<!-- SYSTEM VARIABLE: <paper-source/> -->
<property sys-name="paper-source">AUTO</property>
<!-- SYSTEM VARIABLE: <paper-size/> -->
<property sys-name="paper-size">LETTER</property>
<!-- SYSTEM VARIABLE: <Security /> -->
<complex sys-name="Security">
<!-- SYSTEM VARIABLE: <UsernameToken /> -->
<complex sys-name="UsernameToken">
<!-- SYSTEM VARIABLE: <user-name />-->
<property sys-name="user-name">Bogdan</property>
<!-- SYSTEM VARIABLE: <password /> -->
<property sys-name="password">password</property>
</complex>
</complex>
<!-- SYSTEM VARIABLE: <paper-source/> -->
<property sys-name="paper-source">AUTO</property>
</xml-doc-get>
</GetDeviceElementsResponse>
</S:Body>
</S:Envelope>
```

In some exemplary embodiments of the present invention, a fully qualified property name may comprise: <property sys-name="/scanner/paper-source"/> <property sys-name="/scanner/delivery-info/ftp-destination"/> <property sys-name="/scanner/delivery-info/ftp-destination[1]/Security"/>.

Some embodiments of the present invention may comprise a stand-alone imaging device (IDev) with internal processing capabilities. Other embodiments may comprise an imaging device (IDev) in communication with one or more remote computing devices (RCDs).

Figure 13:
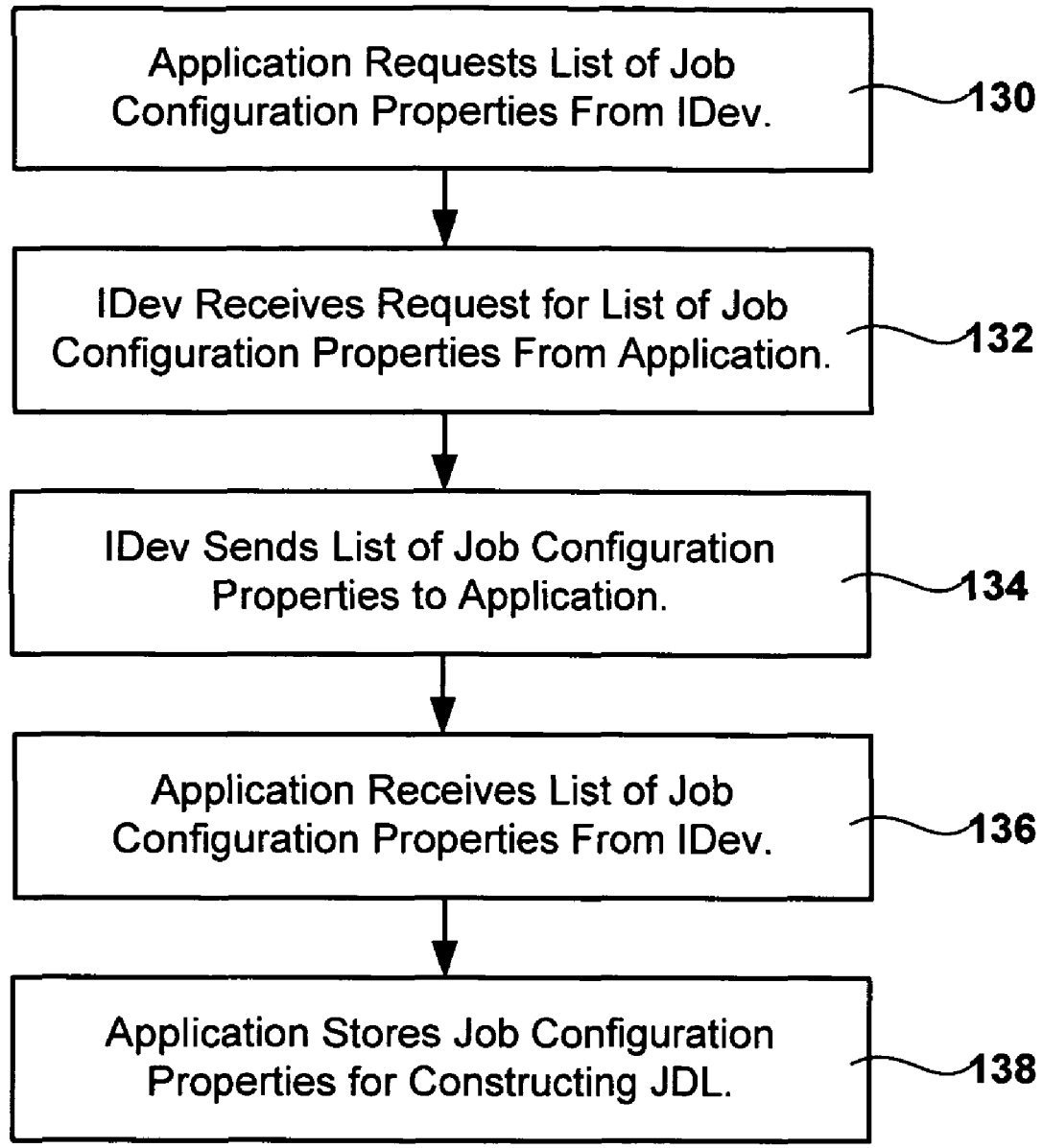
FIG. 13 is a chart showing steps of an embodiment comprising imaging device job configuration management.
Figure 14:
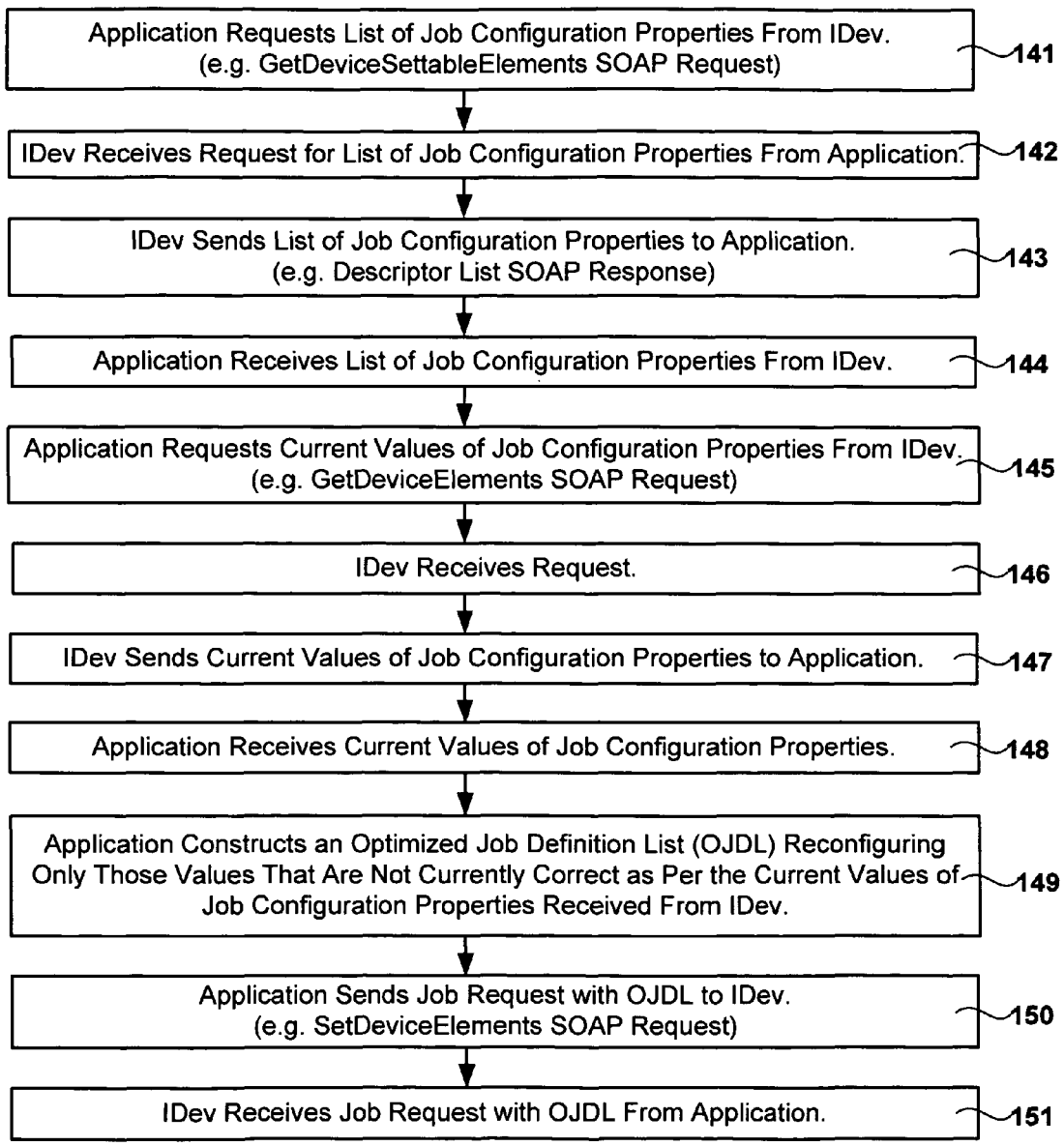
FIG. 14 is a chart showing steps of an embodiment comprising imaging device job configuration management using an optimized Job Definition List (OJDL)

Some embodiments of the present invention, illustrated in FIG. 13, comprise requesting 130 a list of job configuration properties from an imaging device (IDev). The IDev may receive 132 the request and send 134 the list of job configuration properties back to the application. The application may then receive 136 the list and may then store 138 the list as a library for constructing a job definitions list (JDL Some embodiments of the present invention may be described with reference to FIG. 14. In these embodiments, an application may request 141 a list of job configuration properties from an IDev. In some exemplary embodiments, this request may comprise a GetDeviceSettableElements SOAP request. The IDev may then receive 142 the request and send 143 the list of job configuration properties to the application. In some exemplary embodiments, this response may comprise a Descriptor List SOAP response. The application may then receive 144 the list from the IDev. After receiving the list, the application may request 145 current values of job configuration properties from the IDev. In some exemplary embodiments, this request may comprise a GetDeviceElements SOAP request. The IDev may receive 146 the request and may send 147 current values of job configuration properties to the application. The application may then receive 148 the current values of job configuration properties and construct 149 an Optimized Job Definition List (OJDL) reconfiguring only those values that are not currently correct as per the current values received from the IDev. The application may then send 150 a job request and the OJDL to the IDev. In some exemplary embodiments, this request may comprise a SetDeviceElements SOAP request. The IDev may then receive 151 the job request and OJDL from the application.

Figure 15:
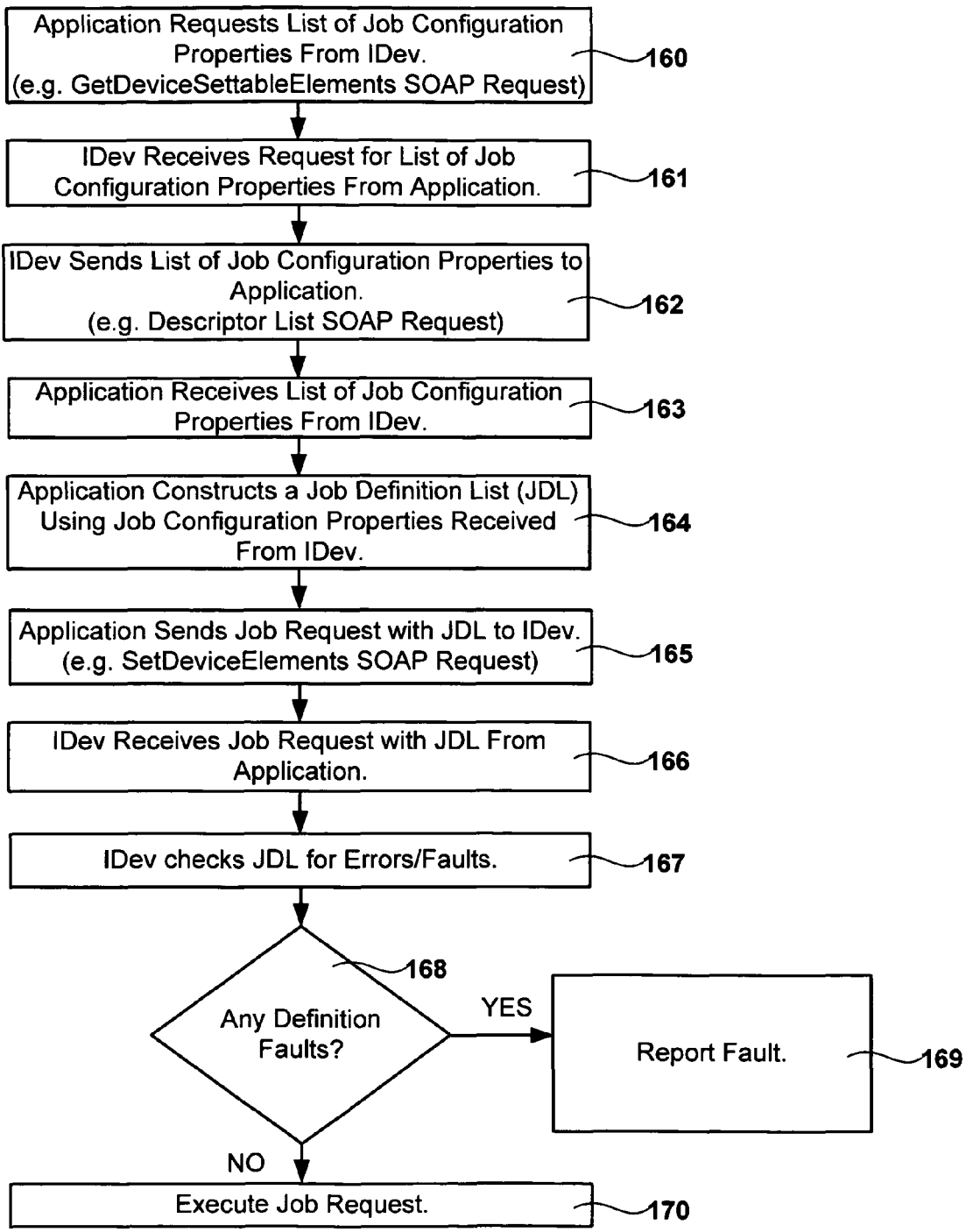
FIG. 15 is a chart showing steps of an embodiment comprising imaging device job configuration management with fault checking.

Some embodiments of the present invention, illustrated in FIG. 15, comprise a request 160 for a list of job configuration properties from an IDev. The IDev may then receive 161 the request and send 162 the list of job configuration properties to the application. The application may then receive 163 the list from the IDev. After receiving the list, the application may construct 164 a Job Definition List (JDL) using job configuration properties received from the IDev. The application may then send 165 a job request and the JDL to the IDev. In some exemplary embodiments, this request may comprise a SetDeviceElements SOAP request. The IDev may then receive 166 the job request and JDL from the application and may check 167 the JDL for errors or faults. If the IDev discovers any errors or faults it may report 169 them. Otherwise the IDev may then execute 170 the job request.

Figure 16A:
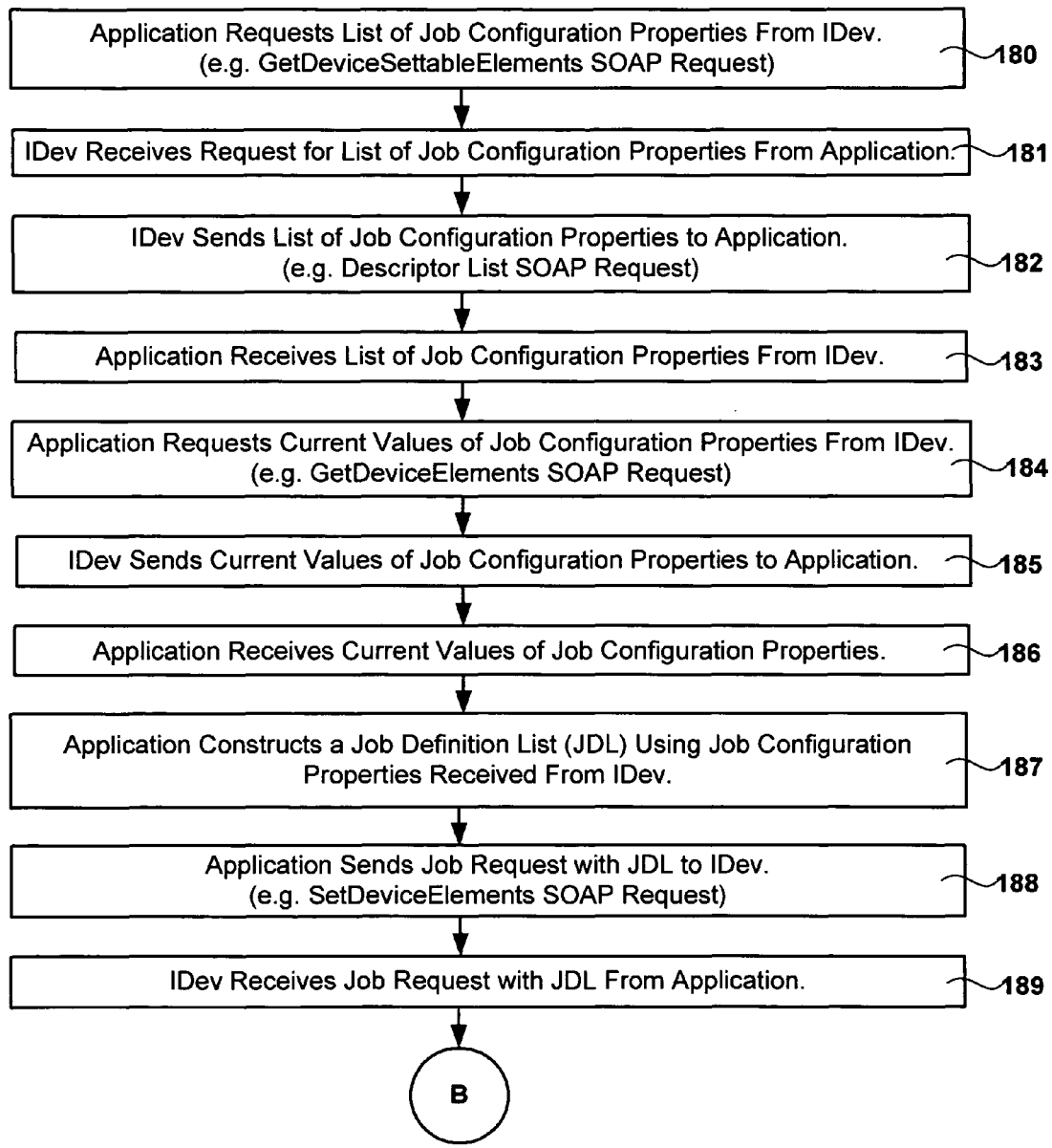
FIG. 16A is a chart showing steps of an embodiment imaging device job configuration management using an optimized Job Definition List (OJDL)

Some embodiments of the present invention, illustrated in FIG. 16A, comprise an application requesting 180 a list of job configuration properties from an IDev. The IDev may then receive 181 the request and send 182 the list of job configuration properties to the application. The application may then receive 183 the list from the IDev. After receiving the list, the application may request 184 current values of job configuration properties from the IDev. The IDev may send 185 current values of job configuration properties to the application. The application may then receive 186 the current values of job configuration properties and construct 187 an Optimized Job Definition List (OJDL) reconfiguring only those values that are not currently correct as per the current values received from the IDev. The application may then send 188 a job request and the OJDL to the IDev. The IDev may then receive 189 the job request and OJDL from the application.

Figure 16B:
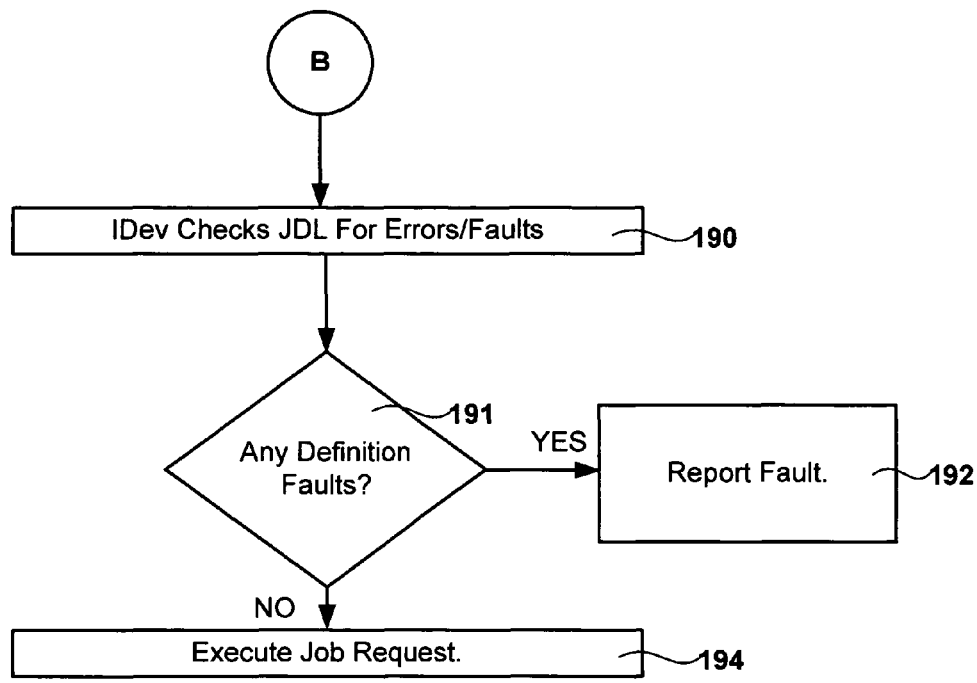
FIG. 16B is a chart showing steps of an embodiment comprising imaging device job configuration management with fault checking and reporting.

Some embodiments of the present invention, illustrated in FIG. 16B, comprise an IDev checking 190 an OJDL for errors or faults. If the IDev discovers any errors or faults it may report them 192. If no errors or faults are found the IDev may execute 194 the job request.

Figure 17:
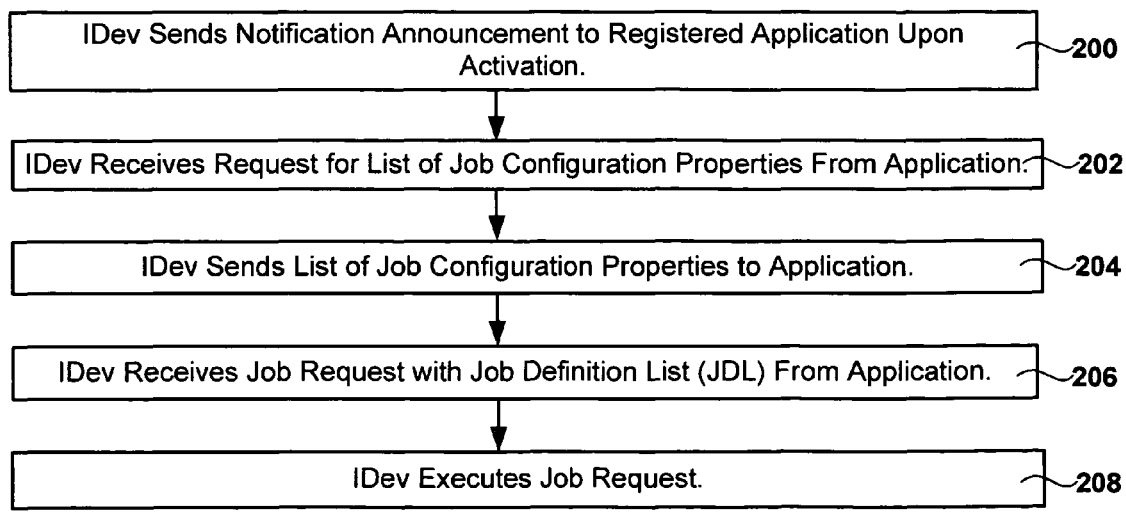
FIG. 17 is a chart showing steps of an embodiment comprising imaging device job configuration management using a job definition list (JDL)

Some embodiments of the present invention, illustrated in FIG. 17, comprise sending 200 a notification announcement to a registered application upon activation. The IDev may then receive 202 a request for a list of job configuration properties from the application. The IDev may then send 204 the list of job configuration properties to the application. The IDev may receive 206 a job request and a job definition list (JDL) from the application and may execute the job request 208.

Figure 18:
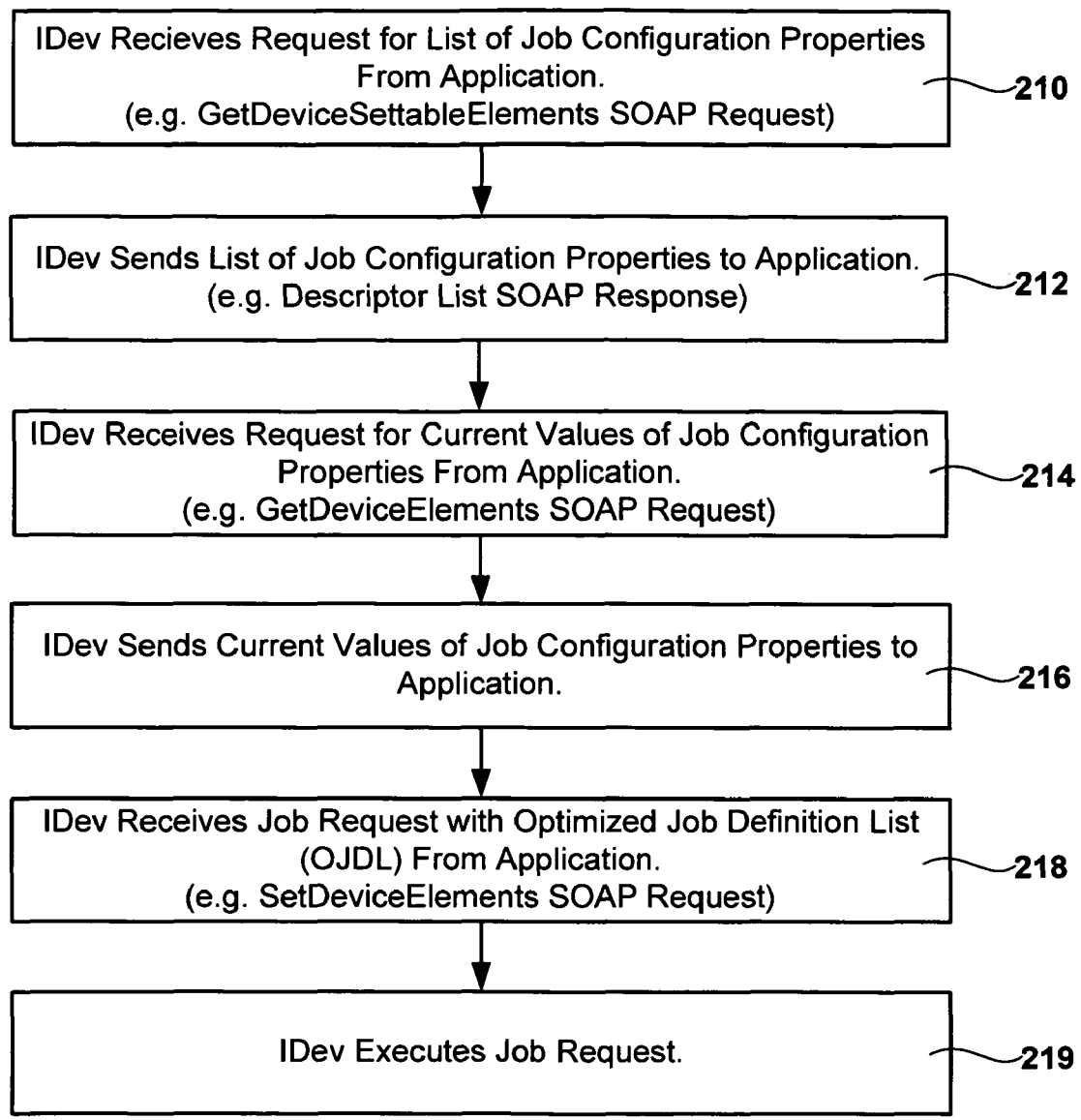
FIG. 18 is a chart showing steps of an embodiment comprising imaging device job configuration management using SOAP requests and responses.

Further embodiments of the present invention, illustrated in FIG. 18, comprise receiving 210 a request for a list of job configuration properties from an application. The IDev may then send 212 the list of job configuration properties to the application. The IDev may receive 214 a request for current values of job configuration properties from the application. The IDev may then send 216 current values of job configuration properties to the application. The IDev may then receive 218 a job request and an optimized job definition list (OJDL) from the application. The IDev may then execute the job request 219.

Figure 19:
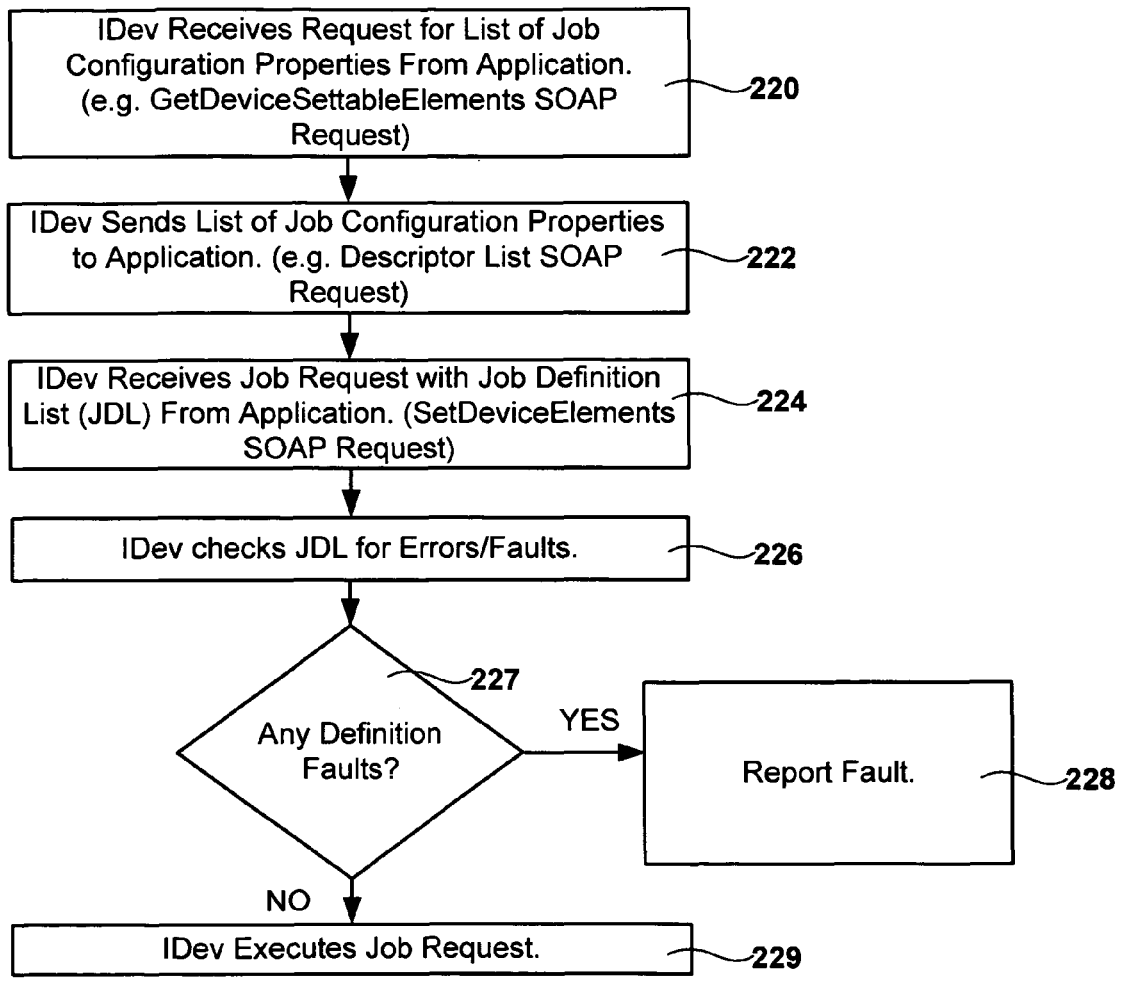
FIG. 19 is a chart showing steps of an embodiment comprising imaging device job configuration management error/fault checking and reporting.

Still other embodiments of the present invention, illustrated in FIG. 19, comprise receiving 220 a request for a list of job configuration properties from an application. The IDev may then send 222 the list of job configuration properties to the application. The IDev may then receive 224 a job request and a job definition list (JDL) from the application and may check 226 the JDL for errors or faults. If the IDev discovers any errors or faults it may report them 228. Otherwise the IDev may then execute 229 the job request.

Figure 20:
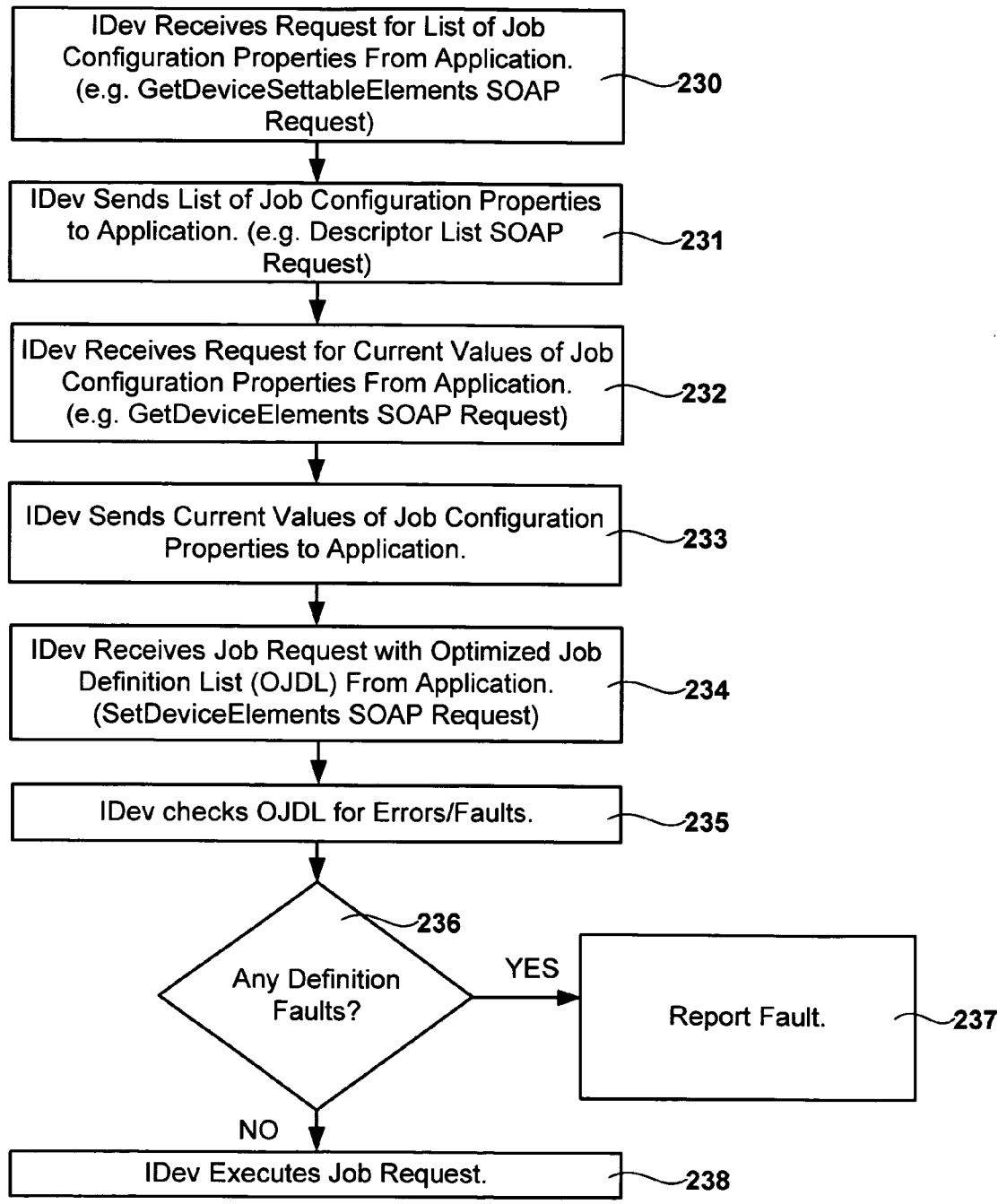
FIG. 20 is a chart showing steps of an embodiment comprising imaging device job configuration management using a SOAP request for current values.

In further embodiments, illustrated in FIG. 20, an IDev may receive 230 a request for a list of job configuration properties from an application. The IDev may then send 231 the list of job configuration properties to the application. The IDev may then receive 232 a request for current values of job configuration properties from the application. The IDev may then send 233 current values of job configuration properties to the application. The IDev may then receive 234 a job request and an optimized job definition list (OJDL) from the application. The IDev may then check 235 the OJDL for errors or faults. If the IDev discovers any errors or faults it may report them 237 or may then execute 238 the job request.

Figure 21:
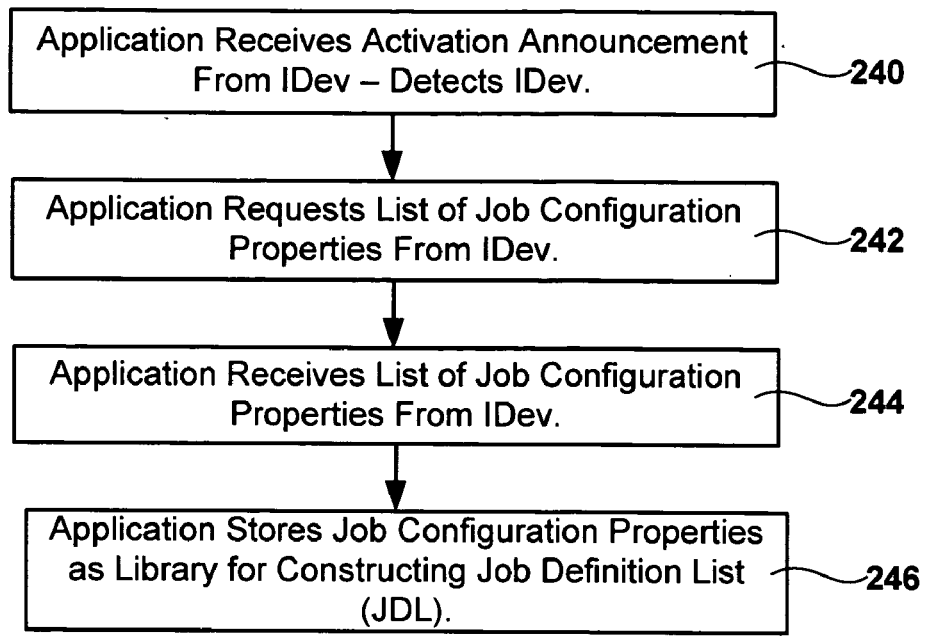
FIG. 21 is a chart showing steps of an embodiment comprising an application receiving job configuration properties from an IDev.

Other embodiments of the present invention, illustrated in FIG. 21, comprise an application receiving 240 an activation announcement from an IDev. The application may then request 242 a list of job configuration properties from the IDev. The application may then receive 244 the list of job configuration properties from the IDev and may then store 246 the list of job configuration properties for constructing a job definition list (JDL).

Figure 22:
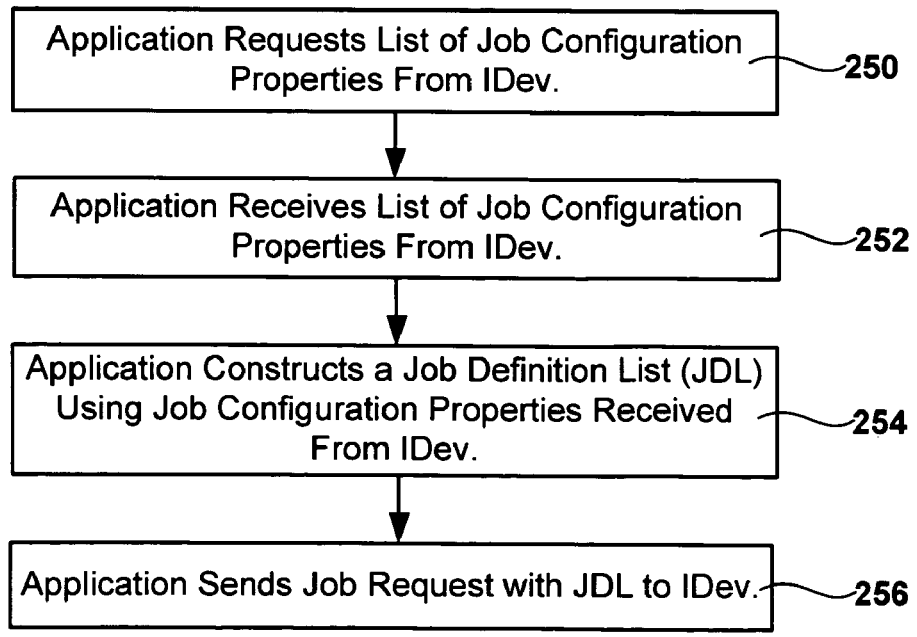
FIG. 22 is a chart showing steps of an embodiment comprising sending a job definition list (JDL) to an IDev.

In other embodiments, illustrated in FIG. 22, an application may request 250 a list of job configuration properties from an IDev. The application may then receive 252 the list of job configuration properties from the IDev and may then construct 254 a job definition list (JDL) using the job configuration properties received from the IDev. The application may then send 256 a job request and the JDL to the IDev.

Figure 23:
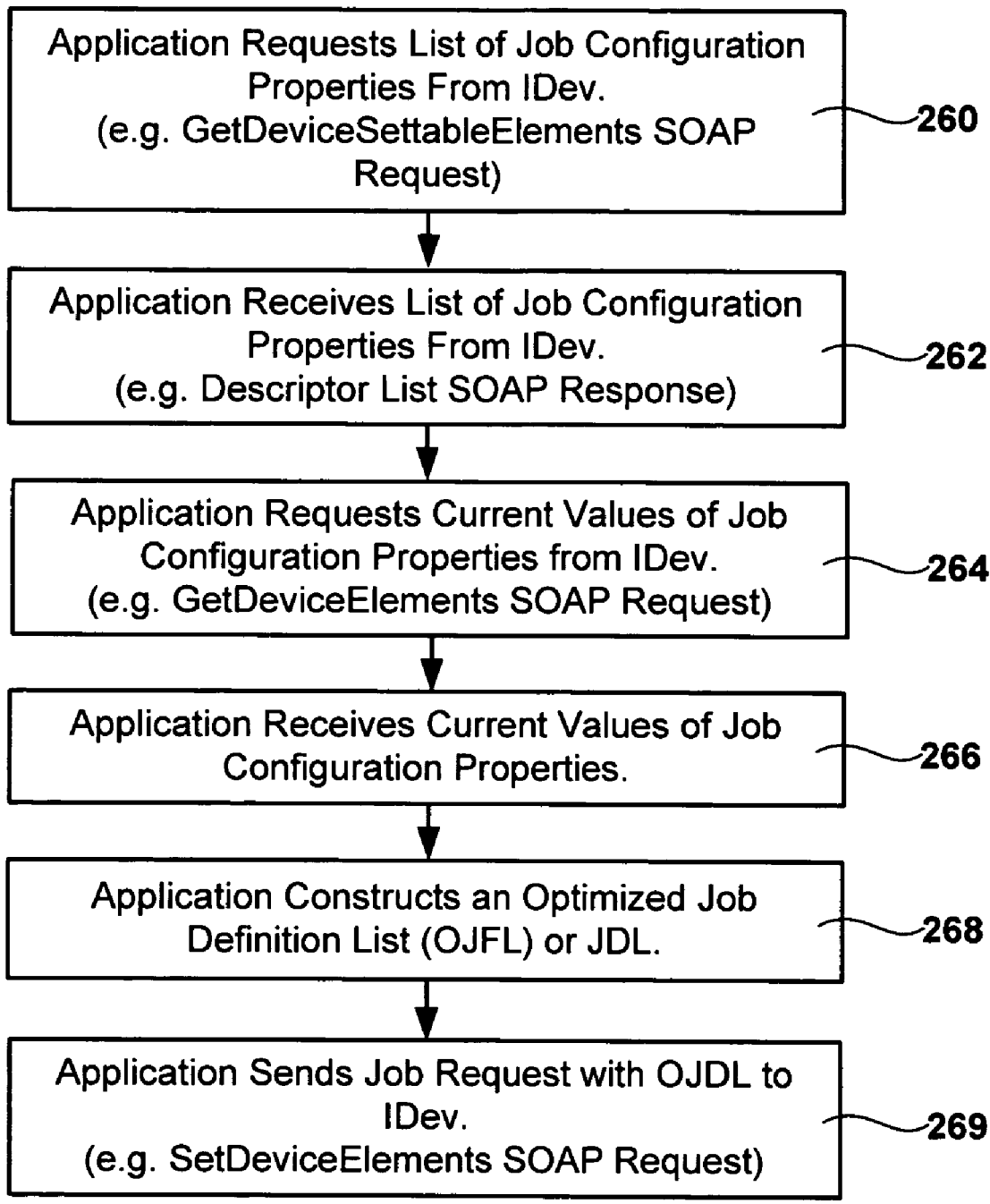
FIG. 23 is a chart showing steps of an embodiment comprising an imaging device application constructing an optimized job definition list.

In other embodiments, illustrated in FIG. 23, an application may request 260 a list of job configuration properties from an IDev. The application may then receive 262 the list of job configuration properties from the IDev. The application may then request 264 current values of job configuration properties from the IDev. The application may then receive 266 the current values of job configuration properties and may then construct 268 an optimized job definition list (OJDL) reconfiguring only those values that are not currently correct as per the current values of job configuration properties received from the IDev. The application may then send 269 a job request and the OJDL to the IDev.

Figure 24:
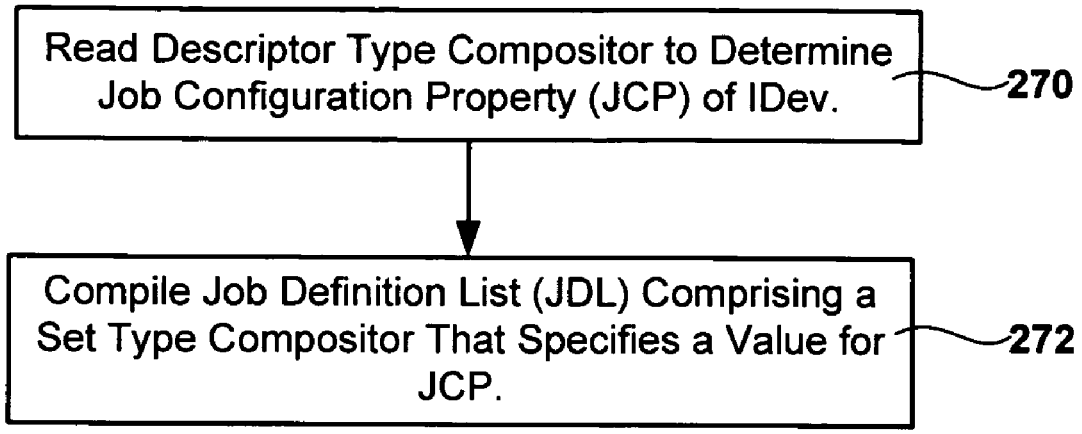
FIG. 24 is a chart showing steps of an embodiment comprising Descriptor Type Compositors and Set Type Compositors.

Some embodiments of the present invention may be described with reference to FIG. 24. In these embodiments, an application may read 270 a Descriptor Type Compositor such as a Simple Descriptor Type Compositor or a Complex Descriptor Type Compositor and identify a Job Configuration Property (JCP) of an IDev. The application may then compile 272 a Job Definition List (JDL) comprising one or more Set Type Compositors, such as a Simple Set Type Compositor or a Complex Set Type Compositor. These Compositors may be compiled to define an imaging job by setting values for JCPs. The JDL may then be sent 274 to an IDev for execution of the imaging job defined in the JDL.

Figure 25:
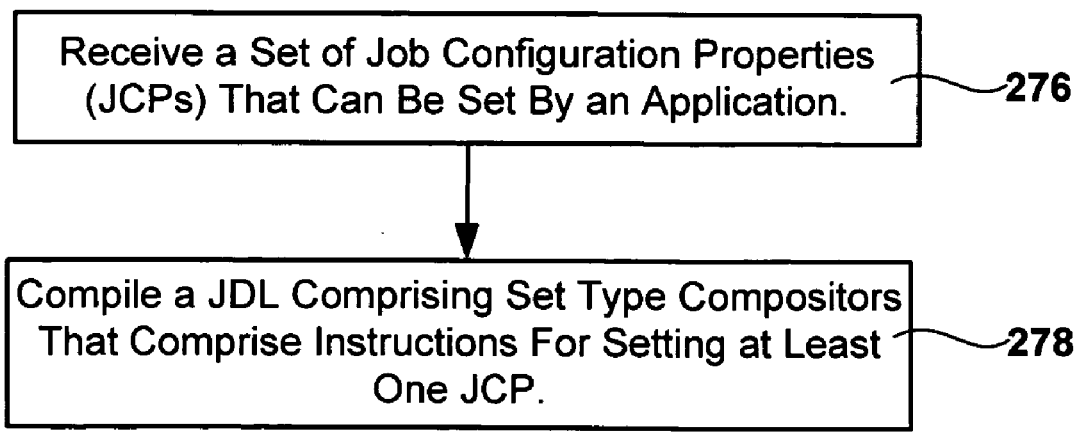
FIG. 25 is a chart showing steps of an embodiment comprising a request for JCPs.

Some embodiments of the present invention may be described with reference to FIG. 25. In these embodiments, an application may request 276 a summary or list of Job Configuration Properties (JCPs) from an IDev. The application may then receive 277 a response to this request comprising a list or some other data structure identifying the JCPs available on the IDev. With these properties, the application may compile 278 a Job Definition List (JDL) comprising Set Type Compositors that define values for the JCPs identified by the IDev in a manner that configures the IDev for a particular imaging job. The JDL may the be sent 279 to the IDev for execution of the imaging job.

Figure 26:
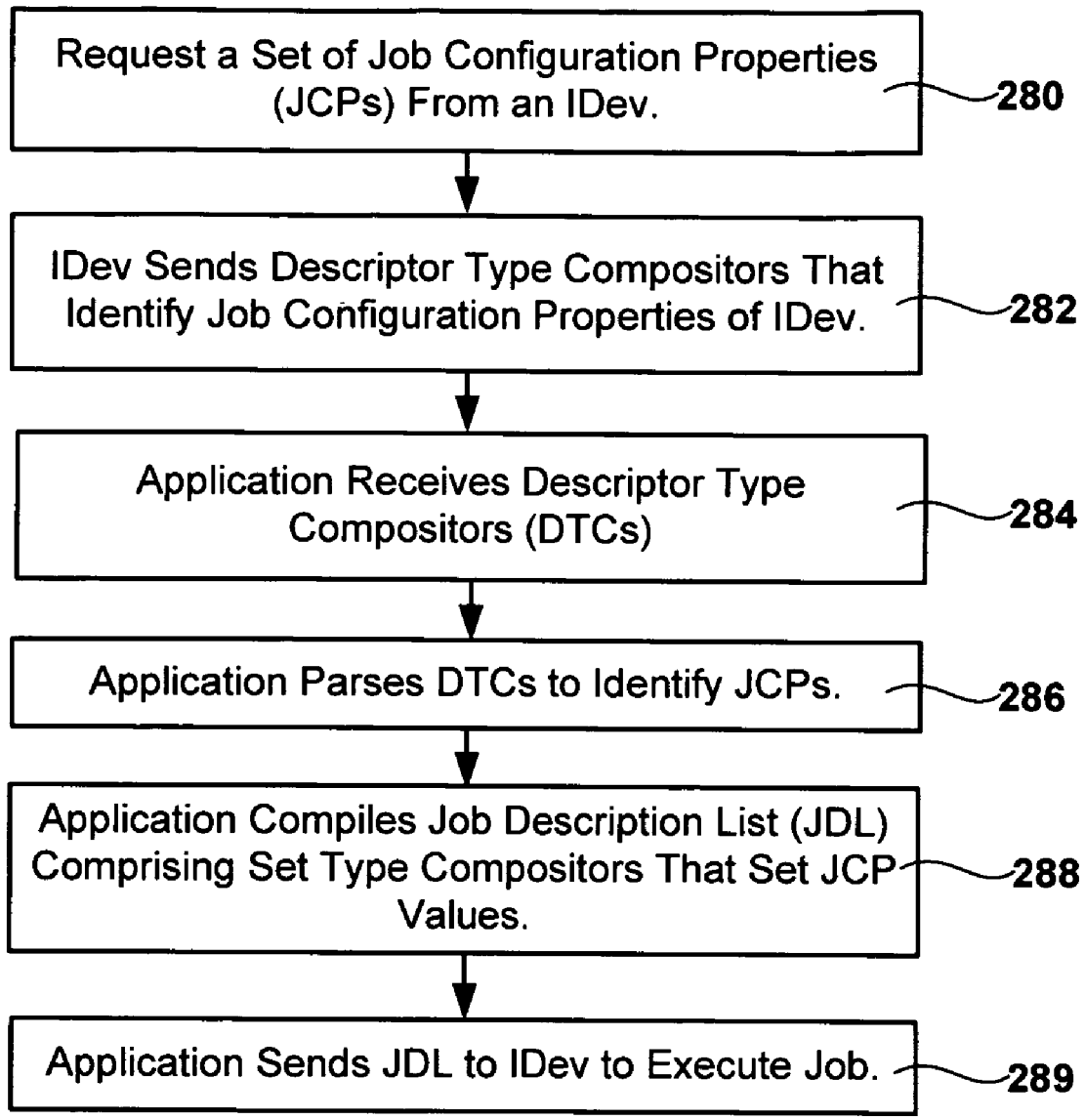
FIG. 26 is a chart showing steps of an embodiment comprising identifying JCPs with Descriptor Type Compositors.

Some embodiments of the present invention may be described with reference to FIG. 26. In these embodiments, an application may request 280 a set of job configuration properties (JCPs) from an IDev. The IDev may then send 282 one or more Descriptor Type Compositors to the application to identify JCPs of the IDev that are available to the application. The application may receive 284 these Compositors and parse 286 or otherwise process them to identify the JCPs identified by them. Once these JCPs are identified, the application may compile 288 a JDL comprising Set Type Compositors that may define an imaging job by setting values for the JCPs that relate to the imaging job. This JDL may then be sent 289 to the IDev to execute the imaging job.

Figure 27:
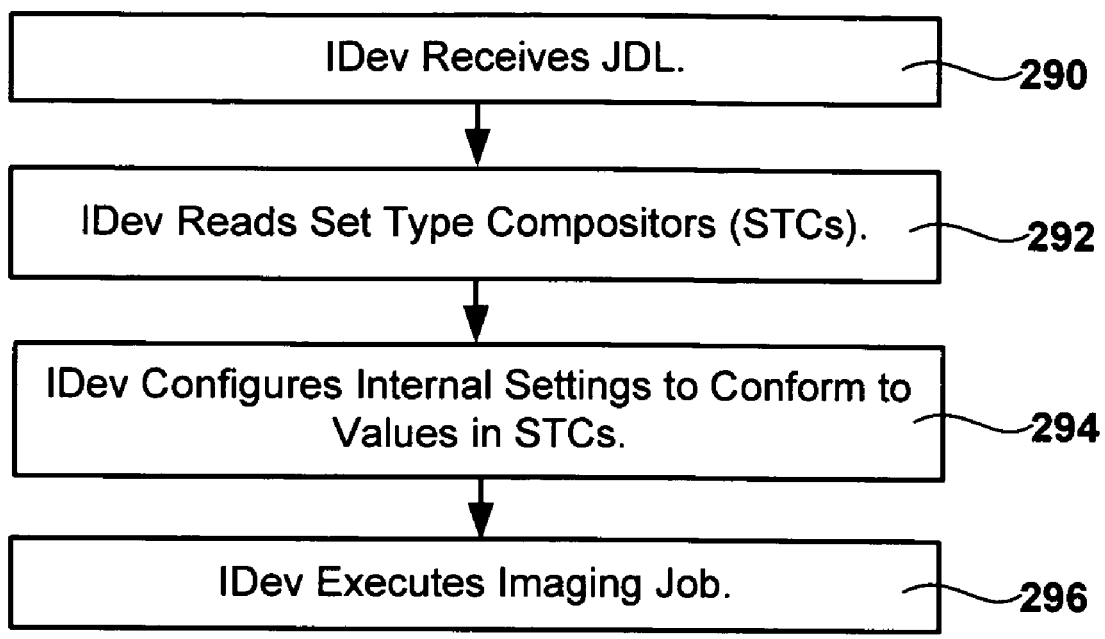
FIG. 27 is a chart showing steps of an embodiment comprising reading Set Type Compositors to configure an imaging job.

Some embodiments of the present invention may be described with reference to FIG. 27. In these embodiments, an IDev may receive 290 a JDL comprising Set Type Compositors from an application. The IDev may the parse, read or otherwise process 292 the JDL and Compositors to identify settings for JCPs. The IDev may then configure 294 itself internally to conform to the JCP values identified in the Set Type Compositors. Once correctly configured, the IDev may execute 296 the imaging job defined in the JDL.

The terms and expressions which have been employed in the forgoing specification are used therein as terms of description and not of limitation, and there is no intention in the use of such terms and expressions of excluding equivalence of the features shown and described or portions thereof, it being recognized that the scope of the invention is defined and limited only by the claims which follow.

I claim:

1. A method for describing an imaging job, said method comprising:

sending, to an imaging device (IDev), a request for a list of IDev properties exposed to remote applications, wherein said request is an extensible markup language message using a simple object access protocol (XML/SOAP message);

receiving, from said IDev, said list of exposed IDev properties in the form of a nested Complex Descriptor Type Compositor comprising a plurality of Simple Descriptor Type Compositors wherein said Simple Descriptor Type Compositors consist of an AppInfo attribute consisting of a list of rules and constraints used to validate user input for a property value in said simple compositor, a Value attribute describing a default value for a property, an allowedValueList attribute serving as a container for a list of values of an enumerated type, a sys-name attribute whose value specifies a system variable name known to said IDev, an isType attribute defining a property type consisting of the property types, boolean, integer, string and list, and wherein said Simple Descriptor Type Compositors are selected from a set consisting of a sequence type descriptor imposing an order on defined properties, a choice type descriptor imposing a constraint wherein only one element can be selected from a provided list of choices, an all type descriptor imposing a rule wherein an one or more elements ma be selected from a provided list in any order and an operation type descriptor describing an operation;

determining a job configuration property (JCP) for said IDev by reading said nested Complex Descriptor Type Compositor;

accepting user input relative to said JCP, said user input defining an imaging job parameter;

validating said user input based on said validation rule, wherein said validation comprises checking said input for a minimum length and a maximum length or a minimum value and a maximum value; and compiling a Job Definition List (JDL) comprising at least one of a Property Set Type Compositor and a Complex Set Type Compositor wherein said JDL is configured to define an imaging job with said at least one of a Simple Set Type Compositor and a Complex Set Type Compositor, wherein said compiling is performed by a processor and a memory if said validating is successful.

2. A method as described in claim 1 wherein said JDL comprises a Complex Set Type Compositor that comprises further nested Complex Set Type Compositors, which comprise at least one Simple Set Type Compositor.

3. A method for creating an imaging job, said method comprising:
   a) receiving, form an imaging device (IDev), a set of job configuration properties (JCPs) that define imaging device (IDev) properties that can be set by an application to configure said IDev for an imaging job and instruct said IDev to execute said imaging job, wherein said set of JCPs is in the form of a nested Complex Descriptor Type Compositor comprising a plurality of Simple Descriptor Type Compositors wherein said Simple Descriptor Type Compositors consist of an AppInfo attribute consisting of a list of rules and constraints used to validate user input for a property value in said simple compositor, a Value attribute describing a default value for a property, an allowedValueList attribute serving as a container for a list of values of an enumerated type, a sys-name attribute whose value specifies a system variable name known to said IDev, an isType attribute defining a property type consisting of the property types, boolean, integer, string and list, and wherein said Simple Descriptor Type Compositors are selected from a set consisting of a sequence type descriptor imposing an order on defined properties, a choice type descriptor imposing a constraint wherein only one element can be selected from a provided list of choices, an all type descriptor imposing a rule wherein any one or more elements may be selected from a provided list in any order and an operation type descriptor describing an operation;
   b) receiving user input relative to said at least one of said JCPs comprising a validation constraint;
   c) validating said user input based on said validation constraint, wherein said validation comprises checking said input for a minimum length and a maximum length or a minimum value and a maximum value; and
   d) compiling a Job Definition List (JDL) comprising a nested Complex Set Type Compositor comprising a plurality of Property Set Type Compositors, wherein said Compositors in said JDL comprise instructions for directing said IDev to execute an imaging job defined by said user input in said Compositors, wherein said compiling is performed by a processor and a memory if said validation is successful.

4. A method as described in claim 3 wherein said Simple Set Type Compositor is a PROPERTY_SET_TYPE compositor.

5. A method as described in claim 3 wherein said Complex Set Type Compositor is a COMPLEX_SET_TYPE compositor.

6. A method as described in claim 3 further comprising requesting said set of job configuration properties (JCPs) with a SOAP request.

7. A method as described in claim 3 wherein said receiving said set of JCPs comprises receiving a SOAP response.

8. A method as described in claim 3 further comprising sending said JDL to said IDev to execute said imaging job.

9. A system for describing an imaging job, said system comprising:
   a) a receiver for receiving at least one of a Simple Descriptor Type Compositor and a Complex Descriptor Type Compositor, wherein said Simple Descriptor Type Compositors consist of an AppInfo attribute consisting of a list of rules and constraints used to validate user input for a property value in said simple compositor, a Value attribute describing a default value for a property, an allowedValueList attribute serving as a container for a list of values of an enumerated type, a sys-name attribute whose value specifies a system variable name known to said IDev, an isType attribute defining a property type consisting of the property types, boolean, integer, string and list, and wherein said Simple Descriptor Type Compositors are selected from a set consisting of a sequence type descriptor imposing an order on defined properties, a choice type descriptor imposing a constraint wherein only one element can be selected from a provided list of choices, an all type descriptor imposing a rule wherein any one or more elements may be selected from a provided list in any order and an operation type descriptor describing an operation;
   b) a user input (UI) device for receiving user input relative to said at least one of said compositors comprising a validation rule;
   c) a validater for validating said user input, wherein said validating comprises checking said input for a minimum length and a maximum length or a minimum value and a maximum value;
   d) a parser for parsing said at least one Compositor to identify at least one Job Configuration Property (JCP) for an Imaging Device (IDev); and
   e) a compiler for compiling a Job Definition List (JDL) comprising a nested Complex Set Type Compositor comprising a plurality of Simple Set Type Compositors wherein said JDL is configured to define an imaging job by setting said JCP with said Complex Set Type Compositor and said user input, wherein said compiler comprises a processor and a memory.

10. A system as described in claim 9 further comprising a sender for sending said JDL to said IDev.

11. A system as described in claim 9 wherein said receiver may receive a plurality of compositors and said parser may parse said compositors to identify a plurality of JCPs and store a list of said JCPs for use in creating JDLs.

* * * * *